United States Patent [19]
Kato et al.

[11] Patent Number: 6,014,265
[45] Date of Patent: Jan. 11, 2000

[54] ZOOM OPTICAL SYSTEM

[75] Inventors: Shigeru Kato, Tachikawa; Masaru Morooka, Akishima; Seiji Shimizu, Omiya, all of Japan

[73] Assignee: Olympus Optical Co., Ltd., Tokyo, Japan

[21] Appl. No.: 09/014,386

[22] Filed: Jan. 27, 1998

[30] Foreign Application Priority Data

| Jan. 28, 1997 | [JP] | Japan | 9-027281 |
| Jul. 7, 1997 | [JP] | Japan | 9-195199 |
| Oct. 14, 1997 | [JP] | Japan | 9-294986 |

[51] Int. Cl.[7] .................................................. G02B 15/14
[52] U.S. Cl. .......................................... 359/686; 359/676
[58] Field of Search ................................ 359/686, 676, 359/681, 682

[56] References Cited

U.S. PATENT DOCUMENTS 5,587,840 12/1996 Itoh .
5,805,359 9/1998 Yamanashi .............................. 359/686

FOREIGN PATENT DOCUMENTS

| 6-214157 | 8/1994 | Japan . |
| 6-214158 | 8/1994 | Japan . |
| 8-122640 | 5/1996 | Japan . |
| 9-015499 | 1/1997 | Japan . |
| 9-015500 | 1/1997 | Japan . |
| 9-101457 | 4/1997 | Japan . |

*Primary Examiner*—Hung Xuan Dang
*Attorney, Agent, or Firm*—Pillsbury Madison & Sutro LLP

[57] ABSTRACT

An optical system composed, in order from the object side, of a first lens unit which has a positive power or is powerless, a second lens unit which has a positive power, a third lens unit which has a positive power and a fourth lens unit which has a negative power, and configured to change its magnification by varying airspaces reserved between the lens unit. The fourth lens unit is composed of a single lens element or the optical system as a whole is composed of lens element in a number not exceeding twice a number of movable lens units. The optical system is composed of a small number of lens elements and compact.

30 Claims, 21 Drawing Sheets

ZOOM OPTICAL SYSTEM

BACKGROUND OF THE INVENTION a) Field of the Invention

The present invention relates to a zoom optical system which is to be used with photographic cameras, and lens shutter cameras in particular.

b) Description of the Prior Art

In the recent years, lens shutter cameras which are equipped with zoom optical systems are configured as the so-called collapsible mount type which accommodate lens systems into camera bodies by narrowing airspaces between adjacent lens units of the optical systems. For reducing thickness of a lens shutter camera, it is therefore necessary to shorten a total length of an optical system in its collapsed condition. Further, a zoom optical system has a long total length at its tele position, and it is necessary to configure a lens barrel which accommodates and holds a lens system so that it can be accommodated in two or more stages in a camera body for collapsing the optical system compact at its tele position, thereby reducing thickness of the camera.

A typical zoom optical system which is conventionally used in lens shutter cameras is composed of three positive, positive and negative lens units for obtaining a relatively high vari-focal ratio and a compact design.

For obtaining a wide field angle of incidence at a wide position of such a zoom optical system which is composed of the three positive, positive and negative lens units, a total refractive power of the first positive lens unit and the second positive lens unit must be strengthened at the wide position, and the second lens unit must be composed of a large number of lens elements for favorably correcting offaxial aberrations in the second lens unit in particular.

For maintaining favorable optical performance in all zoom regions from a wide position to a tele position, it is necessary to suppress amounts of aberrations to be produced in each zoom lens unit. Since the third lens unit produces aberrations in large amounts at the tele position in particular, it is necessary for reducing the aberrations to use two or more lens elements in the third lens unit.

Let us suppose that we are to obtain a zoom optical system which is composed of three positive, positive and negative lens units, covers a region wherein field angles are large and has a vari-focal ratio of 3 or higher. When a lens barrel is composed of two or three stages for collapsing the zoom optical system which has a long total length at its tele position and moves the first lens unit for a long distance, a single stage of the lens barrel is longer than a total length of the optical system in which airspaces between adjacent lens units are narrowed, thereby making it difficult to reduce thickness of a camera. When the lens barrel is composed of four or more stages, the lens barrel has a large maximum diameter which is disadvantageous for compact configuration of a camera.

As conventional examples which are configured for correcting the defects described above, there are known zoom optical systems disclosed by Japanese Patents Kokai Publication No. Hei 6-214157 and Kokai Publication No. Hei 6-214158 each of which comprises four positive, positive, positive and negative lens units movable at magnification change stages for obtaining a vari-focal ratio of 3 or higher and a compact design, and is configured to reduce aberrations to be produced by changing the magnification, zoom optical systems disclosed by Japanese Patents Kokai Publication No. Hei 8-122640 and Kokai Publication No. Hei 9-101457 each of which is composed of four positive, negative, positive and negative lens units, and zoom optical systems disclosed by Japanese Patents Kokai Publication No. Hei 9-15499 and No. Hei 9-15500 each of which is composed of four negative, positive, positive and negative lens units.

In each of the optical systems disclosed by Japanese Patents Kokai Publication No. Hei 6-214157, No. Hei 6-214158, No. 8-122640 and No. Hei 9-101457 out of the conventional examples mentioned above, the fourth lens unit is composed of two or more lens elements and has a composition wherein a lens element or lens elements are disposed on the object side of a negative lens element which has a deep concave surface on the object side and is disposed on the image side.

Accordingly, an axial distance as measured from a surface of incidence to a surface of emergence of the fourth lens unit, i.e., compositional length of the fourth lens unit is long and inadequate for shortening a compositional length of a lens barrel in its collapsed condition. That is, the optical system has a composition such as that shown in FIG. 1 and is not preferable for shortening a compositional length of a lens barrel in its collapsed condition. In FIG. 1, reference symbols G1, G2, G3 and G4 represent the first, second, third and fourth lens units, a reference symbol S designates an aperture stop, and reference symbols $L_P$ and $L_N$ denote a positive lens element and a negative lens element.

Further, the optical system disclosed by Japanese Patent Kokai Publication No. Hei 9-15499 has a field angle of incidence 2ω not narrower than 65° but a low vari-focal ratio on the order of 2.9. Furthermore, the optical system disclosed by Japanese Patent Kokai Publication No. Hei 9-15500 has a field angle of incidence 2ω not narrower than 65° and a vari-focal ratio on the order of 3.8, but allows an aperture stop to move at a magnification change stage, whereby the optical system comprises a large number of parts which are moved for changing a magnification, uses a lens barrel having a complicated structure or a large number of parts and requires a high manufacturing cost.

Moreover, each of the optical systems disclosed by Japanese Patents Kokai Publication No. Hei 9-15499 and No. 9-15500 is a zoom optical system composed of the four negative, positive, positive and negative lens units which are composed of lens elements in a relatively small number of seven, but uses a front lens element having a large diameter due to a fact that an aperture stop is disposed in the second lens unit which is disposed with a relatively wide airspace from the first lens unit. Since this optical system is focused onto an object located at a short distance by moving the third lens unit toward the object side, this optical system remarkably aggravates spherical aberration at its tele position in particular and hardly allows to shorten the distance to the object. Spherical aberration is remarkably aggravated since a converging light bundle which has passed through the second positive lens unit is incident onto the third lens unit and rays pass through high portions of a first negative lens element of the third lens unit in a condition where the third lens unit is moved toward the object side for focusing, and this aggravation is more remarkable at the tele position in particular.

In addition, it is strongly demanded to configure cameras more compact and problems are posed to dispose relatively large areas of lens surfaces which are disposed near a film surface and through which effective rays do not pass.

SUMMARY OF THE INVENTION

A primary object of the present invention is to provide a compact zoom optical system which has a high vari-focal ratio, is composed of a small number of lens elements and permits shortening a length of a lens barrel in its collapsed condition.

Another object of the present invention is to provide a zoom optical system which permits reducing diameters of a front lens element and a stop.

Still another object of the present invention is to provide a zoom optical system which is composed of a small number of lens elements and allows aberrations to be varied little when the optical system is focused onto an object located at an extremely short distance.

The zoom optical system according to the present invention which has a first composition is composed, in order from the object side, of a first lens unit which has a positive power or is powerless (having substantially no refractive power), a second lens unit which has a positive power, a third lens unit which has a positive power and a fourth lens unit which has a negative power, configured to change a magnification by varying airspaces reserved between the lens units, and characterized in that the fourth lens unit is composed of a single lens element.

Further, the zoom optical system according to the present invention which has the first composition described above is characterized in that it satisfies the following condition (8):

$$0 \leq y/f_1 \leq 0.14 \tag{8}$$

The zoom optical system according to the present invention which has a second composition is composed, in order from the object side, of a first lens unit which has a positive power or its powerless, a second lens unit which has a positive power, a third lens unit which has a positive power and a fourth lens unit which has a negative power, configured to change a magnification by changing airspaces reserved between the lens units, and characterized in that the optical system satisfies the following condition (1);

$$0.03 < \Sigma D_4/y < 0.25 \tag{1}$$

Further, the zoom optical system according to the present invention which has a third composition is composed, in order from the object side, of a first lens unit which has a positive power or is powerless, a second lens unit which has a positive power, a third lens unit which has a positive power and a fourth lens unit which has a negative power, configured to change a magnification by changing airspaces reserved between the lens units, and characterized in that the optical system as a whole is composed of lens elements in a number not exceeding twice a number of the lens units which are movable for changing magnification.

The zoom optical system according to the present invention which has a fourth composition is composed, in order from the object side, of a first lens unit which has a positive power or is powerless, a second lens unit which has a positive power, a third lens unit which has a positive power and a fourth lens unit which has a negative power, configured to change a magnification by changing airspace reserved between the lens units, and characterized in that the fourth lens unit is composed of a single lens element, and that an aperture stop is disposed on the image side of a first lens element of the second lens unit and on the object side of the third lens unit.

The zoom optical system according to the present invention which has a fifth composition has the fourth composition and is characterized in that it satisfies the following condition (10):

$$0.10 \leq E(W)/f_W \leq 0.30 \tag{10}$$

The zoom optical system according to the present invention which has a sixth composition is composed of a first lens unit which has a positive power or is powerless, a second lens unit which has a positive power, a third lens unit which has a positive power and a fourth lens unit which has a negative power, configured to change a magnification by changing airspaces reserved between the lens units, and is characterized in that an aperture stop is disposed between the second lens unit and the third lens unit and that the aperture stop is moved together with the second lens unit or toward the object side independently of movements of the other lens units for changing a magnification from a wide position to a tele position.

DESCRIPTION OF THE PREFERRED EMBODIMENTS

The zoom optical system according to the present invention which has a first composition is composed, in order from the object side, of a first lens unit which has a positive refractive power or is powerless, a second lens unit which has a positive refractive power, a third lens unit which has a positive refractive power and a fourth lens unit which has a negative refractive power, configured to change a magnification by changing airspaces reserved between the lens units, and characterized in that the fourth lens unit is composed of a single lens element.

The zoom optical system according to the present invention is configured to change the magnification by changing the airspaces reserved between the lens units as described above. A magnification is changed from a wide position to a tele position, for example, by moving the first lens unit and the fourth lens unit toward the object side, and then moving the second lens unit and the third lens unit toward the object side later. Speaking more concretely, the magnification is changed from the wide position to the tele position by moving all the lens units toward the object side (changing the airspaces between the lens units) so as to widen an airspace reserved between the first lens unit and the second lens unit, and narrow an airspace reserved between the third lens unit and the fourth lens unit. Further, an airspace reserved between the second lens unit and the third lens unit is changed so that aberrations such as spherical aberration, curvature of field and chromatic aberrations are varied little by changing the magnification.

The zoom optical system according to the present invention allows the fourth lens unit to have a short compositional length and permits shortening a compositional length of a lens barrel in its collapsed condition since it is composed of the four positive, positive, positive and negative lens units, and characterized in that the fourth lens unit is composed of the single lens element as described above.

There is known a zoom lens system which is composed of four lens units as described above and uses a negative lens element having a deep concave surface on the object side and disposed on the image side (on the image side in a fourth lens unit) as in the conventional example described above. The present invention also uses a negative lens element which has a deep concave surface on the object side as in embodiments described later. When the fourth lens unit is composed of a negative lens element which has a deep concave surface on the object side, the third lens unit can fit into this surface in the collapsed condition, thereby making it possible to further shorten a compositional length of a lens barrel in its collapsed condition.

Figure 1:
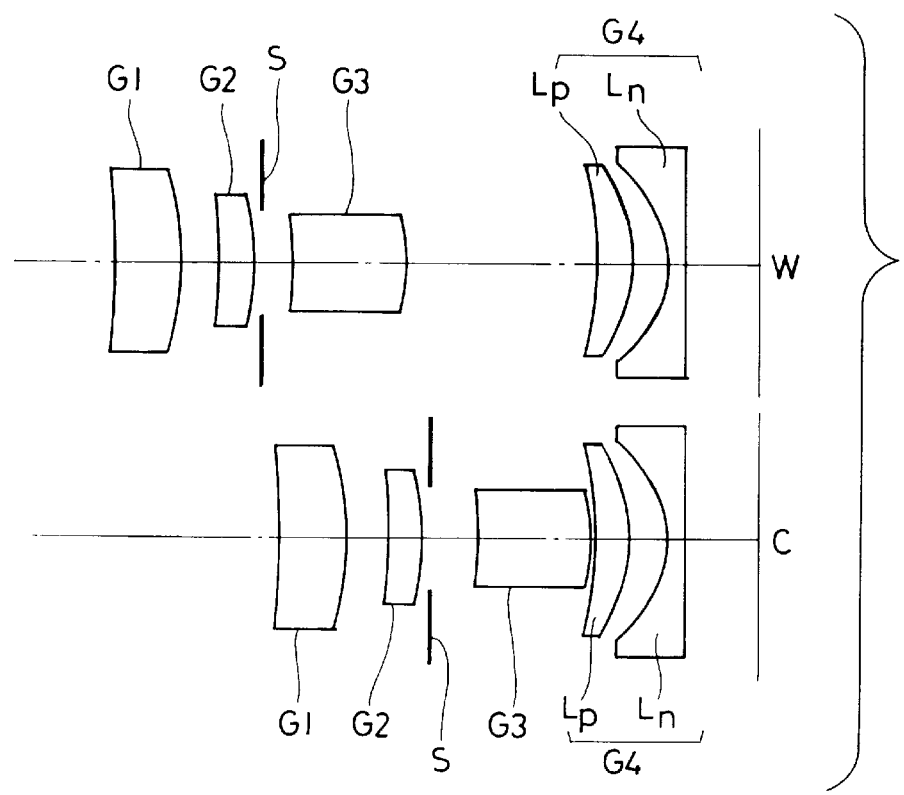
FIG. 1 shows a conceptional diagram of a conventional optical system.
Figure 2:
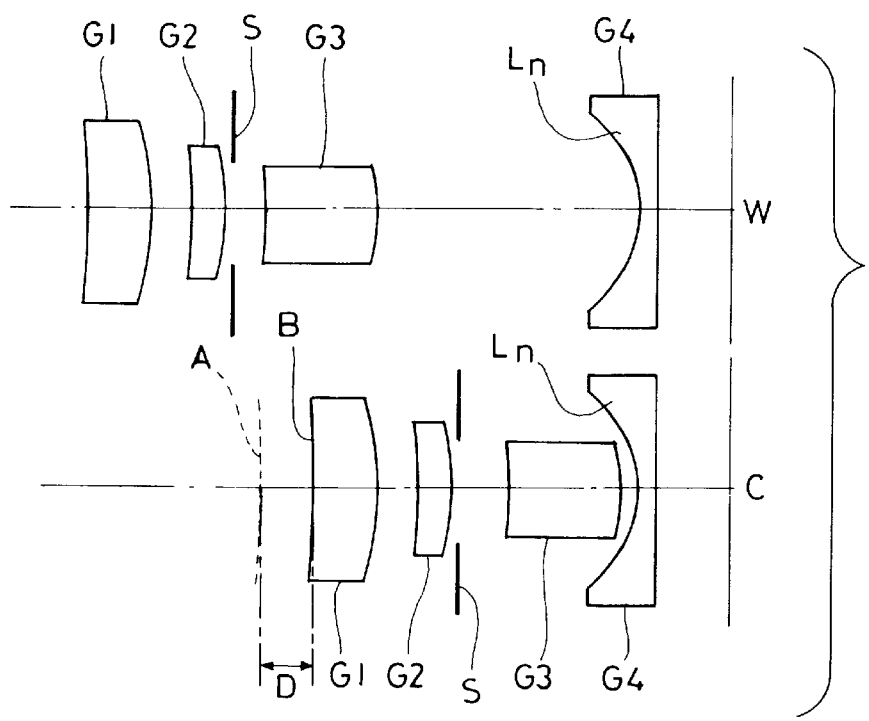
FIG. 2 shows a conceptional diagram of the optical system according to the present invention.

FIGS. 1 and 2 compare the conventional example described above with the optical system according to the present invention. A composition of the conventional zoom lens system and a composition of the optical system according to the present invention are shown in FIG. 1 and FIG. 2 respectively wherein a reference symbol W represents a wide position and a reference symbol C designates a collapsed condition. As seen from these drawings, a lens element $L_P$ is disposed on the object side of an object side concave surface of a negative lens element $L_n$ in the fourth lens unit and a portion of a third lens unit G3 does not fit into a fourth lens unit G4. In the zoom optical system according to the present invention, in contrast, a fourth lens unit G4 is composed of a single lens element $L_n$ which has a deep concave surface on the object side and a portion of a third lens unit G3 penetrates into this deep concave surface. Accordingly, the zoom optical system according to the present invention makes it possible to further shorten a lens barrel structure in its collapsed condition. Speaking concretely, the zoom optical system according to the present invention in which the fourth lens unit G4 is composed of the single negative lens element $L_n$ having the deep concave surface on the object side can be shorter for a distance corresponding to a difference between a first surface A of the conventional zoom optical system in its collapsed condition (a first surface A in the collapsed condition shown at an upper stage C in FIG. 1) and a first surface B of the zoom optical system according to the present invention in its collapsed condition shown in FIG. 2.

Further, the zoom optical system according to the present invention which has the first composition described above is characterized in that it satisfies the following condition (8):

$$0 \leq y/f_1 \leq 0.14 \tag{8}$$

wherein the reference symbol y represents ½ of a diagonal length of an image surface and the reference symbol f1 designates a focal length of the first lens unit.

The condition (8) defines a refractive power of the first lens unit and is adopted for reducing variations of aberrations to be caused by changing a magnification. If the upper limit of 0.14 of the condition (8) is exceeded, the first lens unit will have a strong refractive power, thereby making it difficult to correct astigmatism and coma favorably in the vicinities of the tele position. If the lower limit of 0 of the condition (8) is exceeded, in contrast, the first lens unit will have a negative refractive power, the first lens unit and the second lens unit will compose a retrofocus type lens system which has a long back focal length, the zoom optical system will have a large total length at the wide position, and a wide airspace is reserved between the first lens unit and the second lens unit, whereby the first lens unit will have a large diameter and it will be impossible to configure a lens barrel compact. Further, it will be difficult to correct spherical aberration favorably at the tele position in particular.

A second composition of the zoom optical system according to the present invention is described below. Like the zoom optical system which has the first composition described above, the zoom optical system according to the present invention which has the second composition is composed, in order from the object side, of a first lens unit which has a positive refractive power or is powerless, a second lens unit which has a positive refractive power, a third lens unit which has a positive refractive power and a fourth lens unit which has a negative refractive power, configured to change a magnification by varying airspaces reserved between the lens units, and characterized in that the zoom optical system satisfies the following condition (1):

$$0.03 < \Sigma D_4/y < 0.25 \tag{1}$$

wherein the reference symbol $\Sigma D_4$ represents a structural length of the fourth lens unit, i.e., a distance on an optical axis as measured from a surface of incidence to a surface of emergence of the fourth lens unit and the reference symbol y designates ½ of a diagonal length of an image surface.

The zoom optical system according to the present invention which has the second composition described above is configured to satisfy the condition (1) for shortening a structural length of a lens barrel in its collapsed condition.

If the upper limit of 0.25 of the condition (1) is exceeded, the third lens unit cannot penetrates into the fourth lens unit, thereby prolonging a structural length of a lens barrel in its collapsed condition.

If a lower limit of 0.03 of the condition (1) is exceeded, the fourth lens unit will have a small structural length which is advantageous for thinning a camera but the lens element of the fourth lens unit will be too thin for practical working.

Though the fourth lens unit which is composed of a single lens element is not limitative for the zoom optical system according to the present invention, it is desirable that the condition (1) is satisfied even when the fourth lens unit is composed of a single lens element as in the first embodiment.

The zoom optical system according to the present invention which has a third composition is composed, in order from the object side, of a first lens unit having a positive refractive power or is powerless, a second lens unit having a positive refractive power, a third lens unit having a positive refractive power and a fourth lens unit having a negative refractive power, configured to change a magnification by varying airspaces reserved between the lens units, and characterized in that the optical system is composed of lens elements in a number not exceeding twice a number of lens units which are movable for changing the magnification.

Since the optical system according to the present invention is a zoom optical system composed of four lens units, the zoom optical system according to the present invention which has the third composition is characterized in that it is composed of lens elements in a number of eight or smaller.

It is desirable that the zoom optical system according to the present invention which has the third composition is composed of lens element in a number of seven or smaller.

Further, it is desirable that the zoom optical system according to the present invention which has the third composition is composed of lens elements in a number of six or smaller.

When the zoom optical system as a whole is composed of a small number of lens elements, the optical system is compact as a whole and each lens unit is composed of a small number of lens element or elements, whereby each lens unit can have a short structural length and a lens barrel can have a short structural length in its collapsed condition.

It is desirable for the zoom optical system which has the first, second or third composition that the fourth lens unit satisfies the following condition (2):

$$-1.20 < (r_F + r_R)/(r_F - r_R) < 0 \qquad (2)$$

wherein the reference symbols $r_F$ and $r_R$ represent radii of curvature on an object side surface and an image side surface respectively of the fourth lens unit.

If the upper limit of 0 of the condition (2) is exceeded, a final surface of the optical system (the image side surface of the fourth lens unit) will be deep, or has strong curvature, whereby an edge of a final lens element becomes nearer a film surface and a distance as measured from a first surface to the final surface of the lens system is substantially prolonged. If the lower limit of −1.20 of the condition (2) is exceeded, in contrast, a surface of incidence of a final lens unit (an object side surface of the fourth lens unit) will have strong curvature or a too deep a concave shape and interfere with a barrel member disposed on the object side of this surface, thereby making it necessary to widen an airspace reserved between the lens units.

It is desirable for the zoom optical system which has the first, second or third composition described above that at least one aspherical surface is disposed at least on the fourth lens unit.

Since a magnification of a zoom optical system which is composed of four positive, positive, positive and negative lens units is changed mainly by the fourth lens unit, it is effective for shortening a total length of the lens system to strengthen the negative refractive power of the fourth lens unit. Accordingly, a lens element disposed in the fourth lens unit has strong curvature and aggravates aberrations such as curvature of field and distortion of marginal rays. This aggravation of aberrations can be prevented or the aberrations of the marginal rays can be corrected favorably by configuring at least one of surfaces of the fourth lens unit as an aspherical surface which has curvature moderated at a marginal portion.

In the zoom optical system according to the present invention which has the first, second or third composition, chromatic aberration is not corrected independently in each lens unit but cancelled each other among the lens units so as to be small in the optical system as a whole. This design concept allows the aberration (chromatic aberration) to remain in each lens unit, thereby making it possible to compose each lens unit of a small number of lens elements or compose the optical system as a whole of seven or a smaller number of lens elements.

When the fourth lens unit which has the strong refractive power is composed of a single negative lens element in particular, the fourth lens unit produces chromatic aberration in a large amount, thereby making it difficult to cancel it with chromatic aberration produced by the lens units disposed before the fourth lens unit. For this reason, it is desirable to configure the fourth lens unit so as to satisfy the following condition (3):

$$\nu_R > 50 \qquad (3)$$

wherein the reference symbol $\nu_R$ represents an Abbe's number of the negative lens element of the fourth lens unit.

If the lower limit of 50 of the condition (3) is exceeded, the fourth lens unit will produce chromatic aberration in an amount too large for sufficient correction with the lens units disposed before the fourth lens unit.

For the zoom optical system according to the present invention, it is desirable to dispose an aperture stop on the object side of a final lens element of the third lens unit. For shortening a structural length of a lens barrel in its collapsed condition, it is desirable to penetrate the third lens unit into the object side concave surface of the fourth lens unit as described above. When an aperture stop is disposed on the image side of the third lens unit, the aperture stop interferes with a marginal portion of the fourth lens unit, thereby prolonging a length in the collapsed condition.

Further, it is desirable to configure the zoom optical system according to the present invention so as to satisfy the following conditions (4) and (5):

$$1.5 < \beta_{4T}/\beta_{4W} \qquad (4)$$

$$0.1 < f_{BW}/f_W < 0.5 \qquad (5)$$

wherein the reference symbols $\beta_{4T}$ and $\beta_{4W}$ represent lateral magnifications of the fourth lens unit at a tele position and a wide position respectively, the reference symbol $f_{BW}$ designates a back focal length at the wide position, and reference symbol $f_W$ denotes a focal length of the optical system as a whole at the wide position.

The condition (4) is required for obtaining a high varifocal ratio of the zoom optical system according to the present invention. If the lower limit of 1.5 of the condition (4) is exceeded, a burden for the magnification change shifts from the fourth lens unit to the third lens unit and each lens unit is moved for a longer distance to change the magnification, thereby making it impossible to shorten the optical system in the thrust direction.

The condition (5) is required for shortening diameters of the lens elements. If the lower limit of 0.1 of the condition (5) is exceeded, the fourth lens unit will be too near the film surface and lens elements will have too large diameters. If the upper limit of 0.5 of the condition (5) is exceeded, the lens element will have small diameters but the fourth lens unit will have too high a lateral magnification, thereby making it impossible to correct aberrations favorably.

Furthermore, it is desirable for the zoom optical system according to the present invention that the fourth lens unit satisfies the following condition (6):

$$0.5 < |f_4/f_W| < 0.9 \qquad (6)$$

wherein the reference symbol $f_4$ represents a focal length of the fourth lens unit.

If the lower limit of 0.5 of the condition (6) is exceeded, the fourth lens unit will have too strong a refractive power, thereby making it impossible to correct aberrations favorably. If the upper limit of 0.9 of the condition (6) is exceeded, in contrast, the lens system will have a large total length, thereby making it impossible to configure the zoom optical system compact.

For reducing variations of aberrations to be caused by focusing the zoom optical system according to the present invention, it is desirable to focus the optical system by moving the third lens unit. In addition, it is possible to focus the optical system by moving the second lens unit or the fourth lens unit, the second lens unit together with the third lens unit or the optical system as a whole.

When the zoom optical system is to be focused by moving the third lens unit, it is desirable to configure the third lens unit so as to satisfy the following condition (7):

$$|\beta_{3T}|<0.9 \qquad (7)$$

wherein the reference symbol $\beta_{3T}$ represents a magnification of the third lens unit at the tele position.

If the upper limit of 0.9 of the condition (7) is exceeded, the third lens unit must be moved for a long distance for focusing the optical system.

It is more desirable that the optical system which has the composition described above satisfies the following condition (9):

$$0.5<|f_4|/y<1.0 \qquad (9)$$

wherein the reference symbol $f_4$ represents a focal length of the fourth lens unit.

The zoom optical system according to the present invention is composed as described above so that variations of aberrations caused by a magnification change are shared among the lens units, whereby aberrations are corrected favorably in the optical system as a whole and favorable optical performance is maintained even when the lens units consists of a reduced number of lens elements.

That is, the zoom optical system according to the present invention is composed of four lens units as exemplified by a ninth embodiment described later and configured to change its magnification by moving the lens units and minimize a burden on the first lens unit at a stage of a magnification change performed by moving the lens units, whereby the first lens unit shares correction of aberrations, astigmatism and coma in particular, caused due to movements of the second lens unit and the third lens unit of the optical system according to the present invention which correspond to the first lens unit and the second lens unit of the conventional zoom lens system which is composed of three positive, positive and negative lens units. Accordingly, this composition lessens a burden on each lens unit for correction of aberrations even when the zoom optical system has a high vari-focal ratio of 3.5 or higher, thereby making it possible to compose the zoom optical system of lens elements in a number smaller than that of the lens elements of the conventional zoom lens system composed of the three lens units. Further, the zoom optical system according to the present invention which has the composition described above is capable of favorably correcting aberrations only with the first through third lens units, thereby lessening a burden on the fourth lens unit for the correction of aberrations and permitting enhancing a power of the fourth lens unit. Accordingly, the zoom optical system according to the present invention can have a short back focal length and a total length shorter than that of the conventional zoom lens system which is composed of four lens units.

Since the composition lessens the burden on the fourth lens unit for the correction of aberrations, it makes it possible to compose the fourth lens unit of a single negative lens element. When the fourth lens unit is composed of a single negative lens element, the negative lens element used as the fourth lens unit has a surface of incidence which is a rather deep concave surface into which the third lens unit can penetrate in a collapsed condition as shown in FIG. 2, thereby making it possible to shorten a length of a lens barrel in its collapsed condition.

The condition (9) defines a refractive power of the fourth lens unit, and is required for obtaining a field angle of incidence of 65° or larger at the wide position and favorable optical performance. If the lower limit of 0.5 of the condition (9) is exceeded, the fourth lens unit will have a strong refractive power which is advantageous for obtaining a field angle of incidence of 65° or larger at the wide position but makes it difficult to correct aberrations favorably. If the upper limit of 1.0 of the condition (9) is exceeded, in contrast, the fourth lens unit will have a weak refractive power which makes it difficult to correct aberrations favorably when the zoom optical system has a wide field angle.

It is desirable for the zoom optical system according to the present invention to dispose an aperture stop on the object side of an image side lens element of the third lens unit.

It is desirable to configure the object side surface of the negative lens element of the fourth lens unit as a deep concave surface as described above so that the third lens unit penetrates into the concave surface in a collapsed condition. When an aperture stop is disposed on the image side of the third lens unit, however, the aperture stop will interfere with a marginal portion of the fourth lens unit, thereby undesirably prolong a total length in the collapsed condition.

Further, it is desirable to dispose an aperture stop between the second lens unit and the third lens unit, and move the aperture stop together with the second lens unit for changing a magnification. By disposing an aperture stop between the second lens unit and the third lens unit, and moving it together with the second lens unit as described above, it is possible to reduce the variations of aberrations to be caused by changing a magnification from the wide position to the tele position and obtain favorable optical performance of the zoom optical system as a whole. Further, it is possible to bring an entrance pupil close to the first lens unit at the tele position, thereby lowering offaxial rays passing through the first lens unit and the second lens unit. Accordingly, it is possible to reduce diameters of the first lens unit and the second lens unit, thereby configuring a lens barrel compact.

For the zoom optical system according to the present invention which has one of the compositions described above, it is desirable to use at least one aspherical surface in the fourth lens unit.

A magnification of the zoom optical system according to the present invention is changed mainly by the fourth lens unit. To use the zoom optical system in a condition where has a short total length, it is therefore effective to strengthen the negative refractive power of the fourth lens unit. When the negative refractive power of the fourth lens unit is strengthened, however, a lens element used as the fourth lens unit has strong curvature which aggravates offaxial aberrations such as astigmatism and distortion. To correct these aberrations, it is desirable to configure at least one surface as an aspherical surface having such a shape as to lower curvature toward marginal portions. Such an aspherical surface makes it possible to correct the offaxial aberrations favorably.

For the zoom optical system according to the present invention, it is desirable to use at least one aspherical surface on a positive lens element disposed in the third lens unit. When a field angle of incidence is enlarged at the tele position in particular, offaxial rays passing through the third lens unit produce remarkable aberrations, astigmatism and coma in particular. For this reason, it is desirable to configure at least one surface of the positive lens element as an aspherical surface. Such an aspherical surface makes it possible to correct the aberrations produced by the offaxial rays.

The zoom optical system according to the present invention is composed of lens elements in a number not exceeding twice the number of the lens units which are moved for changing a magnification as described above. To correct chromatic aberration favorably in the zoom optical system according to the present invention which has the composition described above, it is desirable to correct chromatic aberration not in each lens unit independently but to cancel chromatic aberration among the lens units so that it is corrected favorably in the zoom optical system as a whole. This design concept allows chromatic aberration to remain in each lens unit, thereby making it possible to compose the zoom optical system as a whole of lens elements in a number not exceeding twice the number of the lens unit which are moved for zooming from the wide position to the tele position, shorten a structural length of each lens unit and shorten a length of a lens barrel in its collapsed condition.

Speaking concretely of longitudinal chromatic aberration, it is produced remarkably by the second lens unit and aggravated toward the tele position. Therefore, the longitudinal chromatic aberration can be cancelled by producing chromatic aberration in a reverse direction by the first lens unit and the fourth lens unit.

Lateral chromatic aberration is produced remarkably by the first lens unit and the fourth lens unit, and aggravated toward the tele position. The chromatic aberration can be cancelled by configuring the third lens unit so as to produce chromatic aberration reverse to that produced by the first lens unit and configuring the second lens unit so as to produce chromatic aberration reverse to that produced by the fourth lens unit. Accordingly, chromatic aberration can be corrected favorably in the zoom optical system as a whole even when chromatic aberration is produced in a large amount by each lens unit which is composed of a small number of lens elements.

For the zoom optical system according to the present invention, it is desirable to compose the second lens unit of a positive meniscus lens element which has a convex surface on the object side. To obtain favorable optical performance of the zoom optical system as a whole in which the second lens unit is composed of a single positive lens element, it is desirable to configure the lens element as a positive meniscus lens element which has a convex surface on the object side.

When the fourth lens unit which has the strong refractive power is composed of a single negative lens element, the fourth lens unit produces chromatic aberration in a large amount and it is difficult to correct the chromatic aberration with the lens units disposed on the object side of the fourth lens unit. For this reason, it is desirable to configure the negative lens element used as the fourth lens unit so as to satisfy the condition (3) mentioned above.

It is desirable that the zoom optical system according to the present invention which has one of the compositions described above is focused on an object located at a short distance by moving the third lens unit toward the object side. By focusing the zoom optical system as described above, it is possible to reduce the variations of aberrations to be caused by focusing.

Further, the variations of aberrations to be caused by changing a magnification can easily be reduced by configuring the first lens unit so as to be more powerless or satisfy, in place of the condition (8), the following condition (8-1):

$$0 \leq y/f_1 < 0.07 \tag{8-1}$$

When a refractive power of the first lens unit is defined so as to satisfy the condition (8) or the condition (8-1), it is desirable to compose the first lens unit of a negative lens element and a positive lens element in order from the object side.

Furthermore, it is desirable that the zoom optical system according to the present invention which has one of the compositions described above satisfies the following condition (4-1):

$$1.5 < \beta_{4T}/\beta_{4W} < 6.0 \tag{4-1}$$

The condition (4-1) defines an upper limit of the condition (4) so as to further restrict the condition (4). If the upper limit of 6.0 of the condition (4-1) is exceeded, a burden on the fourth lens unit for a magnification change at the tele position will be heavier, thereby making it difficult to obtain favorable optical performance of the zoom optical system as a whole.

Moreover, it is desirable that the zoom optical system according to the present invention which has one of the compositions described above satisfies the condition (5) mentioned above.

When the zoom optical system is focused by moving the third lens unit, it is desirable to satisfy the condition (7) mentioned above:

The zoom optical system according to the present invention which has a fourth composition is composed of a first lens unit which has a positive power or is powerless, a second lens unit which has a positive power, a third lens unit which has a positive power and a fourth lens unit which has a negative power, and characterized in that the fourth lens unit is composed of a lens component (a lens element or a cemented lens component) which has a concave surface on the object side, and that an aperture stop is disposed on the image side of a lens component disposed on the object side in the second lens unit and on the object side of the third lens unit.

When a fourth lens unit is composed of a single lens component which has a concave surface on the object side as in the zoom optical system according to the present invention described above, a third lens unit can penetrate into the fourth lens unit in a collapsed condition as shown in FIG. 2. The fourth lens unit can have thickness which is smaller than a total of thickness and an airspace of a lens unit which is composed of two or more lens elements disposed with an airspace reserved, thereby allowing a third lens unit to be brought closer to a film surface and exhibiting a higher effect of the collapsible mount.

Further, the zoom optical system according to the present invention in which the fourth lens unit is composed of a single lens component, and the aperture stop is disposed on the image side of the lens component disposed on the object side in the second lens unit and on the object side of the third lens unit is capable of correcting lateral chromatic aberration, etc. produced by the fourth lens unit and aberrations of paraxial rays with good balance by a small number of lens elements. When the aperture stop is disposed on the image side of the lens component disposed on the object side in the second lens unit, paraxial rays are adequately separated from offaxial rays in the first lens unit and a light bundle passing through the fourth lens unit does not occupy too large a region, whereby it is possible to correct lateral chromatic aberration, etc. produced by the fourth lens unit and aberrations of the paraxial rays with a small number of lens elements. When the aperture stop is disposed on the object side of the third lens unit, the first lens unit does not require too large a diameter, at least one lens element of the second lens unit is disposed before the aperture stop and the third lens unit is disposed after the aperture stop, whereby it is possible to reduce the variations of spherical aberration, curvature of field, chromatic aberration, etc. to be caused mainly by a magnification change with a small number of lens elements.

Then, the zoom optical system according to the present invention which has a fifth composition is composed, in order from the object side, of a first lens unit which has a positive power or is powerless, a second lens unit which has a positive power, a third lens unit which has a positive power and a fourth lens unit which has a negative power, and is characterized in that an aperture stop is disposed between a lens element disposed on the object side in the second lens unit and an object side surface of the third lens unit, and that the zoom optical system satisfies the following condition (10):

$$0.10 \leq E(W)/fw \leq 0.30 \tag{10}$$

wherein the reference symbol E (W) represents a distance as measured from a vertex of a first surface of the zoom optical system at a wide position to an entrance pupil and the reference symbol fw designates a focal length of the zoom optical system as a whole at the wide position.

If the upper limit of 0.30 of the condition (10) is exceeded, a diameter of a front lens element of the zoom optical system will be enlarged contrary to the object of compact configuration of cameras, and adverse influences will be produced on layout and design of cameras. If the lower limit of 0.10 of the condition (10) is exceeded, in contrast, aberrations of marginal rays will be aggravated and a diameter of a rear lens element will be enlarged.

To further reduce a diameter of a front lens element, it is desirable to satisfy, in place of the condition (10), the following condition (10-1):

$$0.10 \leq E(W)/fw \leq 0.24 \tag{10-1}$$

When the zoom optical system according to the present invention which has the fifth composition is configured to be zoomed by moving the aperture stop together with the second lens unit, an airspace between the second lens unit and the aperture stop can be narrowed so as to obtain a mechanical advantage.

It is desirable that the zoom optical system according to the present invention which has the fourth or fifth composition is focused by an object located at a short distance by moving the second lens unit and the third lens unit toward the object side.

That is, the zoom optical system according to the present invention which has the fourth or fifth composition is composed, in order from the object side, of a first lens unit which has a positive power or is powerless, a second lens unit which has a positive power, a third lens unit which has a positive power and a fourth lens unit which has a negative power, and characterized in that it is focused on an object located at a short distance by moving the second lens unit and the third lens unit toward the object side.

From a viewpoint of mechanisms such as that for moving lens units, it is ordinarily advantageous to focus a zoom optical system by moving a single lens unit.

Though the zoom optical system according to the present invention can be focused by moving only the third lens unit, it is difficult to obtain a zoom optical system which can meet the recent demand for expansion of a photographic range, and is composed of a small number of lens elements in particular and sufficiently satisfactory in its optical performance. It is difficult in particular to expand a photographic range for a zoom optical system which has a photographing magnification of ¼ at a tele position due to remarkable aggravation of spherical aberration.

When the zoom optical system according to the present invention is focused on an object located at an extremely short distance of 60 cm by moving the third lens unit toward the object side, spherical aberration and astigmatism may be aggravated. When the third lens unit on which a converging light bundle having passed through the second lens unit is incident on the third lens unit is moved for focusing, rays passing through the first negative lens element of the third lens unit are made higher, thereby producing positive spherical aberration in a large amount. This tendency is higher at the tele position.

When the second lens unit and the third lens unit are selected as focusing lens units, the zoom optical system according to the present invention can be focused by moving these lens units for short distances as described above. In this case, heights of rays passing through the lens elements are varied only a little by moving the lens units for focusing and the variations of aberrations can be reduced. Further, the short moving distances make it possible to configure compact the zoom optical system including a lens barrel.

In this case, it is preferable from a viewpoint of a lens barrel system to move the second lens unit and the third lens unit as an integral unit.

For the zoom optical system according to the present invention which has the fourth or fifth composition, it is desirable to dispose an aperture stop between the second lens unit and the third lens unit, and move the aperture stop for zooming independently of the lens units so as to widen an airspace between the aperture stop and the second lens unit. Speaking in short, the zoom optical system according to the present invention is composed, in order from the object side, of a first lens unit which has a positive power or is powerless, a second lens unit which has a positive power, a third lens unit which has a positive power and a fourth lens unit which has a negative power, and characterized in that an aperture is disposed between the second lens unit and the third lens unit, and moved independently toward the object side so as to widen an airspace between the aperture stop and the second lens unit for changing a magnification from a wide position to a tele position.

When an attempt is made to obtain a desired F number at a tele position of a zoom optical system which has a composition such as that of the optical system according to the present invention, an aperture stop has a large diameter. This is because the first lens unit of the zoom optical system according to the present invention has a relatively weak power and a light bundle which is nearly parallel is incident on the second lens unit. When the aperture stop has such a large diameter, a lens barrel has an enlarged diameter which is undesirable from viewpoints of a lens moving mechanism and a collapsing mechanism.

Further, it is demanded to reduce an F number at a tele position in particular for preventing image qualities from being degraded due to vibrations produced momentarily at photographing stages in association with shutter speeds when a focal length is long at the tele position and for configuring compact a strobe system including a capacitor, a power source, etc. by lowering strobe light intensity.

At the wide position of the zoom optical system according to the present invention, the aperture stop is disposed near the second lens unit for reducing a diameter of a front lens element while reserving a sufficient amount of offaxial rays (marginal rays) and at the tele position, the aperture stop is disposed at a location far from the second lens unit at which a light bundle converged by the second lens unit is thin so that a diameter of the aperture stop can be small at the tele position. A diameter of an axial incident light bundle is expressed as focal length/F number.

For changing a magnification of the zoom optical system according to the present invention, it is desirable to move the first lens unit and the fourth lens unit toward the object side, and then move the second lens unit and the third unit and with a time delay so as to widen an airspace between the second lens unit and the third lens unit. That is, variations of spherical aberration, curvature of field, chromatic aberration, etc. can be reduced by varying the airspace between the second lens unit and the third lens unit in the optical system which is composed of a small number of lens elements.

Though a portion of the second lens unit may be disposed on the image side of the aperture stop in the zoom optical system according to the present invention, it is preferable for simplifying a barrel which holds the lens elements and a stop mechanism to dispose the aperture stop on the image side of the second lens unit.

Variations of distortion or astigmatism can be reduced in the zoom optical system according to the present invention by configuring the second lens unit so as to have a surface which is located on the side of the aperture stop and concave toward the aperture stop. This reduction of the variation is more effective when the configuration of the second lens unit is combined with the disposition of the aperture stop on the image side of the second lens unit.

For the zoom optical system according to the present invention, it is desirable to configure a lens element which is adjacent to the aperture stop on the image side so as to have a surface concave toward the aperture stop. This lens element makes it possible to adequately correct distortion and astigmatism. When the surface disposed on the image side of the aperture stop is an object side surface of the third lens unit in particular, the lens element produces an adequate influence on correction of aberrations by varying the airspace between the second lens unit and the third lens unit, thereby producing an advantage from viewpoints of manufacturing precision and a driving mechanism. It is more effective for correction of aberrations to dispose the second lens unit on the object side of the aperture stop, configure its surface on the side of the aperture stop as a concave surface, dispose the third lens unit on the image side of the aperture stop and configure its surface on the side of the aperture stop as a concave surface. That is, distortion and astigmatism can be corrected favorably by configuring surfaces on the object side and image side of the aperture stop as surfaces which are concave toward the aperture stop.

Further, it is desirable to use at least one aspherical surface in the lens component of the fourth lens unit in each composition of the zoom optical system according to the present invention.

For shortening a total length of a zoom optical system which is composed of four lens units such as that according to the present invention, it is effective to strengthen a power of a fourth lens unit. When the fourth lens unit is composed of a single lens component, lens elements have strong curvature, and it is desirable to correct aberrations of marginal rays such as curvature of field and distortion with aspherical surfaces.

When aspherical surfaces are use in the fourth lens unit for the purpose described above, it is desirable to use at least one aspherical surface which has such a shape as to moderate curvature toward a marginal portion.

Further, it is desirable to configure a negative lens component of the fourth lens unit so as to have a shape which satisfies the above-mentioned condition (2).

Furthermore, it is desirable that the fourth lens unit has a focal length $f_4$ which satisfies the above-mentioned condition (6).

In each composition of the zoom optical system according to the present invention, it is desirable to compose the first lens unit of a negative lens element and a positive lens element. This is a minimum requisite for correcting chromatic aberration produced by the fourth lens unit and imparting a required power for the zoom optical system. It is desirable to compose the first lens unit, in order from the object side, of a negative lens element which has a concave surface on the object side and a positive lens element which has a convex surface on the object side. When the first lens unit is composed as described above, it is possible to correct offaxial aberrations including chromatic aberration more effectively in consideration of the composition of the fourth lens unit.

Moreover, the first lens unit of the zoom optical system according to the present invention satisfies the following condition (11):

$$|f_T/f_1| \leq 0.6 \qquad (11)$$

wherein the reference symbol $f_T$ represents a focal length of the zoom optical system as a whole at its tele position and the reference symbol $f_1$ designates a focal length of the first lens unit.

If the upper limit of 0.6 of the condition (11) is exceeded, the first lens unit will have too strong a power, whereby aberrations of marginal rays are aggravated remarkably in the vicinities of the tele position. Further, such too strong a power of the first lens unit will remarkably aggravates spherical aberration in the vicinities of the tele position in particular when the zoom optical system is focused on an object located at an extremely short distance by moving the second lens unit and the third lens unit as an integral unit, thereby making it difficult to shorten the extremely short distance.

It is more effective to configure the first lens unit so as to satisfy, in place of the above-mentioned condition (11), the following condition (11-1):

$$|f_T/f_1| \leq 0.4 \qquad (11\text{-}1)$$

It is more preferable that the first lens unit has a positive power in the zoom optical system according to the present invention. In other words, it is desirable that the first lens unit satisfies the condition (11-1). If the first lens unit has a negative power, a front lens element will have a large diameter, whereby a camera will undesirably be large. Further, it is more desirable to adopt the upper limit of 0.4 as defined by the condition (11-1) in place of the upper limit of 0.6.

For the zoom optical system according to the present invention, it is desirable to compose the third lens unit, in order from the object side, of a positive lens element which has a concave surface on the object side and a positive lens element, and configure the positive lens elements as aspherical lens elements. The aspherical surfaces effectively correct variations of offaxial aberrations which are caused mainly by the fourth lens unit when a magnification is changed from the wide position to the tele position and provide an advantage for adequate correction of aberrations by adjusting the airspace between the second lens unit and the third lens unit which is made possible by configuring the object side surface of the third lens unit as the concave surface.

Further, selection of a plastic material for the positive lens elements makes it easy to lower a manufacturing cost of the third lens unit, lessen a weight of the third lens unit configure the lens elements as aspherical lens elements. By lessening the weight of the third lens unit, it is possible to lessen a burden on a moving mechanism drive system for focusing.

For minimizing production of chromatic aberration and offaxial aberrations in the third lens unit, it is desirable to compose this lens unit of a combination of a negative lens element and a positive lens element.

Further, it is desirable to select a plastic material for the negative lens element of the fourth lens unit for making it easy to lower a manufacturing cost, lessen a weight and configure the lens element as an aspherical lens element. Since the negative lens element of the fourth lens unit has the deep concave surface on the object side and a large diameter, it can be manufactured remarkably hardly when it is configured as an aspherical lens element. When a plastic material is selected for this lens element, it can be manufactured as an aspherical lens element relatively easily.

When a plastic material is selected for lens element to be disposed in the third lens unit and the fourth lens unit as described above, it is preferable to use the material for at least one positive lens element to be disposed in the third lens unit and a negative lens element to be disposed in the fourth lens unit.

When a pair of positive lens element and negative lens element are made of a plastic material, influences on focusing due to variations of temperature or humidity are cancelled with each other, thereby making it possible to reduce degradation of optical performance due to environmental variations. Further, a plastic material is preferable for lowering a manufacturing cost and lessening a weight.

Further, it is desirable to compose the second lens unit of the zoom optical system according to the present invention of a single lens element.

It is necessary to satisfy the condition (10) for reducing a diameter of a front lens element as described above. It is therefore preferable to configure the second lens unit so as to have a structural length as short as possible. The composition of the second lens unit of a single lens element is advantageous for composing the zoom optical system of a small number of lens elements and lessening a burden on a mechanism driving system for focusing (lessening a weight of the lens unit). Further, it is desirable to configure the lens element as a positive lens element which has a convex surface on the object side.

For the reason described above, it is desirable to compose the second lens unit of a single positive lens element which has a convex surface on the object side.

Furthermore, it is desirable that the zoom optical system according to the present invention satisfies the abovementioned condition (4).

For configuring compact the zoom optical system according to the present invention, it is desirable to compose the optical system as a whole of six lens elements. Speaking more concretely, it is most desirable to compose the zoom optical system of a first lens unit which is composed of two lens elements, a second lens unit which is composed of a single lens element, a third lens unit which is composed of two lens elements and a fourth lens unit which is composed of a single lens element so that the optical system is compact, has high optical performance and can be manufactured at a low cost.

Moreover, it is preferable to configure the fourth lens unit not in a circular shape but in an oval shape reserving an effective portion. The zoom optical system can be compact by configuring the fourth lens unit in the oval shape.

Figure 3A:
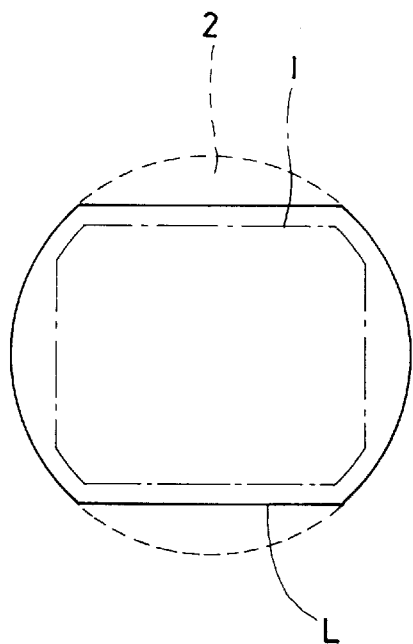
FIGS. 3A and 3B show diagrams illustrating relationship between an effective portion and a shape of a lens element.
Figure 3B:
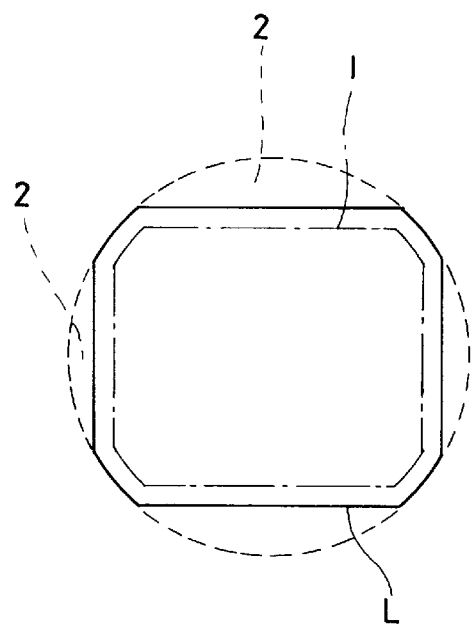

An effective portion of a final lens element of the zoom optical system through which a required light bundle passes has a nearly rectangular shape which is similar to a shape of a film, or upper and lower portions of the final lens element don't serve for imaging a light bundle onto a film surface. Accordingly, a space for disposing a lens driving system, etc. can be formed by cutting off a portion 2 as shown in FIGS. 3A and 3B. Further, right and left side portions can also be cut off as shown in FIG. 3B. In FIGS. 3A and 3B, a reference numeral 1 represents an effective portion and a reference symbol L designates a lens element.

It is preferable to configure the negative lens component of the fourth lens unit as a cemented lens component which consists of a meniscus molded glass lens element having an aspherical surface and a spherical lens element. A refractive index and a shape of a plastic lens element are largely varied by temperature and humidity changes, and a refractive index and a shape of an aspherical surface are varied by temperature and humidity changes even when it is formed with a resin material on a glass base.

The zoom optical system according to the present invention which has an another composition is composed, in order from the object side: of a front lens group which is composed of a lens unit or a plurality of lens units moved along an optical axis for focusing or a magnification change and lens components, and has a positive power as a whole; and a rear lens group which has a negative power: at least one negative lens component disposed in the rear lens group being composed of a cemented lens component consisting of a meniscus molded glass lens element having an aspherical surface and a spherical lens element.

A refractive index and a shape of a plastic lens element are largely varied by temperature and humidity changes, and a refractive index and a shape of an aspherical surface are varied by temperature and humidity changes even when it is formed with a resin material on a glass base as described above. Large differences in physical properties such as hardness between a glass material and a plastic material make it difficult to work into an oval shape.

A glass material can be formed into a meniscus shape relatively easily and at a low cost, and a cemented lens component is not varied by temperature or humidity and can easily be worked.

For this reason, the zoom optical system according to the present invention which has this composition uses the cemented lens component consisting of the meniscus molded glass element having the aspherical surface and the spherical lens element in the rear lens group.

Further, it is desirable to configure the cemented lens component having the aspherical surface as an oval lens component which reserves a required effective portion.

The effective portion (a range through which a required light bundle passes) of the rear lens group has a shape which is similar to that of a film, and upper and lower portions of the rear lens group do not serve for imaging a light bundle onto a film surface. It is possible to dispose parts such as a lens driving system in a space formed by cutting off the portions which do not serve for imaging the light bundle. Needless to say, right and left side portions can also be cut off.

For the zoom optical system according to the present invention which has this composition, it is desirable to configure the front lens group so as to comprise at least one aspherical lens element which has an aspherical surface and form all aspherical lens elements by molding a glass material. When the front lens group is configured as described above, the zoom optical system according to the present invention is a compact optical system having optical performance which can hardly be affected by temperature and humidity variations.

It is desirable that the zoom optical system according to the present invention satisfies, in it collapsed condition, the following condition (12):

$$0 < D_0(i)/D_{min}(i) < 2 \qquad (12)$$

wherein the reference numeral $D_0(i)$ (i=1, 2, 3 or 4) represents an airspace reserved between the lens units in the collapsed condition; $D_0(1)$ being an airspace reserved between the first lens unit and the second lens unit, $D_0(2)$ being an airspace reserved between the second lens unit and the third lens unit, $D_0(3)$ being an airspace reserved between the third lens unit and the fourth lens unit and $D_0(4)$ being an airspace reserved between the fourth lens unit and the image surface; and the reference symbol $D_{min}(i)$ designates a minimum value of each airspace which is variable in the entire zooming region; $D_{min}(1)$ being a minimum value of the airspace reserved between the first lens unit and the second lens unit, $D_{min}(2)$ being a minimum value of the airspace reserved between the second lens unit and the third lens unit, $D_{min}(3)$ being a minimum value of the airspace reserved between the third lens unit and the fourth lens unit and $D_{min}(4)$ being a minimum value of the airspace reserved between the fourth lens unit and the image surface.

Now, the preferred embodiments of the zoom optical system according to the present invention will be described below in a form of numerical data:

Embodiment 1 f = 30.5 ~ 50.0 ~ 87.0, F number = 4.26 ~ 6.97 ~ 12.1
2ω = 57.6° ~ 37.6° ~ 22.2°

$r_1 = -33.415$
  $d_1 = 2.000$    $n_1 = 1.84666$    $\nu_1 = 23.78$
$r_2 = 147.224$
  $d_2 = 0.100$
$r_3 = 25.297$
  $d_3 = 3.469$    $n_2 = 1.55963$    $\nu_2 = 61.17$
$r_4 = -68.702$
  $d_4 = D_1$ (variable)
$r_5 = 17.240$
  $d_5 = 2.693$    $n_3 = 1.84666$    $\nu_3 = 23.78$
$r_6 = 35.617$
  $d_6 = 3.190$
$r_7 = \infty$ (stop)
  $d_7 = D_2$ (variable)
$r_8 = -12.397$
  $d_8 = 2.166$    $n_4 = 1.84666$    $\nu_4 = 23.78$
$r_9 = -22.647$
  $d_9 = 0.905$
$r_{10} = 44.141$
  $d_{10} = 3.249$    $n_5 = 1.52542$    $\nu_5 = 55.78$
$r_{11} = -33.534$ (aspherical surface)
  $d_{11} = D_3$ (variable)
$r_{12} = -12.025$ (aspherical surface)
  $d_{12} = 1.500$    $n_6 = 1.52542$    $\nu_6 = 55.78$
$r_{13} = 73.816$
  $d_{13} = D_4$ (variable)
$r_{14} = \infty$ (image)

aspherical surface coefficients (11th surface)   $K = 0, E = 1.29274 \times 10^{-4}, F = 1.10773 \times 10^{-7}$
                 $G = 8.78090 \times 10^{-9}, H = 1.04715 \times 10^{-10}$
(12th surface)   $K = -0.61890, E = 7.01015 \times 10^{-5}$,
                 $F = -2.35355 \times 10^{-7}, G = 4.25966 \times 10^{-9}$
                 $H = -4.07875 \times 10^{-11}$ variation of airspaces for magnification change

| f     | 30.5   | 50.0  | 87.0  |
|-------|--------|-------|-------|
| $D_1$ | 0.255  | 3.818 | 5.665 |
| $D_2$ | 2.533  | 5.007 | 7.971 |
| $D_3$ | 11.849 | 5.812 | 1.000 |
| $D_4$ | 7.003  | 22.483 | 49.976 |

$\Sigma D_4/y = 0.09$, $(r_F + r_R)/(r_F - r_R) = -0.72$, $\nu_R = 55.8$
$\beta_{4T}/\beta_{4W} = 2.57$, $f_{BW}/f_W = 0.23$, $f_4/f_W = 0.64$, $\beta_{3T} = 0.69$
$y/f_1 = 0.002$, $|f4|/y = 1.13$, $E(W)/f_W = 0.28$,
$|f_T/f_1| = 0.009$
$D_0(1)/D_{min}(1) = 1.00$, $D_0(2)/D_{min}(2) = 1.00$,
$D_0(3)/D_{min}(3) = 1.00$, $D_0(4)/D_{min}(4) = 1.00$

Embodiment 2 f = 30.5 ~ 50.0 ~ 87.0, F number = 4.50 ~ 6.93 ~ 11.13
2ω = 57.6° ~ 38.6° ~ 22.8°

$r_1 = -24.110$
  $d_1 = 2.000$    $n_1 = 1.84666$    $\nu_1 = 23.78$
$r_2 = -47.573$
  $d_2 = 0.100$
$r_3 = 24.424$
  $d_3 = 2.680$    $n_2 = 1.58913$    $\nu_2 = 61.14$
$r_4 = -1958.075$
  $d_4 = D_1$ (variable)
$r_5 = 39.944$
  $d_5 = 2.298$    $n_3 = 1.84666$    $\nu_3 = 23.78$
$r_6 = -46.110$
  $d_6 = 0.200$
$r_7 = \infty$ (stop)
  $d_7 = D_2$ (variable)
$r_8 = -15.350$
  $d_8 = 1.500$    $n_4 = 1.84666$    $\nu_4 = 23.78$
$r_9 = 663.553$
  $d_9 = 2.190$
$r_{10} = 41.169$
  $d_{10} = 4.256$    $n_5 = 1.51633$    $\nu_5 = 64.14$
$r_{11} = -11.673$ (aspherical surface)
  $d_{11} = D_3$ (variable)
$r_{12} = -12.077$ (aspherical surface)
  $d_{12} = 1.500$    $n_6 = 1.51633$    $\nu_6 = 64.14$
$r_{13} = 55.236$
  $d_{13} = D_4$ (variable)
$r_{14} = \infty$ (image)

aspherical surface coefficients (11th surface)   $K = 0, E = 1.19488 \times 10^{-4}, F = 2.93708 \times 10^{-7}$
                 $G = 3.56719 \times 10^{-9}, H = -2.39160 \times 10^{-11}$
(12th surface)   $K = -0.56706, E = 9.22160 \times 10^{-5}$,
                 $F = 5.89930 \times 10^{-7}, G = -1.60795 \times 10^{-8}$
                 $H = 6.92449 \times 10^{-11}$ variation of airspaces for magnification change

| f     | 30.5   | 50.0   | 87.0   |
|-------|--------|--------|--------|
| $D_1$ | 4.567  | 11.092 | 18.709 |
| $D_2$ | 1.923  | 2.929  | 4.238  |
| $D_3$ | 12.092 | 6.087  | 1.000  |
| $D_4$ | 6.998  | 21.281 | 45.864 |

$\Sigma D_4/y = 0.09$, $(r_F + r_R)/(r_F - r_R) = -0.64$, $\nu_R = 64.1$
$\beta_{4T}/\beta_{4W} = 2.45$, $f_{BW}/f_W = 0.23$, $f_4/f_W = 0.62$, $\beta_{3T} = 1.06$
$y/f_1 = 0.151$, $|f4|/y = 1.10$, $E(W)/f_W = 0.29$,
$|f_T/f_1| = 0.761$
$D_0(1)/D_{min}(1) = 0.11$, $D_0(2)/D_{min}(2) = 0.52$,
$D_0(3)/D_{min}(3) = 1.00$, $D_0(4)/D_{min}(4) = 0.57$

Embodiment 3 f = 30.5 ~ 50.0 ~ 87.0, F number = 4.69 ~ 7.06 ~ 10.36
2ω = 59.6° ~ 38.2° ~ 22.8°

$r_1 = -32.463$
  $d_1 = 2.000$    $n_1 = 1.76182$    $\nu_1 = 26.52$
$r_2 = -59.590$
  $d_2 = 0.100$

-continued $f = 30.5 \sim 50.0 \sim 87.0$, F number = $4.69 \sim 7.06 \sim 10.36$
$2\omega = 59.6° \sim 38.2° \sim 22.8°$

| | | | |
|---|---|---|---|
| $r_3 = 18.025$ | | | |
| | $d_3 = 3.096$ | $n_2 = 1.60311$ | $\nu_2 = 60.64$ |
| $r_4 = 56.280$ | | | |
| | $d_4 = D_1$ (variable) | | |
| $r_5 = -22.857$ (aspherical surface) | | | |
| | $d_5 = 4.075$ | $n_3 = 1.52542$ | $\nu_3 = 55.78$ |
| $r_6 = -16.117$ | | | |
| | $d_6 = 0.200$ | | |
| $r_7 = \infty$ (stop) | | | |
| | $d_7 = D_2$ (variable) | | |
| $r_8 = 60.548$ | | | |
| | $d_8 = 2.803$ | $n_4 = 1.84666$ | $\nu_4 = 23.78$ |
| $r_9 = 36.519$ | | | |
| | $d_9 = 1.201$ | | |
| $r_{10} = -1796.395$ | | | |
| | $d_{10} = 2.790$ | $n_5 = 1.51633$ | $\nu_5 = 64.14$ |
| $r_{11} = -14.086$ (aspherical surface) | | | |
| | $d_{11} = D_3$ (variable) | | |
| $r_{12} = -12.913$ (aspherical surface) | | | |
| | $d_{12} = 1.500$ | $n_6 = 1.48749$ | $\nu_6 = 70.23$ |
| $r_{13} = 46.171$ | | | |
| | $d_{13} = D_4$ (variable) | | |
| $r_{14} = \infty$ (image) | | | | aspherical surface coefficients (5th surface) $\quad K = 0, E = -1.18339 \times 10^{-4}, F = -9.04268 \times 10^{-7}$
$\quad G = 3.98631 \times 10^{-8}, H = 0$
(11th surface) $\quad K = 0, E = 5.31821 \times 10^{-5}, F = -3.78901 \times 10^{-7}$,
$\quad G = 1.47543 \times 10^{-8}, H = 0$
(12th surface) $\quad K = -0.54800, E = 1.11357 \times 10^{-4}$,
$\quad F = 5.01932 \times 10^{-7}, G = -1.00759 \times 10^{-8}$,
$\quad H = 4.60521 \times 10^{-11}$ variation of airspaces for magnification change

| f | 30.5 | 50.0 | 87.0 |
|---|---|---|---|
| $D_1$ | 1.779 | 7.191 | 16.524 |
| $D_2$ | 3.459 | 1.892 | 5.052 |
| $D_3$ | 11.602 | 6.098 | 1.053 |
| $D_4$ | 6.999 | 23.224 | 44.070 |

$\Sigma D_4/y = 0.09$, $(r_F + r_R)/(r_F - r_R) = -0.56$, $\nu_R = 70.2$
$\beta_{4T}/\beta_{4W} = 2.30$, $f_{BW}/f_W = 0.23$, $f_4/f_W = 0.67$, $\beta_{3T} = 0.58$
$y/f_1 = 0.234$, $|f4|/y = 1.19$, $E(W)/f_W = 0.26$,
$|f_T/f_1| = 1.177$ Embodiment 4

$f = 30.5 \sim 60.0 \sim 117.0$, F number = $3.90 \sim 7.04 \sim 11.71$
$2\omega = 59.6° \sim 31.6° \sim 16.8°$

| | | | |
|---|---|---|---|
| $r_1 = 30.833$ | | | |
| | $d_1 = 4.166$ | $n_1 = 1.84666$ | $\nu_1 = 23.78$ |
| $r_2 = 24.289$ | | | |
| | $d_2 = 0.100$ | | |
| $r_3 = 22.307$ | | | |
| | $d_3 = 3.580$ | $n_2 = 1.48749$ | $\nu_2 = 70.23$ |
| $r_4 = 56.120$ | | | |
| | $d_4 = D_1$ (variable) | | |
| $r_5 = \infty$ (stop) | | | |
| | $d_5 = 1.691$ | | |
| $r_6 = -10.374$ | | | |
| | $d_6 = 1.500$ | $n_3 = 1.63930$ | $\nu_3 = 44.87$ |
| $r_7 = -18.850$ | | | |
| | $d_7 = 0.200$ | | |
| $r_8 = 49.204$ | | | |
| | $d_8 = 3.256$ | $n_4 = 1.56384$ | $\nu_4 = 60.67$ |
| $r_9 = -11.983$ (aspherical surface) | | | |
| | $d_9 = D_2$ (variable) | | |
| $r_{10} = -165.021$ | | | |
| | $d_{10} = 1.500$ | $n_5 = 1.78800$ | $\nu_5 = 47.37$ |
| $r_{11} = 25.722$ | | | |
| | $d_{11} = 1.769$ | | |
| $r_{12} = -379.466$ | | | |
| | $d_{12} = 4.269$ | $n_6 = 1.60311$ | $\nu_6 = 60.64$ |

-continued $f = 30.5 \sim 60.0 \sim 117.0$, F number = $3.90 \sim 7.04 \sim 11.71$
$2\omega = 59.6° \sim 31.6° \sim 16.8°$

| | | | |
|---|---|---|---|
| $r_{13} = -12.261$ | | | |
| | $d_{13} = D_3$ (variable) | | |
| $r_{14} = -11.302$ (aspherical surface) | | | |
| | $d_{14} = 1.500$ | $n_7 = 1.48749$ | $\nu_7 = 70.23$ |
| $r_{15} = 55.984$ | | | |
| | $d_{15} = D_4$ (variable) | | |
| $r_{16} = \infty$ (image) | | | | aspherical surface coefficients (9th surface) $\quad K = 1.34221, E = 2.75220 \times 10^{-4}$,
$\quad F = 6.11657 \times 10^{-7}, G = 6.53307 \times 10^{-8}$,
$\quad H = -6.04534 \times 10^{-10}$
(14th surface) $\quad K = -0.09533, E = 1.04960 \times 10^{-4}$,
$\quad F = 1.20141 \times 10^{-7}, G = 5.65953 \times 10^{-9}$,
$\quad H = 0$ variation of airspaces for magnification change

| f | 30.5 | 60.0 | 117.0 |
|---|---|---|---|
| $D_1$ | 1.147 | 10.942 | 26.870 |
| $D_2$ | 3.321 | 1.706 | 0.200 |
| $D_3$ | 10.057 | 4.613 | 2.047 |
| $D_4$ | 6.998 | 30.414 | 67.350 |

$\Sigma D_4/y = 0.09$, $(r_F + r_R)/(r_F - r_R) = -0.66$, $\nu_R = 70.2$
$\beta_{4T}/\beta_{4W} = 3.23$, $f_{BW}/f_W = 0.23$, $f_4/f_W = 0.63$, $\beta_{3T} = 0.82$
$y/f_1 = 0.129$, $|f4|/y = 1.11$, $E(W)/f_W = 0.22$,
$|f_T/f_1| = 0.870$ Embodiment 5

$f = 30.5 \sim 60.0 \sim 117.0$, F number = $3.27 \sim 6.43 \sim 12.52$
$2\omega = 61.6° \sim 33.2° \sim 16.8°$

| | | | |
|---|---|---|---|
| $r_1 = 17.684$ | | | |
| | $d_1 = 2.000$ | $n_1 = 1.80518$ | $\nu_1 = 25.42$ |
| $r_2 = -48.592$ | | | |
| | $d_2 = 0.100$ | | |
| $r_3 = 115.032$ | | | |
| | $d_3 = 3.313$ | $n_2 = 1.51633$ | $\nu_2 = 64.14$ |
| $r_4 = -24.247$ | | | |
| | $d_4 = D_1$ (variable) | | |
| $r_5 = \infty$ (stop) | | | |
| | $d_5 = 0.800$ | | |
| $r_6 = 181.092$ | | | |
| | $d_6 = 5.000$ | $n_3 = 1.84666$ | $\nu_3 = 23.78$ |
| $r_7 = -50.066$ | | | |
| | $d_7 = D_2$ (variable) | | |
| $r_8 = -17.228$ (aspherical surface) | | | |
| | $d_8 = 5.000$ | $n_4 = 1.51633$ | $\nu_4 = 64.14$ |
| $r_9 = -12.792$ | | | |
| | $d_9 = 0.200$ | | |
| $r_{10} = -44.027$ | | | |
| | $d_{10} = 3.280$ | $n_5 = 1.80518$ | $\nu_5 = 25.42$ |
| $r_{11} = 56.132$ | | | |
| | $d_{11} = 4.782$ | $n_6 = 1.56883$ | $\nu_6 = 56.36$ |
| $r_{12} = -15.554$ | | | |
| | $d_{12} = D_3$ (variable) | | |
| $r_{13} = -20.097$ (aspherical surface) | | | |
| | $d_{13} = 1.5000$ | $n_7 = 1.72916$ | $\nu_7 = 54.68$ |
| $r_{14} = 51.095$ | | | |
| | $d_{14} = D_4$ (variable) | | |
| $r_{15} = \infty$ (image) | | | | aspherical surface coefficients (8th surface) $\quad K = 0.32946, E = -1.55754 \times 10^{-4}$,
$\quad F = -1.24055 \times 10^{-6}, G = 2.57622 \times 10^{-8}$,
$\quad H = -4.82018 \times 10^{-10}$
(13th surface) $\quad K = -0.28327, E = 4.34900 \times 10^{-5}$,
$\quad F = -3.75099 \times 10^{-8}, G = 3.31480 \times 10^{-10}$,
$\quad H = -3.16708 \times 10^{-12}$ variation of airspaces for magnification change

| f | 30.5 | 60.0 | 117.0 |
|---|---|---|---|
| $D_1$ | 1.000 | 10.563 | 19.517 |

-continued $$f = 30.5 \sim 60.0 \sim 117.0, \text{ F number} = 3.27 \sim 6.43 \sim 12.52$$
$$2\omega = 61.6° \sim 33.2° \sim 16.8°$$

| | | | |
|---|---|---|---|
| $D_2$ | 5.617 | 14.145 | 18.217 |
| $D_3$ | 13.984 | 5.520 | 0.200 |
| $D_4$ | 6.996 | 25.834 | 62.591 |

$\Sigma D_4/y = 0.09$, $(r_F + r_R)/(r_F - r_R) = -0.44$, $\nu_R = 54.7$
$\beta_{4T}/\beta_{4W} = 3.04$, $f_{BW}/f_W = 0.23$, $f_4/f_W = 0.64$, $\beta_{3T} = 0.66$
$y/f_1 = 0.002$, $|f4|/y = 1.13$, $E(W)/f_W = 0.13$,
$|f_T/f_1| = 0.014$

Embodiment 6

$$f = 30.5 \sim 50.0 \sim 87.0, \text{ F number} = 4.48 \sim 6.43 \sim 10.06$$
$$2\omega = 57.6° \sim 37.0° \sim 22.2°$$

| | | | |
|---|---|---|---|
| $r_1 = 15.733$ | | | |
| | $d_1 = 4.007$ | $n_1 = 1.48960$ | $\nu_1 = 68.53$ |
| $r_2 = 42.487$ | | | |
| | $d_2 = 1.500$ | $n_2 = 1.84666$ | $\nu_2 = 23.78$ |
| $r_3 = 32.035$ | | | |
| | $d_3 = D_1$ (variable) | | |
| $r_4 = 38.650$ | | | |
| | $d_4 = 2.345$ | $n_3 = 1.84666$ | $\nu_3 = 23.78$ |
| $r_5 = 97.253$ | | | |
| | $d_5 = D_2$ (variable) | | |
| $r_6 = -16.046$ | | | |
| | $d_6 = 2.729$ | $n_4 = 1.84666$ | $\nu_4 = 23.78$ |
| $r_7 = -54.905$ | | | |
| | $d_7 = 0.200$ | | |
| $r_8 = \infty$ (stop) | | | |
| | $d_8 = 3.153$ | | |
| $r_9 = 60.542$ | | | |
| | $d_9 = 3.449$ | $n_5 = 1.75581$ | $\nu_5 = 44.04$ |
| $r_{10} = -17.190$ (aspherical surface) | | | |
| | $d_{10} = D_3$ (variable) | | |
| $r_{11} = -20.641$ (aspherical surface) | | | |
| | $d_{11} = 0.300$ | $n_6 = 1.52288$ | $\nu_6 = 52.50$ |
| $r_{12} = -25.593$ | | | |
| | $d_{12} = 1.500$ | $n_7 = 1.72916$ | $\nu_7 = 54.68$ |
| $r_{13} = 70.216$ | | | |
| | $d_{13} = D_4$ (variable) | | |
| $r_{14} = \infty$ (image) | | | | aspherical surface coefficients (10th surface) $K = 0$, $E = 7.87194 \times 10^{-5}$, $F = -8.24497 \times 10^{-7}$,
$G = 3.55424 \times 10^{-8}$, $H = -4.63116 \times 10^{-10}$
(11th surface) $K = 0.79521$, $E = 8.41455 \times 10^{-5}$,
$F = -1.43845 \times 10^{-7}$, $G = 4.10744 \times 10^{-9}$,
$H = -2.90057 \times 10^{-11}$ variation of airspaces for magnification change

| f | 30.5 | 50.0 | 87.0 |
|---|---|---|---|
| $D_1$ | 1.132 | 8.191 | 14.285 |
| $D_2$ | 2.268 | 1.728 | 0.610 |
| $D_3$ | 12.496 | 5.976 | 1.000 |
| $D_4$ | 5.997 | 20.397 | 47.182 |

$\Sigma D_4/y = 0.10$, $(r_F + r_R)/(r_F - r_R) = -0.47$, $\nu_R = 54.7$
$\beta_{4T}/\beta_{4W} = 2.40$, $f_{BW}/f_W = 0.20$, $f_4/f_W = 0.74$, $\beta_{3T} = 0.68$
$y/f_1 = 0.267$, $|f4|/y = 1.31$, $E(W)/f_W = 0.45$,
$|f_T/f_1| = 1.343$

Embodiment 7

$$f = 30.5 \sim 50.0 \sim 87.0, \text{ F number} = 4.62 \sim 7.49 \sim 11.79$$
$$2\omega = 58.0° \sim 38.2° \sim 22.6°$$

| | | | |
|---|---|---|---|
| $r_1 = 14.265$ (aspherical surface) | | | |
| | $d_1 = 2.877$ | $n_1 = 1.48749$ | $\nu_1 = 70.23$ |
| $r_2 = 16.408$ | | | |
| | $d_2 = D_1$ (variable) | | |
| $r_3 = -40.180$ (aspherical surface) | | | |
| | $d_3 = 5.000$ | $n_2 = 1.84666$ | $\nu_2 = 23.78$ |

-continued $$f = 30.5 \sim 50.0 \sim 87.0, \text{ F number} = 4.62 \sim 7.49 \sim 11.79$$
$$2\omega = 58.0° \sim 38.2° \sim 22.6°$$

| | | | |
|---|---|---|---|
| $r_4 = -33.347$ | | | |
| | $d_4 = D_2$ (variable) | | |
| $r_5 = \infty$ (stop) | | | |
| | $d_5 = 1.363$ | | |
| $r_6 = -12.206$ | | | |
| | $d_6 = 1.500$ | $n_3 = 1.84666$ | $\nu_3 = 23.78$ |
| $r_7 = -24.830$ | | | |
| | $d_7 = 0.200$ | | |
| $r_8 = 111.808$ | | | |
| | $d_8 = 4.395$ | $n_4 = 1.74320$ | $\nu_4 = 49.34$ |
| $r_9 = -13.524$ (aspherical surface) | | | |
| | $d_9 = D_3$ (variable) | | |
| $r_{10} = -28.673$ (aspherical surface) | | | |
| | $d_{10} = 0.300$ | $n_5 = 1.52288$ | $\nu_5 = 52.50$ |
| $r_{11} = -28.814$ | | | |
| | $d_{11} = 1.500$ | $n_6 = 1.48749$ | $\nu_6 = 70.23$ |
| $r_{12} = 34.894$ | | | |
| | $d_{12} = D_4$ (variable) | | |
| $r_{13} = \infty$ (image) | | | | aspherical surface coefficients (1th surface) $K = -0.04241$, $E = -1.95169 \times 10^{-6}$,
$F = -5.29827 \times 10^{-8}$, $G = 1.31657 \times 10^{-9}$,
$H = -1.16614 \times 10^{-11}$
(3th surface) $K = 0$, $E = -3.73845 \times 10^{-5}$, $F = 4.21185 \times 10^{-7}$,
$G = -9.35462 \times 10^{-9}$, $H = 8.25452 \times 10^{-11}$
(9th surface) $K = 0$, $E = 5.79527 \times 10^{-5}$, $F = -2.68017 \times 10^{-7}$,
$G = 4.14949 \times 10^{-8}$, $H = -2.00555 \times 10^{-9}$
(10th surface) $K = 2.28144$, $E = 5.91867 \times 10^{-5}$,
$F = -9.37737 \times 10^{-7}$, $G = 1.10034 \times 10^{-8}$,
$H = -5.17760 \times 10^{-11}$ variation of airspaces for magnification change

| f | 30.5 | 50.0 | 87.0 |
|---|---|---|---|
| $D_1$ | 2.636 | 9.810 | 21.425 |
| $D_2$ | 4.290 | 0.484 | 0.800 |
| $D_3$ | 17.148 | 7.321 | 1.000 |
| $D_4$ | 6.891 | 31.533 | 69.988 |

$\Sigma D_4/y = 0.10$, $(r_F + r_R)/(r_F - r_R) = -0.10$, $\nu_R = 70.2$
$\beta_{4T}/\beta_{4W} = 2.59$, $f_{BW}/f_W = 0.23$, $f_4/f_W = 1.05$, $\beta_{3T} = 0.29$
$y/f_1 = 0.111$, $|f4|/y = 1.85$, $E(W)/f_W = 0.43$,
$|f_T/f_1| = 0.559$

Embodiment 8

$$f = 39.1 \sim 75.0 \sim 145.5, \text{ F number} = 4.36 \sim 6.70 \sim 11.00$$
$$2\omega = 46.4° \sim 26.0° \sim 13.6°$$

| | | | |
|---|---|---|---|
| $r_1 = -28.390$ | | | |
| | $d_1 = 2.494$ | $n_1 = 1.84666$ | $\nu_1 = 23.78$ |
| $r_2 = -92.579$ | | | |
| | $d_2 = 0.125$ | | |
| $r_3 = 85.188$ | | | |
| | $d_3 = 3.571$ | $n_2 = 1.48749$ | $\nu_2 = 70.23$ |
| $r_4 = -33.911$ | | | |
| | $d_4 = D_1$ (variable) | | |
| $r_5 = 26.716$ | | | |
| | $d_5 = 2.660$ | $n_3 = 1.84666$ | $\nu_3 = 23.78$ |
| $r_6 = 52.926$ | | | |
| | $d_6 = 5.303$ | | |
| $r_7 = \infty$ (stop) | | | |
| | $d_7 = D_2$ (variable) | | |
| $r_8 = -16.233$ | | | |
| | $d_8 = 1.500$ | $n_4 = 1.84666$ | $\nu_4 = 23.78$ |
| $r_9 = -28.266$ | | | |
| | $d_9 = 1.211$ | | |
| $r_{10} = 61.727$ | | | |
| | $d_{10} = 5.000$ | $n_5 = 1.52542$ | $\nu_5 = 55.78$ |
| $r_{11} = -16.849$ (aspherical surface) | | | |
| | $d_{11} = D_3$ (variable) | | |
| $r_{12} = -14.163$ (aspherical surface) | | | |
| | $d_{12} = 2.000$ | $n_6 = 1.52542$ | $\nu_6 = 55.78$ |
| $r_{13} = 81.186$ | | | |

-continued $f = 39.1 \sim 75.0 \sim 145.5$, F number = 4.36 ~ 6.70 ~ 11.00
$2\omega = 46.4° \sim 26.0° \sim 13.6°$

| | | | |
|---|---|---|---|
| | $d_{13} = D_4$ (variable) | | |
| $r_{14} = \infty$ (image) | | | | aspherical surface coefficients (11th surface)  $K = 0$, $E = 3.49942 \times 10^{-5}$, $F = 4.49980 \times 10^{-7}$,
$G = 3.33849 \times 10^{-10}$, $H = -1.91736 \times 10^{-10}$
(12th surface)  $K = -0.64236$, $E = 2.55484 \times 10^{-5}$,
$F = 7.33897 \times 10^{-7}$, $G = -1.36011 \times 10^{-8}$,
$H = 5.71927 \times 10^{-11}$ variation of airspaces for magnification change

| f | 39.1 | 75.0 | 145.5 |
|---|---|---|---|
| $D_1$ | 0.200 | 9.132 | 17.978 |
| $D_2$ | 3.297 | 13.431 | 20.926 |
| $D_3$ | 18.629 | 8.495 | 1.000 |
| $D_4$ | 7.000 | 27.419 | 64.287 |

$\Sigma D_4/y = 0.12$, $(r_F + r_R)/(r_F - r_R) = -0.70$, $\nu_R = 55.78$
$\beta_{4T}/\beta_{4W} = 2.85$, $f_{BW}/f_W = 0.18$, $f_4/f_W = 0.58$, $\beta_{3T} = 0.70$
$y/f_1 = 0.020$, $|f_4|/y = 1.32$, $E(W)/f_W = 0.27$,
$|f_T/f_1| = 0.167$

Embodiment 9

$f = 25.8 \sim 50.0 \sim 97.0$, F number = 4.6 ~ 6.6 ~ 9.5
$2\omega = 66.50° \sim 39.26° \sim 20.46°$

| | | | |
|---|---|---|---|
| $r_1 = -27.1166$ | | | |
| | $d_1 = 1.5000$ | $n_1 = 1.84666$ | $\nu_1 = 23.78$ |
| $r_2 = -77.9057$ | | | |
| | $d_2 = 0.2762$ | | |
| $r_3 = 102.5940$ | | | |
| | $d_3 = 2.6646$ | $n_2 = 1.48749$ | $\nu_2 = 70.23$ |
| $r_4 = -32.0143$ | | | |
| | $d_4 = D_1$ (variable) | | |
| $r_5 = 13.2780$ | | | |
| | $d_5 = 1.9957$ | $n_3 = 1.72825$ | $\nu_3 = 28.46$ |
| $r_6 = 20.3381$ | | | |
| | $d_6 = 4.4624$ | | |
| $r_7 = \infty$ (stop) | | | |
| | $d_7 = D_2$ (variable) | | |
| $r_8 = -10.2463$ | | | |
| | $d_8 = 1.2235$ | $n_4 = 1.80518$ | $\nu_4 = 25.42$ |
| $r_9 = -15.4261$ | | | |
| | $d_9 = 1.2066$ | | |
| $r_{10} = 27.0204$ | | | |
| | $d_{10} = 4.2278$ | $n_5 = 1.51633$ | $\nu_5 = 64.14$ |
| $r_{11} = -12.1006$ (aspherical surface) | | | |
| | $d_{11} = D_3$ (variable) | | |
| $r_{12} = -10.2640$ (aspherical surface) | | | |
| | $d_{12} = 1.500$ | $n_6 = 1.69680$ | $\nu_6 = 55.53$ |
| $r_{13} = 483.1490$ | | | |
| | $d_{13} = D_4$ (variable) | | |
| $r_{14} = \infty$ (image) | | | | aspherical surface coefficients (11th surface)  $K = 0.1841$, $E = 1.6352 \times 10^{-4}$,
$F = 6.2157 \times 10^{-7}$, $G = -1.7728 \times 10^{-10}$,
$H = -8.1699 \times 10^{-11}$
(12th surface)  $K = -1.3391$, $E = 2.1631 \times 10^{-5}$,
$F = -1.5789 \times 10^{-10}$, $G = -7.9115 \times 10^{-9}$,
$H = 4.2279 \times 10^{-12}$ variation of airspaces for magnification change

| f | 25.8 | 50.0 | 97.0 |
|---|---|---|---|
| $D_1$ | 0.49468 | 7.33918 | 14.45283 |
| $D_2$ | 1.39532 | 6.13105 | 10.62890 |
| $D_3$ | 10.93606 | 5.56265 | 1.95054 |
| $D_4$ | 4.99560 | 20.29303 | 46.91614 |

$y = 17.30$, $f_1 = 1074.15$, $\Sigma D_4 = 1.50$, $f_4 = -14.41$
$\beta_{4T} = 4.32$, $\beta_{4W} = 1.41$, $f_{BW} = 5.00$, $f_W = 25.80$
$y/f_1 = 0.016$, $\Sigma D_4/y = 0.087$, $|f_4|/y = 0.833$, $\nu_R = 55.530$
$\beta_{4T}/\beta_{4W} = 3.069$, $f_{BW}/f_W = 0.194$, $|\beta_{3T}| = 0.522$
$(r_F + r_R)/(r_F - r_R) = -0.96$, $f_4/f_W = 0.56$, $E(W)/f_W = 0.36$ -continued $f = 25.8 \sim 50.0 \sim 97.0$, F number = 4.6 ~ 6.6 ~ 9.5
$2\omega = 66.50° \sim 39.26° \sim 20.46°$ $|f_T/f_1| = 0.090$

Embodiment 10

$f = 25.8 \sim 50.0 \sim 97.0$, F number = 4.6 ~ 6.6 ~ 9.5
$2\omega = 66.82° \sim 39.00° \sim 20.54°$

| | | | |
|---|---|---|---|
| $r_1 = -26.9886$ | | | |
| | $d_1 = 1.5000$ | $n_1 = 1.84666$ | $\nu_1 = 23.78$ |
| $r_2 = -79.3757$ | | | |
| | $d_2 = 0.2764$ | | |
| $r_3 = 95.4591$ | | | |
| | $d_3 = 2.5060$ | $n_2 = 1.48749$ | $\nu_2 = 70.23$ |
| $r_4 = -33.7409$ | | | |
| | $d_4 = D_1$ (variable) | | |
| $r_5 = 13.1491$ | | | |
| | $d_5 = 1.9920$ | $n_3 = 1.71736$ | $\nu_3 = 29.51$ |
| $r_6 = 20.7672$ | | | |
| | $d_6 = 4.8070$ | | |
| $r_7 = \infty$ (stop) | | | |
| | $d_7 = D_2$ (variable) | | |
| $r_8 = -10.6979$ | | | |
| | $d_8 = 1.2731$ | $n_4 = 1.80518$ | $\nu_4 = 25.42$ |
| $r_9 = -17.4594$ | | | |
| | $d_9 = 0.3457$ | | |
| $r_{10} = 32.4289$ | | | |
| | $d_{10} = 1.9994$ | $n_5 = 1.53172$ | $\nu_5 = 48.84$ |
| $r_{11} = -59.7777$ | | | |
| | $d_{11} = 0.7706$ | | |
| $r_{12} = 121.1517$ | | | |
| | $d_{12} = 3.0524$ | $n_6 = 1.51633$ | $\nu_6 = 64.14$ |
| $r_{13} = -13.2184$ (aspherical surface) | | | |
| | $d_{13} = D_3$ (variable) | | |
| $r_{14} = -9.7829$ (aspherical surface) | | | |
| | $d_{14} = 1.5000$ | $n_7 = 1.69680$ | $\nu_7 = 55.53$ |
| $r_{15} = 282.8806$ | | | |
| | $d_{15} = D_4$ (variable) | | |
| $r_{16} = \infty$ (image) | | | | aspherical surface coefficients (13th surface)  $K = -0.1264$, $E = 1.3930 \times 10^{-4}$,
$F = 8.8210 \times 10^{-8}$, $G = 4.3852 \times 10^{-9}$,
$H = 2.0624 \times 10^{-10}$
(14th surface)  $K = -1.2746$, $E = 3.1937 \times 10^{-5}$,
$F = 3.9147 \times 10^{-7}$, $G = -1.7833 \times 10^{-8}$,
$H = 6.3622 \times 10^{-11}$ variation of airspaces for magnification change

| f | 25.8 | 50.0 | 97.0 |
|---|---|---|---|
| $D_1$ | 0.50481 | 6.54922 | 13.59051 |
| $D_2$ | 1.47742 | 6.36732 | 10.52597 |
| $D_3$ | 9.66820 | 4.70712 | 1.41972 |
| $D_4$ | 5.24358 | 20.03919 | 46.37990 |

$y = 17.30$, $f_1 = 9999.58$, $\Sigma D_4 = 1.50$, $f_4 = -13.54$
$\beta_{4T} = 4.49$, $\beta_{4W} = 1.45$, $f_{BW} = 5.24$, $f_W = 25.80$
$y/f_1 = 0.002$, $\Sigma D_4/y = 0.087$, $|f_4|/y = 0.783$, $\nu_R = 55.530$
$\beta_{4T}/\beta_{4W} = 3.095$, $f_{BW}/f_W = 0.203$, $|\beta_{3T}| = 0.508$
$(r_F + r_R)/(r_F - r_R) = -0.93$, $f_4/f_W = 0.53$, $E(W)/f_W = 0.38$
$|f_T/f_1| = 0.010$

Embodiment 11

$f = 23.2 \sim 45.0 \sim 87.3$, F number = 4.6 ~ 7.3 ~ 11.5
$2\omega = 74.86° \sim 42.70° \sim 23.08°$

| | | | |
|---|---|---|---|
| $r_1 = -26.6265$ | | | |
| | $d_1 = 1.5000$ | $n_1 = 1.84666$ | $\nu_1 = 23.78$ |
| $r_2 = -60.3264$ | | | |
| | $d_2 = 0.2589$ | | |
| $r_3 = 67.8623$ | | | |

-continued $f = 23.2 \sim 45.0 \sim 87.3$, F number $= 4.6 \sim 7.3 \sim 11.5$
$2\omega = 74.86° \sim 42.70° \sim 23.08°$

|  |  |  |  |
|---|---|---|---|
| | $d_3 = 3.2800$ | $n_2 = 1.48749$ | $\nu_2 = 70.23$ |
| $r_4 = -37.1229$ | | | |
| | $d_4 = D_1$ (variable) | | |
| $r_5 = 12.4220$ | | | |
| | $d_5 = 2.0932$ | $n_3 = 1.72825$ | $\nu_3 = 28.46$ |
| $r_6 = 16.6622$ | | | |
| | $d_6 = 2.8917$ | | |
| $r_7 = \infty$ (stop) | | | |
| | $d_7 = D_2$ (variable) | | |
| $r_8 = -9.1930$ | | | |
| | $d_8 = 1.4935$ | $n_4 = 1.80518$ | $\nu_4 = 25.43$ |
| $r_9 = -12.6836$ | | | |
| | $d_9 = 0.2000$ | | |
| $r_{10} = 22.9266$ | | | |
| | $d_{10} = 5.4107$ | $n_5 = 1.48749$ | $\nu_5 = 70.23$ |
| $r_{11} = -10.8680$ (aspherical surface) | | | |
| | $d_{11} = D_3$ (variable) | | |
| $r_{12} = -9.8042$ (aspherical surface) | | | |
| | $d_{12} = 1.5000$ | $n_6 = 1.72916$ | $\nu_6 = 54.68$ |
| $r_{13} = 1636.6644$ | | | |
| | $d_{13} = D_4$ (variable) | | |
| $r_{14} = \infty$ (image) | | | | aspherical surface coefficients (11th surface) $\quad K = 0$, $E = 1.9704 \times 10^{-4}$, $F = 1.7680 \times 10^{-6}$,
$\quad G = -2.4167 \times 10^{-8}$, $H = -1.8315 \times 10^{-16}$
(12th surface) $\quad K = -1.6076$, $E = -4.4969 \times 10^{-6}$,
$\quad F = 1.1775 \times 10^{-6}$, $G = -2.4335 \times 10^{-8}$,
$\quad H = 8.7355 \times 10^{-11}$ variation of airspaces for magnification change

| f | 23.2 | 45.0 | 87.3 |
|---|---|---|---|
| $D_1$ | 0.55421 | 6.77774 | 15.83360 |
| $D_2$ | 2.13876 | 7.28479 | 12.01005 |
| $D_3$ | 9.56067 | 4.75116 | 1.48506 |
| $D_4$ | 4.49962 | 17.76807 | 39.59696 |

$y = 17.30$, $f_1 = 261.74$, $\Sigma D_4 = 1.50$, $f_4 = -13.36$
$\beta_{4T} = 4.03$, $\beta_{4W} = 1.40$, $f_{BW} = 4.50$, $f_W = 23.20$
$y/f_1 = 0.066$, $\Sigma D_4/y = 0.087$, $|f_4|/y = 0.772$, $\nu_R = 54.680$
$\beta_{4T}/\beta_{4W} = 2.875$, $f_{BW}/f_W = 0.194$, $|\beta_{3T}| = 0.475$
$(r_F + r_R)/(r_F - r_R) = -0.99$, $f_4/f_W = 0.58$, $E(W)/f_W = 0.35$
$|f_T/f_1| = 0.334$ Embodiment 12

$f = 23.3 \sim 47.7 \sim 97.0$, F number $= 4.6 \sim 7.3 \sim 11.5$
$2\omega = 73.60° \sim 41.58° \sim 20.64°$

|  |  |  |  |
|---|---|---|---|
| $r_1 = -26.8442$ | | | |
| | $d_1 = 1.5000$ | $n_1 = 1.84666$ | $\nu_1 = 23.78$ |
| $r_2 = -70.5797$ | | | |
| | $d_2 = 0.1449$ | | |
| $r_3 = 37.4414$ | | | |
| | $d_3 = 3.1808$ | $n_2 = 1.48749$ | $\nu_2 = 70.23$ |
| $r_4 = -64.0264$ | | | |
| | $d_4 = D_1$ (variable) | | |
| $r_5 = 12.7493$ (aspherical surface) | | | |
| | $d_5 = 2.0195$ | $n_3 = 1.72825$ | $\nu_3 = 28.46$ |
| $r_6 = 18.8406$ | | | |
| | $d_6 = 3.0428$ | | |
| $r_7 = \infty$ (stop) | | | |
| | $d_7 = D_2$ (variable) | | |
| $r_8 = -9.1301$ | | | |
| | $d_8 = 1.5428$ | $n_4 = 1.80518$ | $\nu_4 = 25.42$ |
| $r_9 = -12.3479$ | | | |
| | $d_9 = 0.2000$ | | |
| $r_{10} = 19.8198$ | | | |
| | $d_{10} = 5.2664$ | $n_5 = 1.48749$ | $\nu_5 = 70.23$ |
| $r_{11} = -12.2303$ (aspherical surface) | | | |
| | $d_{11} = D_3$ (variable) | | |
| $r_{12} = -9.6622$ (aspherical surface) | | | |
| | $d_{12} = 1.5000$ | $n_6 = 1.72916$ | $\nu_6 = 54.68$ |
| $r_{13} = 1270.6906$ | | | |

-continued $f = 23.3 \sim 47.7 \sim 97.0$, F number $= 4.6 \sim 7.3 \sim 11.5$
$2\omega = 73.60° \sim 41.58° \sim 20.64°$

|  |  |  |  |
|---|---|---|---|
| | $d_{13} = D_4$ (variable) | | |
| $r_{14} = \infty$ (image) | | | | aspherical surface coefficients (5th surface) $\quad K = 0$, $E = 5.4751 \times 10^{-6}$, $F = 3.0824 \times 10^{-7}$,
$\quad G = -4.8250 \times 10^{-9}$, $H = -1.8072 \times 10^{-13}$
(11th surface) $\quad K = -0.0649$, $E = 1.9397 \times 10^{-4}$,
$\quad F = 1.0963 \times 10^{-6}$, $G = -5.2102 \times 10^{-8}$,
$\quad H = 7.7101 \times 10^{-10}$
(12th surface) $\quad K = -1.1814$, $E = 5.8573 \times 10^{-5}$,
$\quad F = 2.7718 \times 10^{-7}$, $G = -1.7293 \times 10^{-8}$,
$\quad H = 3.3709 \times 10^{-11}$ variation of airspaces for magnification change

| f | 23.3 | 47.7 | 97.0 |
|---|---|---|---|
| $D_1$ | 0.54306 | 7.07095 | 12.94157 |
| $D_2$ | 2.14139 | 6.13960 | 9.46476 |
| $D_3$ | 9.12343 | 4.10938 | 1.09997 |
| $D_4$ | 4.50047 | 20.40028 | 50.07177 |

$y = 17.30$, $f_1 = 481.08$, $\Sigma D_4 = 1.50$, $f_4 = -13.14$
$\beta_{4T} = 4.87$, $\beta_{4W} = 1.41$, $f_{BW} = 4.50$, $f_W = 23.30$
$y/f_1 = 0.036$, $\Sigma D_4/y = 0.087$, $|f_4|/y = 0.760$, $\nu_R = 54.680$
$\beta_{4T}/\beta_{4W} = 3.463$, $f_{BW}/f_W = 0.193$, $|\beta_{3T}| = 0.468$
$(r_F + r_R)/(r_F - r_R) = -0.98$, $f_4/f_W = 0.56$, $E(W)/f_W = 0.35$
$|f_T/f_1| = 0.202$ Embodiment 13

$f = 25.8 \sim 55.9 \sim 121.2$, F number $= 4.6 \sim 6.7 \sim 10.5$
$2\omega = 66.38° \sim 35.24° \sim 16.64°$

|  |  |  |  |
|---|---|---|---|
| $r_1 = -27.6313$ | | | |
| | $d_1 = 1.5000$ | $n_1 = 1.84666$ | $\nu_1 = 23.78$ |
| $r_2 = -70.3169$ | | | |
| | $d_2 = 0.2942$ | | |
| $r_3 = 150.1397$ | | | |
| | $d_3 = 2.2750$ | $n_2 = 1.48749$ | $\nu_2 = 70.23$ |
| $r_4 = -34.1618$ | | | |
| | $d_4 = D_1$ (variable) | | |
| $r_5 = 13.6177$ | | | |
| | $d_5 = 1.9779$ | $n_3 = 1.72151$ | $\nu_3 = 29.24$ |
| $r_6 = 20.9041$ | | | |
| | $d_6 = 5.0142$ | | |
| $r_7 = \infty$ (stop) | | | |
| | $d_7 = D_2$ (variable) | | |
| $r_8 = -9.9762$ | | | |
| | $d_8 = 1.2942$ | $n_4 = 1.80518$ | $\nu_4 = 25.42$ |
| $r_9 = -15.6923$ | | | |
| | $d_9 = 0.8147$ | | |
| $r_{10} = 25.5479$ | | | |
| | $d_{10} = 4.2347$ | $n_5 = 1.51823$ | $\nu_5 = 58.96$ |
| $r_{11} = -11.3640$ (aspherical surface) | | | |
| | $d_{11} = D_3$ (variable) | | |
| $r_{12} = -9.8169$ (aspherical surface) | | | |
| | $d_{12} = 1.5000$ | $n_6 = 1.69680$ | $\nu_6 = 55.53$ |
| $r_{13} = 1168.0658$ | | | |
| | $d_{13} = D_4$ (variable) | | |
| $r_{14} = \infty$ (image) | | | | aspherical surface coefficients (11th surface) $\quad K = 0.1473$, $E = 1.8652 \times 10^{-4}$,
$\quad F = -7.8672 \times 10^{-8}$, $G = 1.1264 \times 10^{-8}$,
$\quad H = -8.3800 \times 10^{-11}$
(12th surface) $\quad K = -1.3386$, $E = 2.3993 \times 10^{-5}$,
$\quad F = -2.1307 \times 10^{-7}$, $G = -8.2513 \times 10^{-9}$,
$\quad H = 7.0584 \times 10^{-12}$ variation of airspaces for magnification change

| f | 25.8 | 55.9 | 121.2 |
|---|---|---|---|
| $D_1$ | 0.49485 | 8.81731 | 17.24620 |
| $D_2$ | 1.46761 | 7.40303 | 12.00263 |
| $D_3$ | 11.26661 | 5.43138 | 1.90381 |
| $D_4$ | 4.83931 | 23.19350 | 59.95041 |

-continued $f = 25.8 \sim 55.9 \sim 121.2$, F number = $4.6 \sim 6.7 \sim 10.5$
$2\omega = 66.38° \sim 35.24° \sim 16.64°$ $y = 17.30$, $f_1 = 13767.40$, $\Sigma D_4 = 1.53$, $f_4 = -13.96$
$\beta_{4T} = 5.36$, $\beta_{4W} = 1.41$, $f_{BW} = 4.84$, $f_W = 25.80$
$y/f_1 = 0.001$, $\Sigma D_4/y = 0.088$, $|f_4|/y = 0.807$, $\nu_R = 55.530$
$\beta_{4T}/\beta_{4W} = 3.800$, $f_{BW}/f_W = 0.188$, $|\beta_{3T}| = 0.491$
$(r_F + r_R)/(r_F - r_R) = -0.98$, $f_4/f_W = 0.54$, $E(W)/f_W = 0.38$
$|f_T/f_1| = 0.009$

Embodiment 14

$f = 25.8 \sim 50.0 \sim 97.0$, F number = $4.6 \sim 6.6 \sim 9.5$
$2\omega = 66.14° \sim 38.62° \sim 20.36°$

| | | | |
|---|---|---|---|
| $r_1 = -26.6127$ | | | |
| | $d_1 = 1.4986$ | $n_1 = 1.84666$ | $\nu_1 = 23.78$ |
| $r_2 = -81.1028$ | | | |
| | $d_2 = 0.0587$ | | |
| $r_3 = 139.8794$ | | | |
| | $d_3 = 3.3208$ | $n_2 = 1.48749$ | $\nu_2 = 70.23$ |
| $r_4 = -29.5110$ | | | |
| | $d_4 = D_1$ (variable) | | |
| $r_5 = 13.1607$ | | | |
| | $d_5 = 1.9087$ | $n_3 = 1.71736$ | $\nu_3 = 29.51$ |
| $r_6 = 22.2256$ | | | |
| | $d_6 = 4.8712$ | | |
| $r_7 = \infty$ (stop) | | | |
| | $d_7 = D_2$ (variable) | | |
| $r_8 = -10.2430$ | | | |
| | $d_8 = 2.2655$ | $n_4 = 1.80518$ | $\nu_4 = 25.42$ |
| $r_9 = -16.1242$ | | | |
| | $d_9 = 0.2483$ | | |
| $r_{10} = 26.8390$ | | | |
| | $d_{10} = 3.7722$ | $n_5 = 1.51633$ | $\nu_5 = 64.14$ |
| $r_{11} = -13.3135$ (aspherical surface) | | | |
| | $d_{11} = D_3$ (variable) | | |
| $r_{12} = -10.9326$ (aspherical surface) | | | |
| | $d_{12} = 0.2775$ | $n_6 = 1.52288$ | $\nu_6 = 52.51$ |
| $r_{13} = -12.6856$ | | | |
| | $d_{13} = 1.2500$ | $n_7 = 1.75500$ | $\nu_7 = 52.32$ |
| $r_{14} = -1.454 \times 10^5$ | | | |
| | $d_{14} = D_4$ (variable) | | |
| $r_{15} = \infty$ (image) | | | | aspherical surface coefficients (11th surface) $K = -0.0539$, $E = 1.3858 \times 10^{-4}$,
$F = -8.0346 \times 10^{-7}$, $G = 1.6995 \times 10^{-8}$,
$H = -1.0963 \times 10^{-10}$ (12th surface) $K = -1.3032$, $E = 6.5513 \times 10^{-5}$,
$F = -6.6160 \times 10^{-7}$, $G = 4.4871 \times 10^{-10}$,
$H = -4.2205 \times 10^{-11}$ variation of airspaces for magnification change

| f | 25.8 | 50.0 | 97.0 |
|---|---|---|---|
| $D_1$ | 0.94023 | 8.03156 | 13.85150 |
| $D_2$ | 2.21302 | 6.82114 | 10.36168 |
| $D_3$ | 11.25002 | 5.25611 | 1.37851 |
| $D_4$ | 4.65403 | 20.34403 | 48.97025 |

$y = 17.30$, $f_1 = 481.08$, $\Sigma D_4 = 1.50$, $f_4 = -15.09$
$\beta_{4T} = 4.30$, $\beta_{4W} = 1.36$, $f_{BW} = 4.65$, $f_W = 25.80$
$y/f_1 = 0.036$, $\Sigma D_4/y = 0.087$, $|f_4|/y = 0.872$, $\nu_R = 52.320$
$\beta_{4T}/\beta_{4W} = 3.153$, $f_{BW}/f_W = 0.180$, $|\beta_{3T}| = 0.583$
$(r_F + r_R)/(r_F - r_R) = -1.00$, $f_4/f_W = 0.59$, $E(W)/f_W = 0.40$
$|f_T/f_1| = 0.008$

Embodiment 15

$f = 39.14 \sim 67.50 \sim 116.40$, F number = $4.64 \sim 7.08 \sim 10.82$
$2\omega = 56.4° \sim 35.0° \sim 21.0°$

| | | | |
|---|---|---|---|
| $r_1 = -43.8601$ | | | |
| | $d_1 = 1.8000$ | $n_1 = 1.78472$ | $\nu_1 = 25.68$ |

-continued $f = 39.14 \sim 67.50 \sim 116.40$, F number = $4.64 \sim 7.08 \sim 10.82$
$2\omega = 56.4° \sim 35.0° \sim 21.0°$

| | | | |
|---|---|---|---|
| $r_2 = -1030.7853$ | | | |
| | $d_2 = 0.1500$ | | |
| $r_3 = 24.1803$ | | | |
| | $d_3 = 2.5000$ | $n_2 = 1.51823$ | $\nu_2 = 58.90$ |
| $r_4 = 139.6404$ | | | |
| | $d_4 = D_1$ (variable) | | |
| $r_5 = 29.5852$ | | | |
| | $d_5 = 2.3000$ | $n_3 = 1.67270$ | $\nu_3 = 32.10$ |
| $r_6 = 206.6298$ | | | |
| | $d_6 = 0.7000$ | | |
| $r_7 = \infty$ (stop) | | | |
| | $d_7 = D_2$ (variable) | | |
| $r_8 = -15.7528$ | | | |
| | $d_8 = 1.6000$ | $n_4 = 1.78472$ | $\nu_4 = 25.68$ |
| $r_9 = -23.7259$ | | | |
| | $d_9 = 3.4834$ | | |
| $r_{10} = 221.9716$ | | | |
| | $d_{10} = 4.0000$ | $n_5 = 1.52542$ | $\nu_5 = 55.78$ |
| $r_{11} = -16.3581$ (aspherical surface) | | | |
| | $d_{11} = D_3$ (variable) | | |
| $r_{12} = -15.0483$ (aspherical surface) | | | |
| | $d_{12} = 1.9000$ | $n_6 = 1.52542$ | $\nu_6 = 55.78$ |
| $r_{13} = 96.7496$ | | | |
| | $d_{13} = D_4$ (variable) | | |
| $r_{14} = \infty$ (image) | | | | aspherical surface coefficients (11th surface) $K = 0.5560$, $E = 7.1407 \times 10^{-5}$,
$F = 4.1778 \times 10^{-7}$, $G = 3.9989 \times 10^{-9}$,
$H = 4.8052 \times 10^{-11}$ (12th surface) $K = -1.1777$, $E = 1.7761 \times 10^{-5}$,
$F = 2.7425 \times 10^{-7}$, $G = -3.7741 \times 10^{-9}$,
$H = 1.1455 \times 10^{-11}$ variation of airspaces for magnification change

| f | 39.14 | 67.50 | 116.40 |
|---|---|---|---|
| $D_1$ | 0.600 | 3.430 | 8.885 |
| $D_2$ | 3.234 | 7.523 | 10.641 |
| $D_3$ | 16.160 | 8.118 | 2.800 |
| $D_4$ | 9.668 | 31.629 | 68.273 |

$\Sigma D_4/y = 0.09$, $(r_F + r_R)/(r_F - r_R) = -0.73$, $\nu_R = 55.78$,
$\beta_{4T}/\beta_{4W} = 2.66$, $f_{BW}/f_W = 0.25$, $f_4/f_W = 0.59$, $\beta_{3T} = 0.63$,
$y/f_1 = 0.022$, $|f_4|/y = 1.14$, $E(W)/f_W = 0.14$,
$|f_T/f_1| = 0.116$

Embodiment 16

$f = 39.14 \sim 67.50 \sim 116.40$, F number = $4.64 \sim 7.08 \sim 10.82$
$2\omega = 57.2° \sim 35.0° \sim 21.0°$

| | | | |
|---|---|---|---|
| $r_1 = -44.9276$ | | | |
| | $d_1 = 1.8000$ | $n_1 = 1.78472$ | $\nu_1 = 25.68$ |
| $r_2 = 2003.3044$ | | | |
| | $d_2 = 0.1500$ | | |
| $r_3 = 22.6790$ | | | |
| | $d_3 = 2.3000$ | $n_2 = 1.51823$ | $\nu_2 = 58.90$ |
| $r_4 = 117.8594$ | | | |
| | $d_4 = D_1$ (variable) | | |
| $r_5 = 26.2458$ | | | |
| | $d_5 = 2.1000$ | $n_3 = 1.67270$ | $\nu_3 = 32.10$ |
| $r_6 = 140.9926$ | | | |
| | $d_6 = 0.9000$ | | |
| $r_7 = \infty$ (stop) | | | |
| | $d_7 = D_2$ (variable) | | |
| $r_8 = -16.0819$ | | | |
| | $d_8 = 1.6000$ | $n_4 = 1.78472$ | $\nu_4 = 25.68$ |
| $r_9 = -24.1717$ | | | |
| | $d_9 = 3.5273$ | | |
| $r_{10} = 151.7049$ | | | |
| | $d_{10} = 3.8000$ | $n_5 = 1.52542$ | $\nu_5 = 55.78$ |
| $r_{11} = -17.7563$ (aspherical surface) | | | |
| | $d_{11} = D_3$ (variable) | | |
| $r_{12} = -14.9780$ (aspherical surface) | | | |

-continued $f = 39.14 \sim 67.50 \sim 116.40$, F number = $4.64 \sim 7.08 \sim 10.82$
$2\omega = 57.2° \sim 35.0° \sim 21.0°$

| | $d_{12} = 1.9000$ | $n_6 = 1.52542$ | $\nu_6 = 55.78$ |
|---|---|---|---|
| $r_{13} =$ | 109.9367 | | |
| | $d_{13} = D_4$ (variable) | | |
| $r_{14} =$ | ∞ (image) | | | aspherical surface coefficients (11th surface)    $K = 0.5472$, $E = 6.8034 \times 10^{-5}$,
$F = 2.2151 \times 10^{-7}$, $G = 1.8928 \times 10^{-9}$,
$H = 4.3557 \times 10^{-11}$ (12th surface)    $K = -1.1762$, $E = 1.6846 \times 10^{-5}$,
$F = 4.7752 \times 10^{-8}$, $G = -5.6211 \times 10^{-10}$,
$H = 4.6330 \times 10^{-13}$ variation of airspaces for magnification change

| f | 39.14 | 67.50 | 116.40 |
|---|---|---|---|
| $D_1$ | 2.000 | 4.347 | 8.685 |
| $D_2$ | 2.877 | 7.032 | 9.529 |
| $D_3$ | 15.646 | 7.324 | 2.000 |
| $D_4$ | 9.708 | 32.037 | 70.143 | variation of airspaces for focusing

| $D_1$ | 0.614 | 2.734 | 6.813 |
|---|---|---|---|
| $D_2$ | 2.877 | 7.032 | 9.529 |
| $D_3$ | 17.032 | 8.936 | 3.872 |
| $D_4$ | 9.708 | 32.037 | 70.143 |

$\Sigma D_4/y = 0.09$, $(r_F + r_R)/(r_F - r_R) = -0.76$, $\nu_R = 55.78$,
$\beta_{4T}/\beta_{4W} = 2.69$, $f_{BW}/f_W = 0.25$, $f_4/f_W = 0.64$, $\beta_{3T} = 0.67$,
$y/f_1 = 0.022$, $|f_4|/y = 1.16$, $E(W)/f_W = 0.17$,
$|f_T/f_1| = 0.116$ Embodiment 17

$f = 32.31 \sim 62.52 \sim 121.27$, F number = $4.60 \sim 6.95 \sim 10.50$
$2\omega = 66.0° \sim 37.4° \sim 20.0°$

| $r_1 =$ | -39.7441 | | |
|---|---|---|---|
| | $d_1 = 1.8754$ | $n_1 = 1.84666$ | $\nu_1 = 23.78$ |
| $r_2 =$ | -210.6045 | | |
| | $d_2 = 0.2946$ | | |
| $r_3 =$ | 115.2842 | | |
| | $d_3 = 2.9875$ | $n_2 = 1.48749$ | $\nu_2 = 70.23$ |
| $r_4 =$ | -37.5782 | | |
| | $d_4 = D_1$ (variable) | | |
| $r_5 =$ | 15.6256 | | |
| | $d_5 = 2.0509$ | $n_3 = 1.72825$ | $\nu_3 = 28.46$ |
| $r_6 =$ | 26.2181 | | |
| | $d_6 = 2.5467$ | | |
| $r_7 =$ | ∞ (stop) | | |
| | $d_7 = D_2$ (variable) | | |
| $r_8 =$ | -13.9564 | | |
| | $d_8 = 1.8289$ | $n_4 = 1.80518$ | $\nu_4 = 25.42$ |
| $r_9 =$ | -22.6087 | | |
| | $d_9 = 2.1450$ | | |
| $r_{10} =$ | 59.3377 | | |
| | $d_{10} = 3.8820$ | $n_5 = 1.51633$ | $\nu_5 = 64.14$ |
| $r_{11} =$ | -14.5766 (aspherical surface) | | |
| | $d_{11} = D_3$ (variable) | | |
| $r_{12} =$ | -13.4744 (aspherical surface) | | |
| | $d_{12} = 1.8754$ | $n_6 = 1.69680$ | $\nu_6 = 55.53$ |
| $r_{13} =$ | -504.2855 | | |
| | $d_{13} = D_4$ (variable) | | |
| $r_{14} =$ | ∞ (image) | | | aspherical surface coefficients (11th surface)    $K = -1.1382$, $E = 2.5110 \times 10^{-5}$,
$F = 3.1102 \times 10^{-7}$, $G = 1.2324 \times 10^{-9}$,
$H = -6.0277 \times 10^{-11}$, $I = 2.0990 \times 10^{-13}$ (12th surface)    $K = -0.7202$, $E = 1.8054 \times 10^{-5}$,
$F = 2.0045 \times 10^{-7}$, $G = -1.6830 \times 10^{-9}$,
$H = -5.4279 \times 10^{-13}$, $I = 2.1107 \times 10^{-14}$ variation of airspaces for magnification change

| f | 32.31 | 62.52 | 121.27 |
|---|---|---|---|

-continued $f = 32.31 \sim 62.52 \sim 121.27$, F number = $4.60 \sim 6.95 \sim 10.50$
$2\omega = 66.0° \sim 37.4° \sim 20.0°$

| $D_1$ | 1.308 | 9.163 | 16.353 |
|---|---|---|---|
| $D_2$ | 2.137 | 7.795 | 13.105 |
| $D_3$ | 15.112 | 7.230 | 1.801 |
| $D_4$ | 6.458 | 27.256 | 63.798 |

$\Sigma D_4/y = 0.09$, $(r_F + r_R)/(r_F - r_R) = -1.05$, $\nu_R = 55.53$,
$\beta_{4T}/\beta_{4W} = 3.09$, $f_{BW}/f_W = 0.20$, $f_4/f_W = 0.62$, $\beta_{3T} = 0.63$,
$y/f_1 = 0.017$, $|f_4|/y = 0.92$, $E(W)/f_W = 0.25$,
$|f_T/f_1| = 0.097$ Embodiment 18

$f = 39.15 \sim 67.51 \sim 116.43$, F number = $4.64 \sim 7.08 \sim 10.82$
$2\omega = 57.0° \sim 35.0° \sim 21.0°$

| $r_1 =$ | -44.3760 | | |
|---|---|---|---|
| | $d_1 = 1.8000$ | $n_1 = 1.78472$ | $\nu_1 = 25.68$ |
| $r_2 =$ | -1897.3346 | | |
| | $d_2 = 0.1500$ | | |
| $r_3 =$ | 22.6448 | | |
| | $d_3 = 2.3000$ | $n_2 = 1.51823$ | $\nu_2 = 58.90$ |
| $r_4 =$ | 128.2210 | | |
| | $d_4 = D_1$ (variable) | | |
| $r_5 =$ | 25.7558 | | |
| | $d_5 = 2.1000$ | $n_3 = 1.67270$ | $\nu_3 = 32.10$ |
| $r_6 =$ | 109.3944 | | |
| | $d_6 = 1.5000$ | | |
| $r_7 =$ | ∞ (stop) | | |
| | $d_7 = D_2$ (variable) | | |
| $r_8 =$ | -15.5145 | | |
| | $d_8 = 1.6000$ | $n_4 = 1.78472$ | $\nu_4 = 25.68$ |
| $r_9 =$ | -23.2694 | | |
| | $d_9 = 3.2938$ | | |
| $r_{10} =$ | 156.6330 | | |
| | $d_{10} = 3.8000$ | $n_5 = 1.52542$ | $\nu_5 = 55.78$ |
| $r_{11} =$ | -17.0510 (aspherical surface) | | |
| | $d_{11} = D_3$ (variable) | | |
| $r_{12} =$ | -14.7576 (aspherical surface) | | |
| | $d_{12} = 1.9000$ | $n_6 = 1.52542$ | $\nu_6 = 55.78$ |
| $r_{13} =$ | 98.3688 | | |
| | $d_{13} = D_4$ (variable) | | |
| $r_{14} =$ | ∞ (image) | | | aspherical surface coefficients (11th surface)    $K = 0.5464$, $E = 7.1858 \times 10^{-5}$,
$F = 2.5263 \times 10^{-7}$, $G = -5.2903 \times 10^{-11}$,
$H = 1.2826 \times 10^{-11}$ (12th surface)    $K = -1.1783$, $E = 1.7880 \times 10^{-5}$,
$F = 1.4896 \times 10^{-7}$, $G = 1.5120 \times 10^{-9}$,
$H = 3.5627 \times 10^{-12}$ variation of airspaces for magnification change

| f | 39.15 | 67.51 | 116.43 |
|---|---|---|---|
| $D_1$ | 2.000 | 5.221 | 9.837 |
| $D_2$ | 3.043 | 6.685 | 9.003 |
| $D_3$ | 14.952 | 7.063 | 2.000 |
| $D_4$ | 9.737 | 31.744 | 68.918 | variation of airspaces for focusing

| $D_1$ | 0.640 | 3.645 | 8.000 |
|---|---|---|---|
| $D_2$ | 3.043 | 6.685 | 9.003 |
| $D_3$ | 16.312 | 8.639 | 3.838 |
| $D_4$ | 9.737 | 31.744 | 68.918 |

$\Sigma D_4/y = 0.09$, $(r_F + r_R)/(r_F - r_R) = -0.74$, $\nu_R = 55.78$,
$\beta_{4T}/\beta_{4W} = 2.69$, $f_{BW}/f_W = 0.25$, $f_4/f_W = 0.62$, $\beta_{3T} = 0.66$,
$y/f_1 = 0.043$, $|f_4|/y = 1.12$, $E(W)/f_W = 0.19$,
$|f_T/f_1| = 0.233$

Embodiment 19

$f = 32.33 \sim 62.05 \sim 121.25$, F number $= 4.60 \sim 6.85 \sim 10.20$
$2\omega = 66.0° \sim 37.6° \sim 20.0°$ $r_1 = -39.6039$
$\quad d_1 = 1.8754 \quad n_1 = 1.84666 \quad \nu_1 = 23.78$
$r_2 = -276.2516$
$\quad d_2 = 1.5832$
$r_3 = 109.0209$
$\quad d_3 = 3.1462 \quad n_2 = 1.48749 \quad \nu_2 = 70.23$
$r_4 = -36.6668$
$\quad d_4 = D_1$ (variable)
$r_5 = 14.6902$
$\quad d_5 = 2.1417 \quad n_3 = 1.75520 \quad \nu_3 = 27.51$
$r_6 = 23.7300$
$\quad d_6 = D_2$ (variable)
$r_7 = \infty$ (stop)
$\quad d_7 = D_3$ (variable)
$r_8 = -13.9665$
$\quad d_8 = 1.8384 \quad n_4 = 1.80518 \quad \nu_4 = 25.42$
$r_9 = -23.0892$
$\quad d_9 = 1.7116$
$r_{10} = 45.6985$
$\quad d_{10} = 4.1799 \quad n_5 = 1.51633 \quad \nu_5 = 64.14$
$r_{11} = -14.7122$ (aspherical surface)
$\quad d_{11} = D_4$ (variable)
$r_{12} = -13.8395$ (aspherical surface)
$\quad d_{12} = 2.4679 \quad n_6 = 1.72000 \quad \nu_6 = 41.99$
$r_{13} = -14.7333$
$\quad d_{13} = 1.7331 \quad n_7 = 1.81600 \quad \nu_7 = 46.62$
$r_{14} = -221.8476$
$\quad d_{14} = D_5$ (variable)
$r_{15} = \infty$ (image)

aspherical surface coefficients (11th surface) $\quad K = -0.0572, E = 8.7137 \times 10^{-5},$
$\quad F = -9.2710 \times 10^{-8}, G = 9.3414 \times 10^{-9},$
$\quad H = -1.6728 \times 10^{-11}, I = -7.8891 \times 10^{-13}$
(12th surface) $\quad K = -0.1666, E = 4.9107 \times 10^{-5},$
$\quad F = 4.4851 \times 10^{-8}, G = 4.3985 \times 10^{-11},$
$\quad H = 4.4643 \times 10^{-12}, I = -3.4192 \times 10^{-14}$ variation of airspaces for magnification change

| f | 32.33 | 62.05 | 121.25 |
|---|---|---|---|
| $D_1$ | 1.206 | 9.792 | 18.510 |
| $D_2$ | 2.030 | 3.506 | 6.878 |
| $D_3$ | 3.029 | 5.933 | 7.283 |
| $D_4$ | 13.201 | 6.475 | 1.723 |
| $D_5$ | 6.177 | 26.818 | 63.812 |

$\Sigma D_4/y = 0.19$, $(r_F + r_R)/(r_F - r_R) = -1.13$, $\nu_R = 46.62(x)$,
$\beta_{4T}/\beta_{4W} = 3.15$, $f_{BW}/f_W = 0.19$, $f_4/f_W = 0.56$, $\beta_{3T} = 0.62$,
$y/f_1 = 0.017$, $|f_4|/y = 0.84$, $E(W)/f_W = 0.27$,
$|f_T/f_1| = 0.097$ wherein the reference symbol $r_1, r_2, \ldots$ represent radii of curvature on surfaces of respective lens elements, the reference symbols $d_1, d_2, \ldots$ designate distances between surfaces, the reference symbols $n_1, n_2, \ldots$ denote refractive indices of the lens elements, and the reference symbols $\nu_1, \nu_2, \ldots$ represent Abbe's numbers of the respective lens elements.

Figure 4:
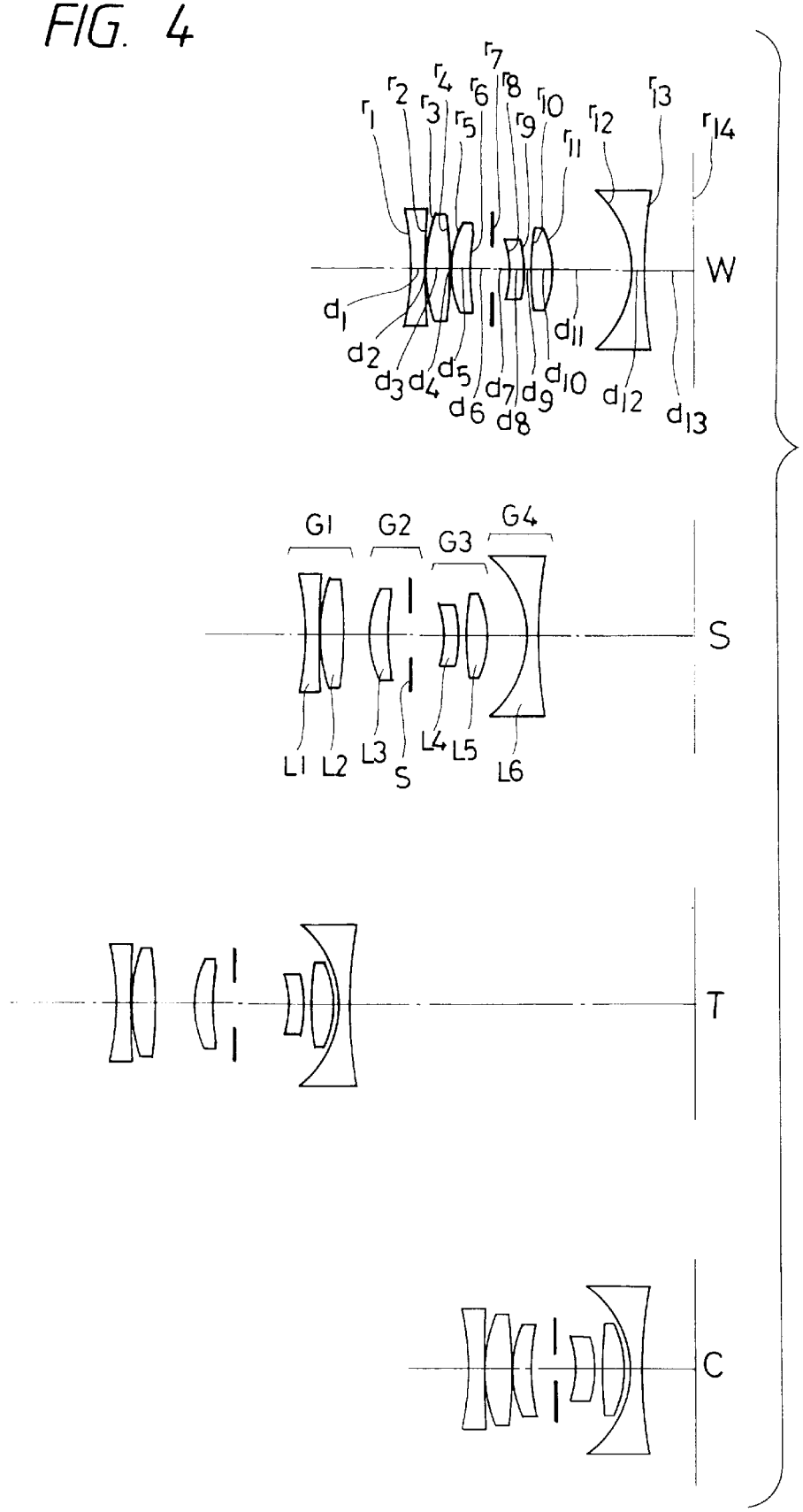
FIGS. 4 through 22 show sectional views illustrating compositions of first through nineteenth embodiments of the optical system according to the present invention.

The first embodiment is composed, as shown in FIG. 4, of a first lens unit G1 which is composed of a negative lens element L1 and a positive lens element L2, a second lens unit G2 which is composed of a positive lens element L3 and an aperture stop S, a third lens unit G3 which is composed of a negative lens element L4 and a positive lens element L5, and a fourth lens unit G4 which is composed of a negative lens element L6: the first embodiment being composed of six lens element in total. The first embodiment is configured to change its magnification from a wide position to a tele position by moving all the lens units toward the object side so as to widen an airspace reserved between the second lens unit G2 and the third lens unit G3. Further, the first lens unit G1 and the fourth lens unit G4 are moved as an integral unit, thereby making it possible to reduce a number of zooming cams and simplify a structure of a lens barrel. Furthermore, the first embodiment is focused by moving the third lens unit G3.

In the first embodiment, aspherical surfaces are used on the fifth lens element L5 which is disposed on the image side in the third lens unit G3 and the sixth lens element L6 which is used as the fourth lens unit.

Further, the fifth lens element L5 and the sixth lens element L6 are made of a plastic material. The plastic material is selected for lowering manufacturing costs of the aspherical lens elements. The plastic lens elements are configured as the positive lens element and the negative lens element so that variations due to temperature and humidity changes are produced in directions reverse to each other, whereby the zoom optical system as a whole is scarcely influenced by the variations.

FIG. 4 shows the zoom optical system at a wide position (W), at an intermediate focal length (S), at a tele position (T) and in a collapsed condition (C) in a sequence from the uppermost stage.

Figure 5:
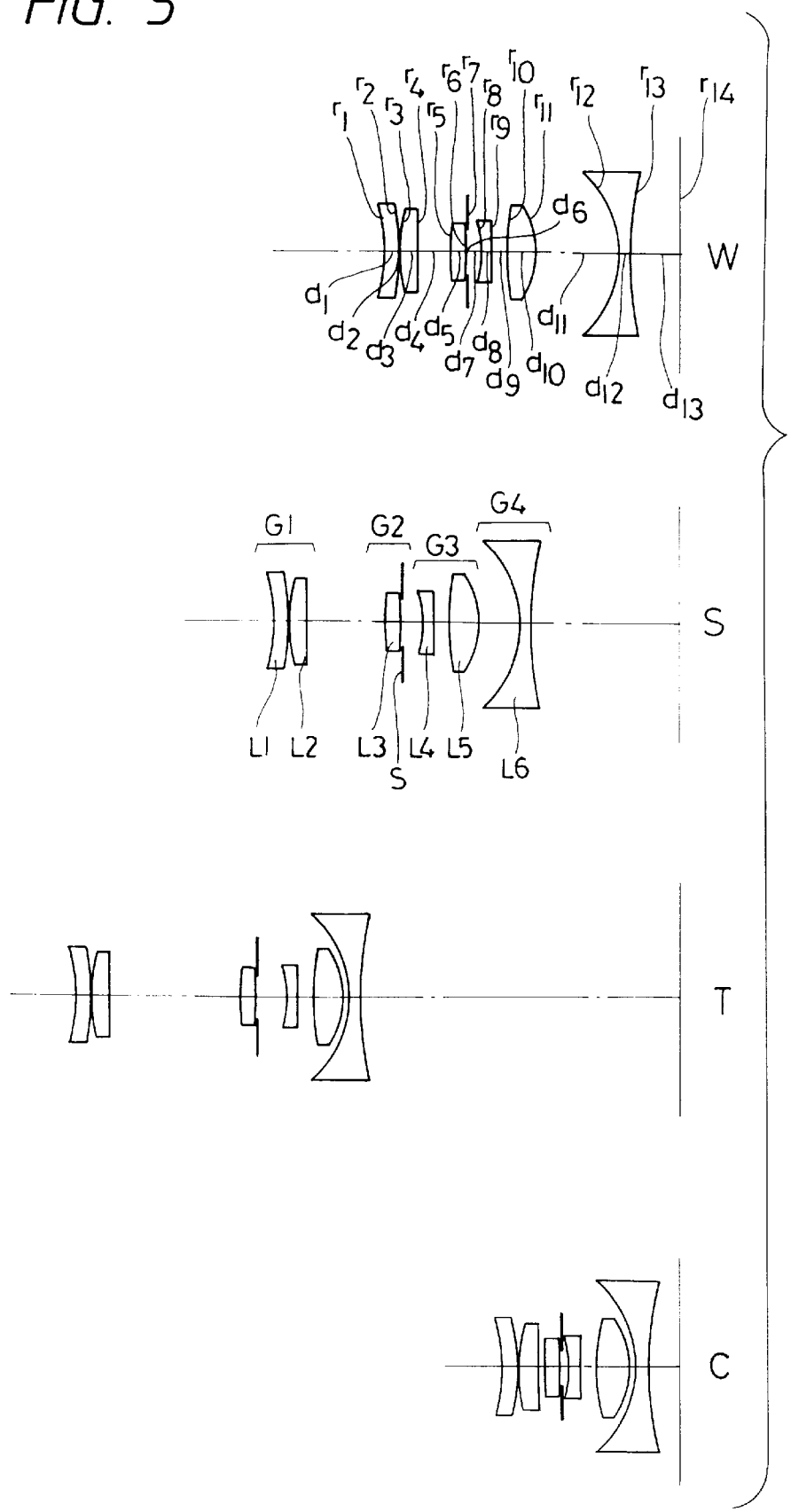
Figure 6:
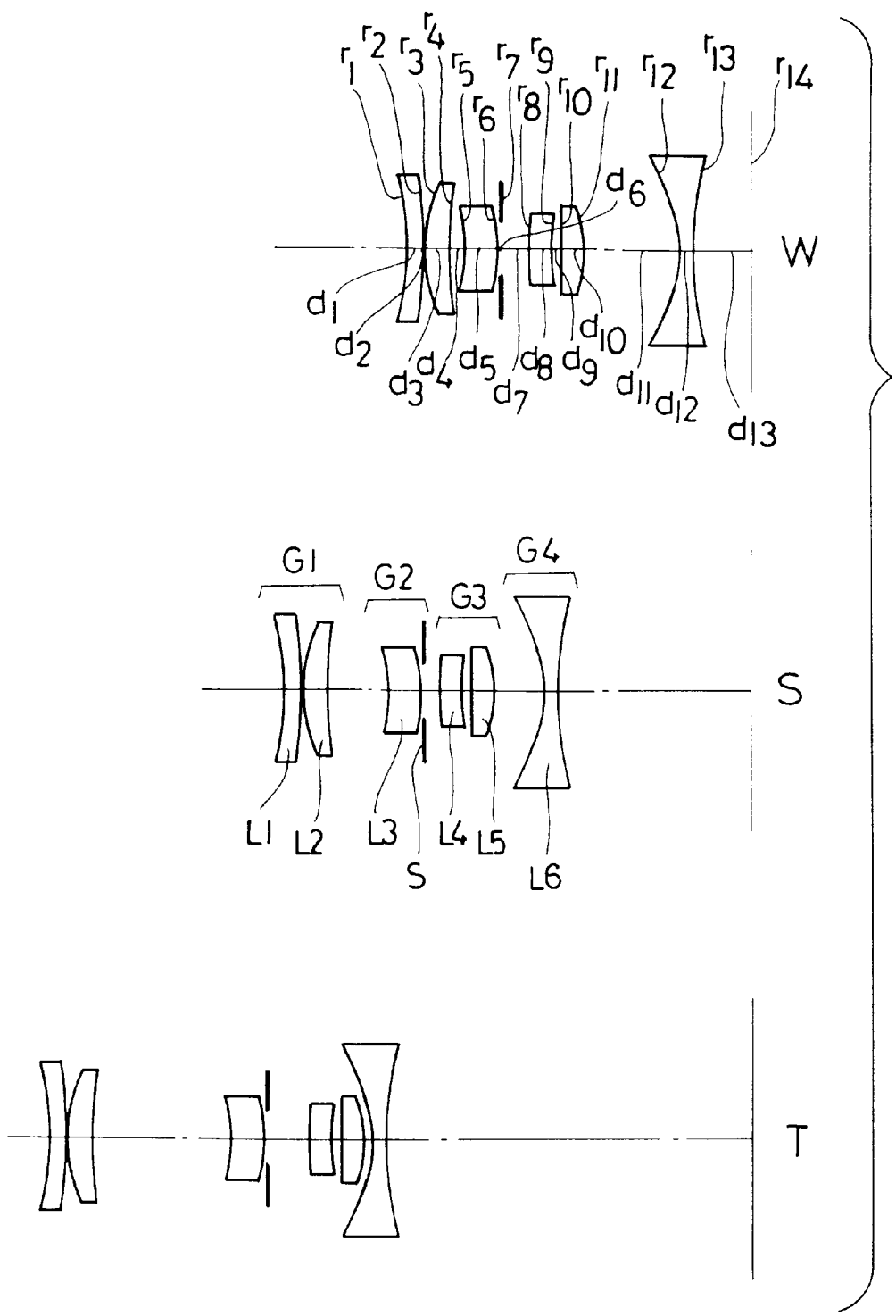

The second embodiment has a composition illustrated in FIG. 5, or remains unchanged from the first embodiment in its composition and movements of lens units for a magnification change, but uses a fifth lens element L5 and a sixth lens element L6 which are configured as aspherical lens elements made of a glass material. Accordingly, the second embodiment is free from influences due to temperature and humidity changes.

Since a third lens unit G3 has a magnification of approximately 1× within an entire zooming region in the second embodiment, the third lens unit G3 must be moved for a long distance when the second embodiment is focused by moving only the third lens unit G3. It is therefore preferable to focus the second embodiment by moving a second lens unit G2 and the third lens unit G3 as an integral unit or moving a fourth lens unit G4.

Like FIG. 4, FIG. 5 shows the zoom optical system at a wide position (W), at an intermediate focal length, at a tele position (T) and in a collapsed condition (C) in a sequence from the uppermost stages.

The third embodiment remains unchanged from the second embodiment in its composition, but lens units are moved for a magnification change so that an airspace reserved between a second lens unit and a third lens unit is minimum at an intermediate focal length. Further, an aspherical surface is used on each of second, third and fourth lens units G2, G3 and G4. The third embodiment is focused by moving the third lens unit G3 toward the object side.

Figure 7:
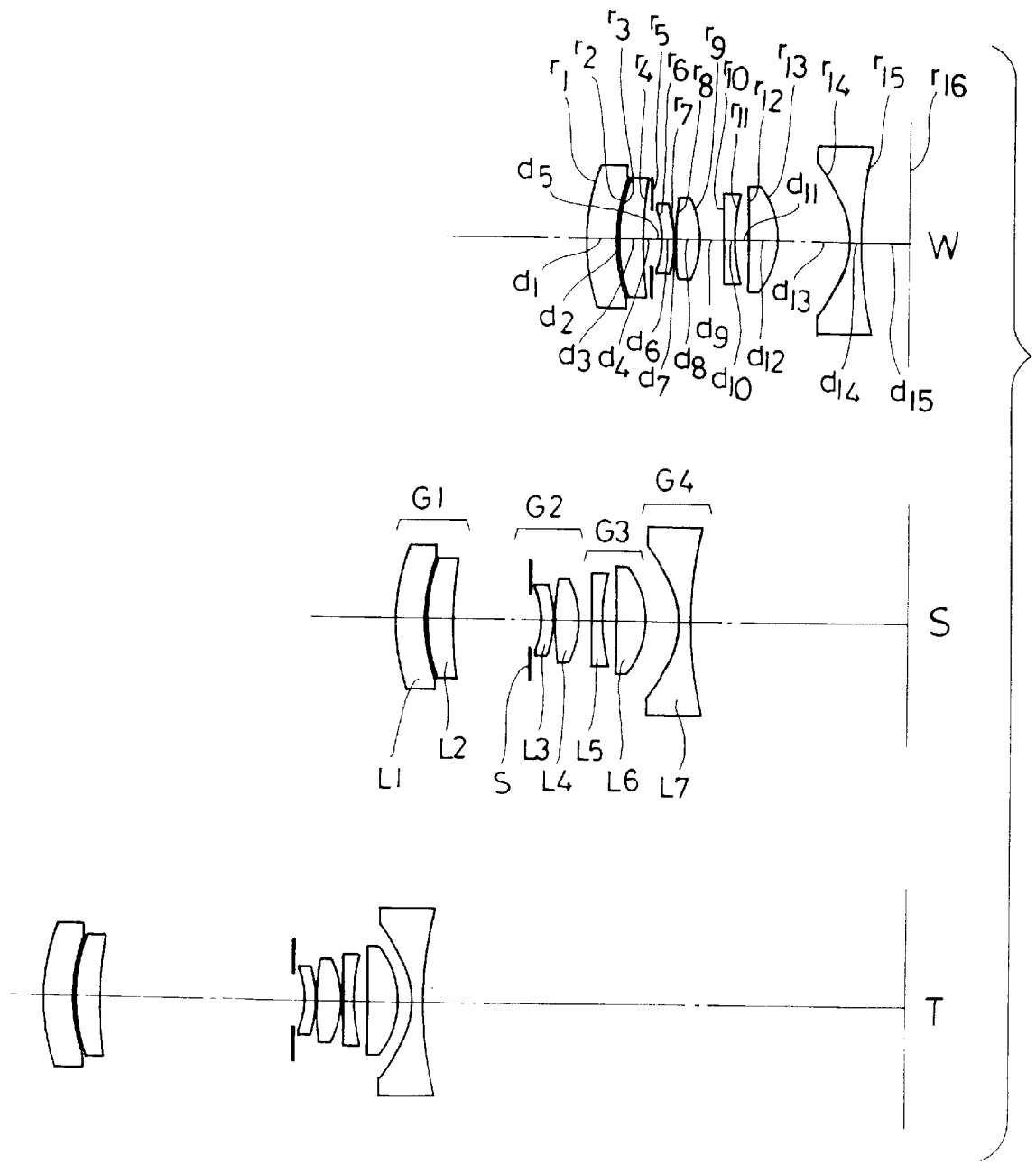

The fourth embodiment has a composition illustrated in FIG. 7, or is composed of a first lens unit G1 which is composed of a negative lens element L1 and a positive lens element L2, a second lens unit G2 which is composed of an aperture stop S, a negative lens element L3 and a positive lens element L4, a third lens unit G3 which is composed of a negative lens element L5 and a positive lens element L6, and a fourth lens unit G4 which is composed of a negative lens element L7, and configured to change its magnification from a wide position to a tele position by moving the lens units toward the object side so as to narrow an airspace reserved between the second lens unit G2 and the third lens unit G3. An aspherical surface is used on each of the second lens unit G2 and the fourth lens unit G4.

The fourth embodiment is focused by moving the fourth lens unit G4 toward the image side.

Figure 8:
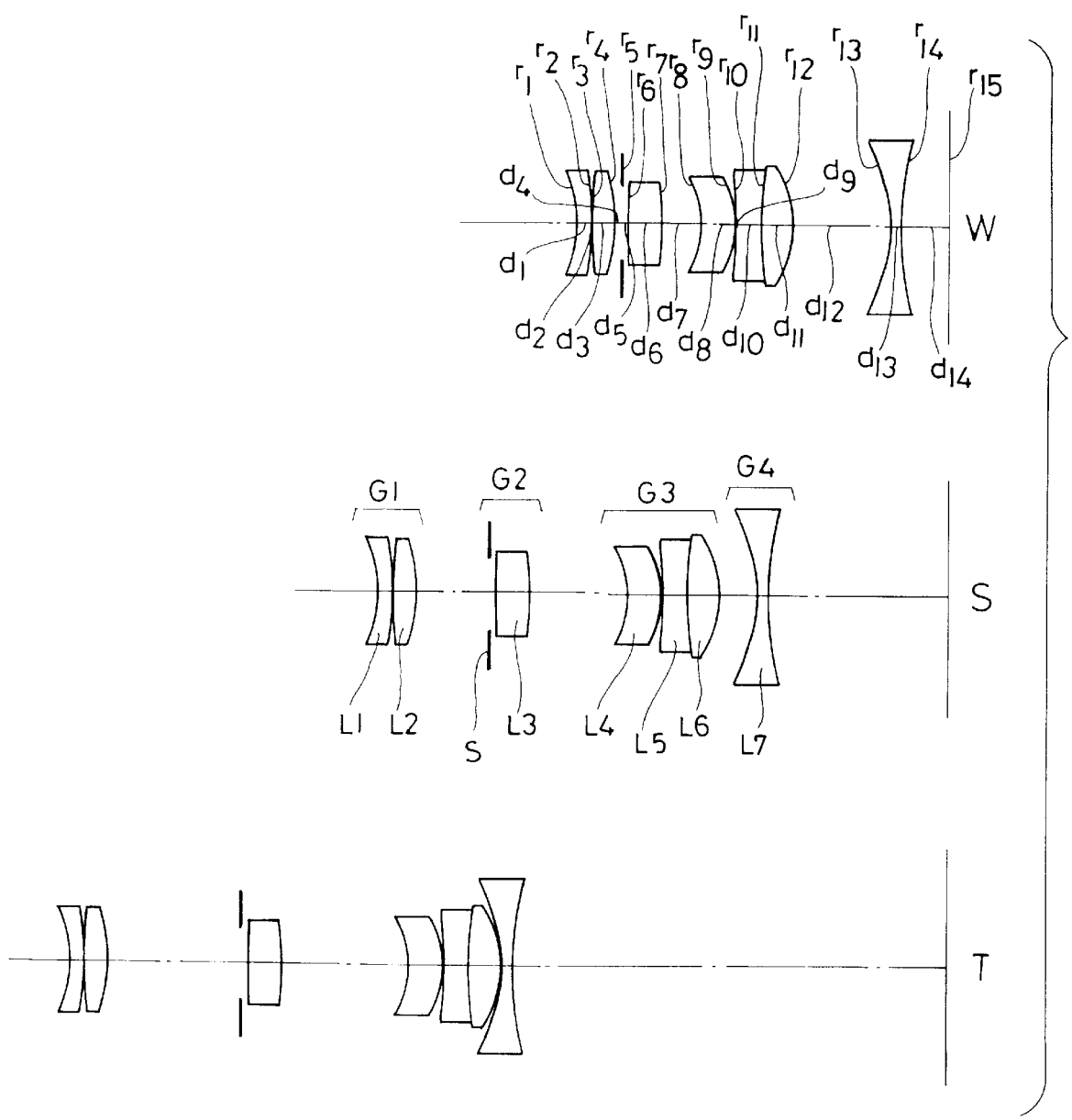

The fifth embodiment has a composition illustrated in FIG. 8, or is composed of a first lens unit G1 which is composed of a negative lens element L1 and a positive lens element L2, a second lens unit G2 which is composed of an aperture stop S and a positive lens element L3, a third lens unit G3 which is composed of a positive lens element L4, a negative lens element L5 and a positive lens element L6, and a fourth lens unit G4 which is composed of a negative lens element L7, and configured to change its magnification by moving the lens units toward the object side so as to widen an airspace reserved between the second lens unit G2 and the third lens unit G3. The fifth embodiment uses an aspherical surface on each of the third lens unit G3 and the fourth lens unit G4.

The fifth embodiment is focused by moving the third lens unit G3 toward the object side.

Figure 9:
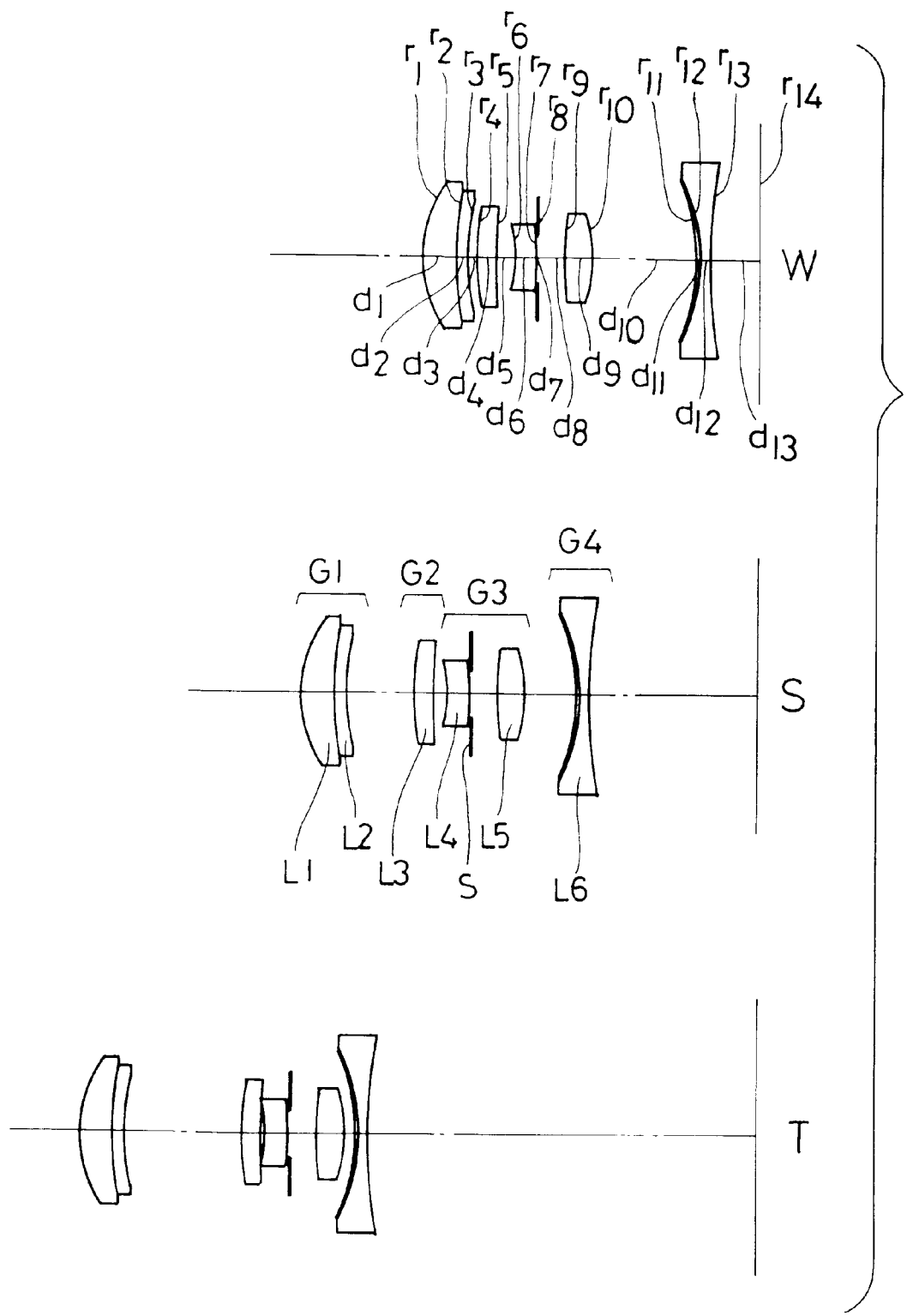

The sixth embodiment has a composition illustrated in FIG. 9, or is composed of a first lens unit G1 which is composed of a positive lens element L1 and a negative lens element L2, a second lens unit G2 which is composed of a positive lens element L3, a third lens unit G3 which is composed of a negative lens element L4, a positive lens element L5 and an aperture stop S disposed between these lens elements, and a fourth lens unit G4 which is composed of a negative lens element L6 having an aspherical resin layer (a layer which is formed between an aspherical surface $r_{11}$ and a surface $r_{12}$, and has thickness $d_{11}$), and configured to change its magnification by moving the lens units so as to narrow an airspace reserved between the second lens unit G2 and the third lens unit G3. An aspherical surface is used on each of the third lens unit G3 and the fourth lens unit G4.

The sixth embodiment is focused by moving the second lens unit G2 and the third lens unit G3 as an integral unit or the fourth lens unit only.

Figure 10:
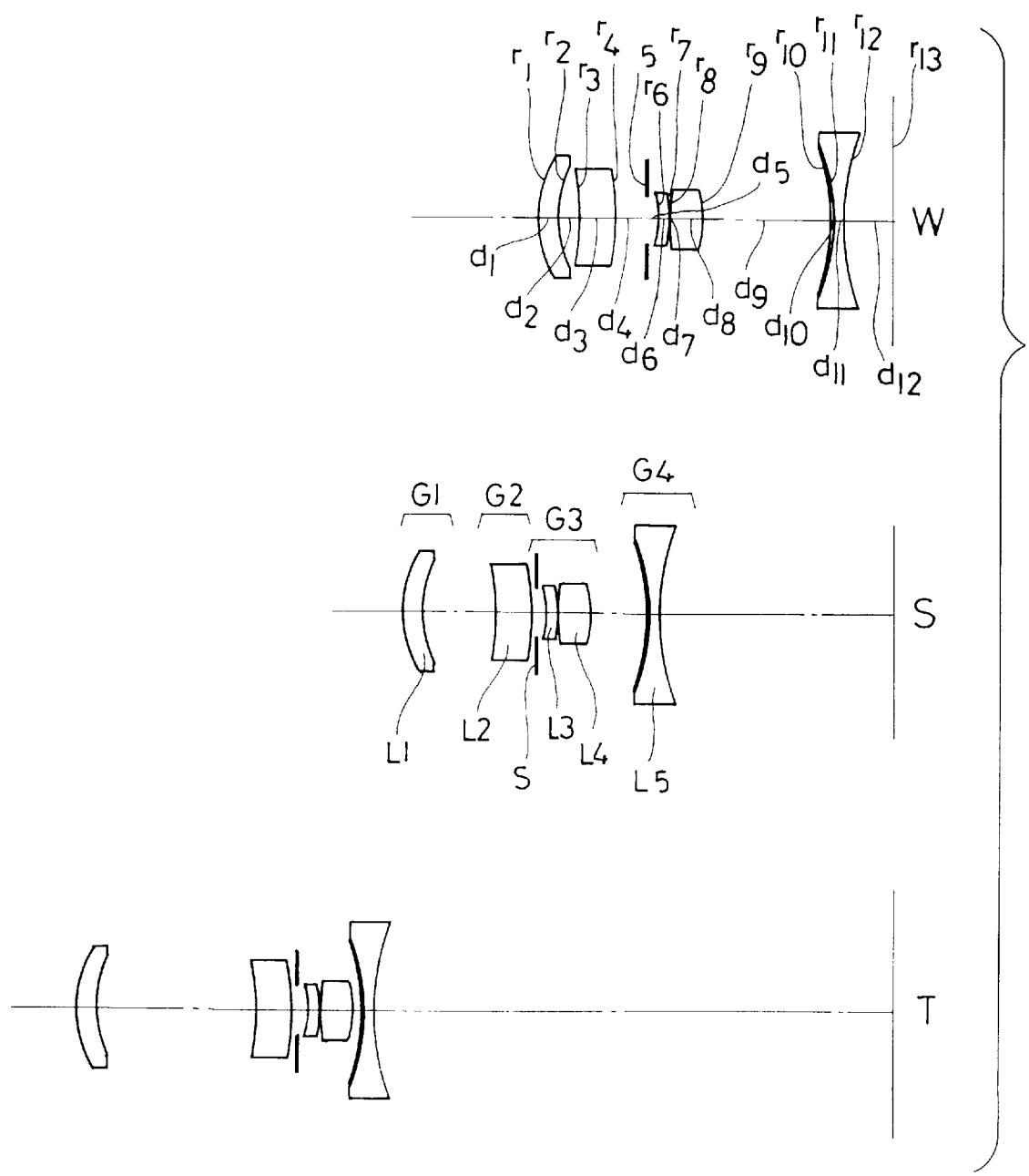

The seventh embodiment is an optical system which has a composition illustrated in FIG. 10, or is composed of a first lens unit G1 which is composed of a positive lens element L1, a second lens unit G2 which is composed of a positive lens element L2, a third lens unit G3 which is composed of an aperture stop S, a negative lens element L3 and a positive lens element L4, a fourth lens unit G4 which is composed of a negative lens element L5 having an aspherical resin layer (a layer which is formed between an aspherical surface $r_{10}$ and a surface $r_{11}$, and has thickness $d_{10}$), and configured to change its magnification by moving the lens units toward the object side so as to minimize an airspace reserved between the second lens unit G2 and the third lens unit G3 at an intermediate focal length. The second lens unit G2 and the fourth lens unit G4 are moved as an integral unit for changing the magnification so that a number of zooming cams can be reduced and a structure of a lens barrel can be simplified.

The seventh embodiment is focused by moving the second lens unit G2 and the third lens unit as an integral unit or the fourth lens unit G4 only.

The seventh embodiment uses an aspherical surface on each of the lens units. It is possible to further enhance optical performance of the seventh embodiment by increasing the number of the aspherical surfaces, or adopting an aspherical lens element which has aspherical surfaces on both sides. In addition, it is possible also in the second through fifth embodiments to configure the plastic aspherical lens elements as hybrid lens elements having aspherical resin layers such as those used in the sixth and seventh embodiments.

Figure 11:
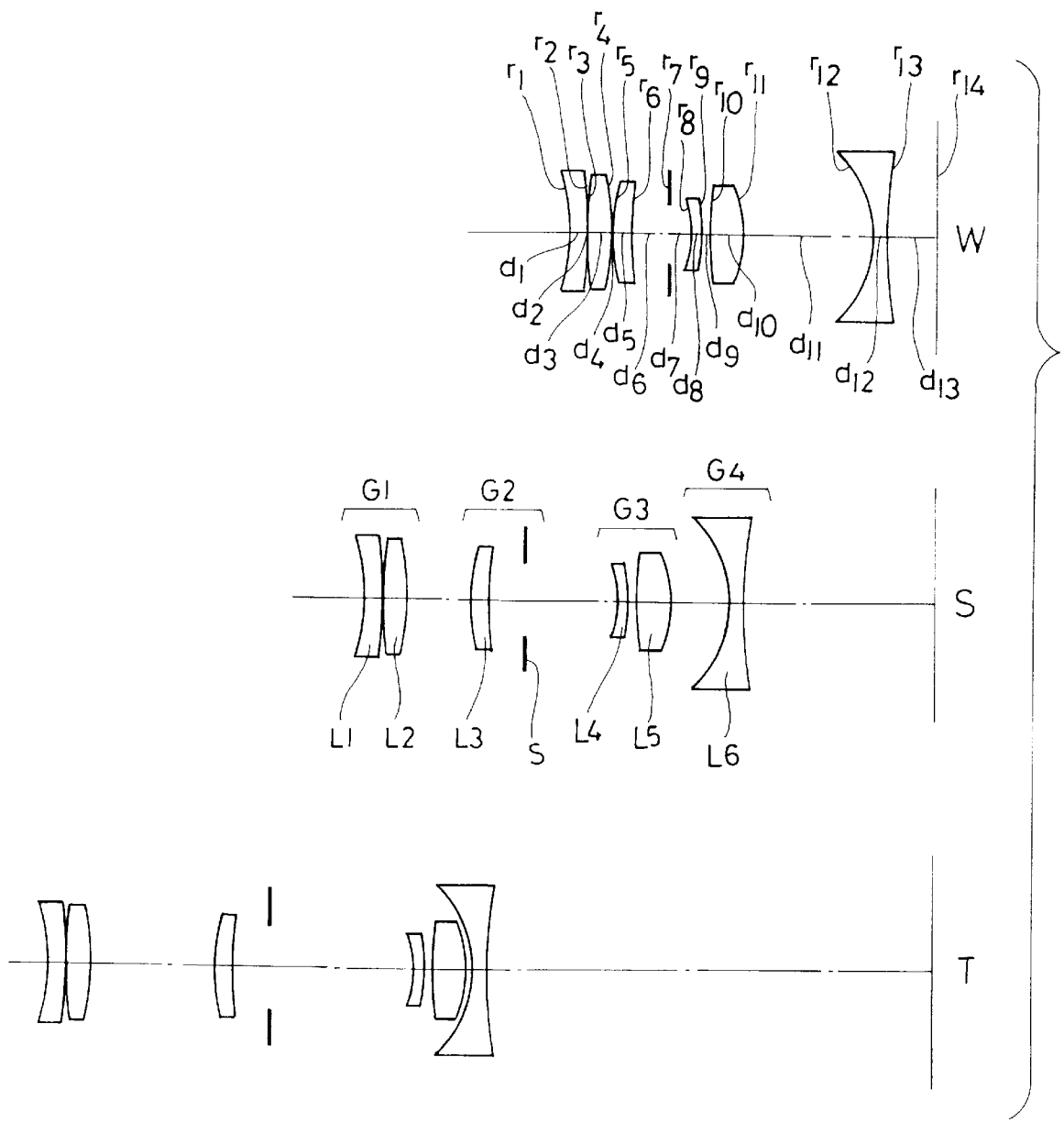

The eighth embodiment has a composition illustrated in FIG. 11, or is composed of a first lens unit G1 which is composed of a negative lens element L1 and a positive lens element L2, a second lens unit G2 which is composed of a positive lens element L3 and an aperture stop S, a third lens unit G3 which is composed of a negative lens element L4 and a positive lens element L5, and a fourth lens unit G4 which is composed of a negative lens element L6, and configured to change its magnification from a wide position to a tele position by moving the lens units toward the object side so as to widen an airspace reserved between the second lens unit G2 and the third lens unit G3.

The eighth embodiment is focused by moving the third lens unit G3 toward the object side.

The eighth embodiment uses an aspherical surface on each of the fifth and sixth lens elements L5 and L6 which are disposed in the third lens unit G3 and the fourth lens unit G4. The fifth and sixth lens elements are made of a plastic material for lowering a manufacturing cost. When the fifth positive lens element L5 and the sixth negative lens element L6 are made of a plastic material, these lens elements are varied reversely by temperature and humidity changes, whereby influences due to temperature and humidity changes are reduced in the zoom optical system as a whole.

In each of the embodiments described above, the fourth lens unit G4 is composed of a single negative lens element which has a deep concave surface on the object side so that the zoom optical system is compact in its collapsed condition.

The ninth embodiment is a zoom optical system which has a field angle 2ω of 65° or wider in a wide angle region and a vari-focal ratio on the order of 3.8.

Figure 12:
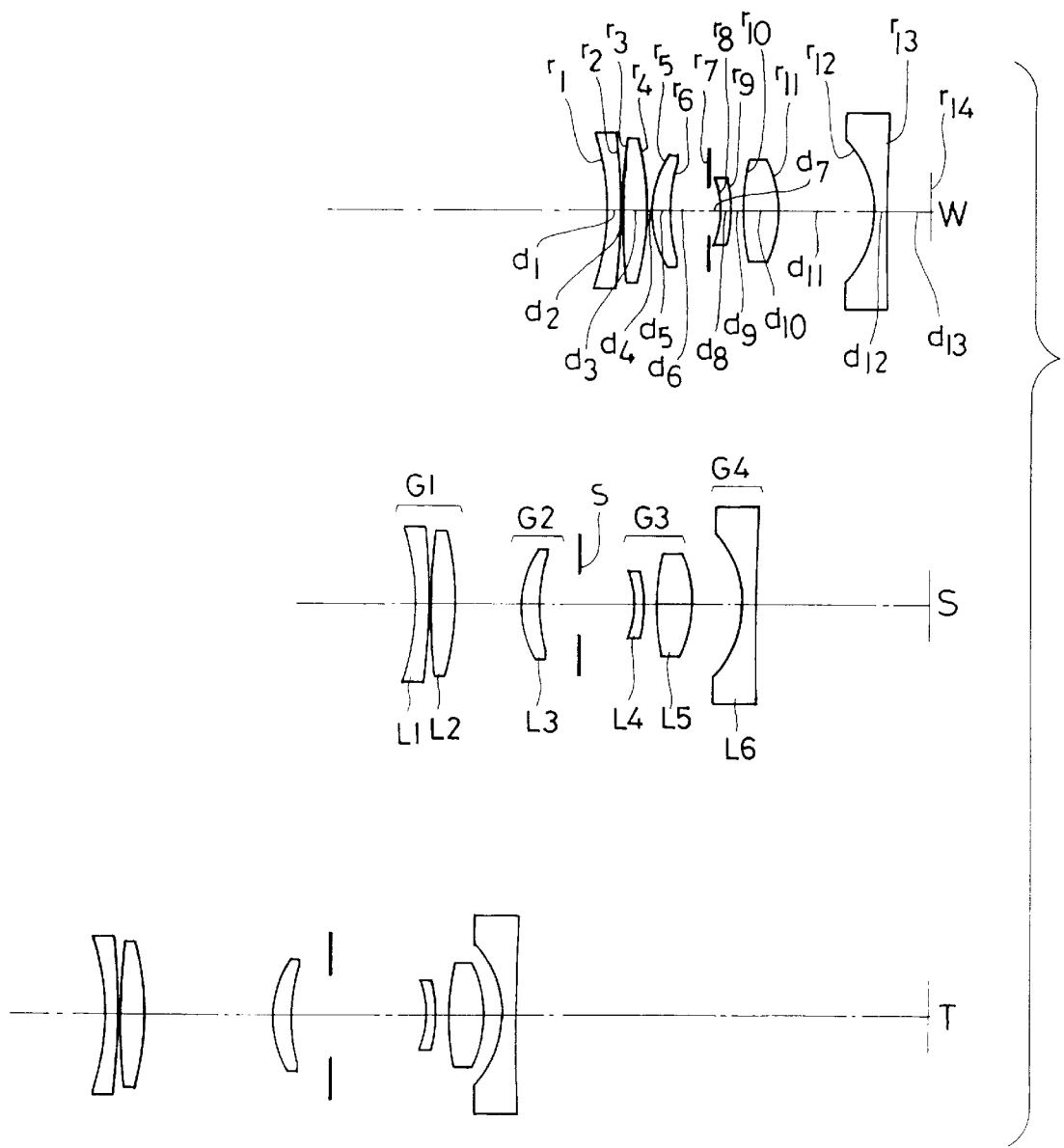

The ninth embodiment has a composition illustrated in FIG. 12, or is composed of a first lens unit G1 which is composed of a negative lens element L1 and a positive lens element L2, a second lens unit G2 which is composed of a positive lens element L3 and an aperture stop S, a third lens unit G3 which is composed of a negative lens element L4 and a positive lens element L5, and a fourth lens unit G4 which is composed of a negative lens element L6. That is, the zoom optical system preferred as the ninth embodiment as a whole is composed of six lens elements.

The ninth embodiment is configured to change its magnification from a wide position to a tele position by moving the lens units toward the object side so as to widen an airspace reserved between the second lens unit and the third lens unit. The ninth embodiment is focused by moving the third lens unit G3 toward the object side.

The ninth embodiment uses an aspherical surface on each of the positive lens element L5 disposed in the third lens unit and the negative lens element L6 disposed in the fourth lens unit.

The ninth embodiment allows aberrations to be varied extremely little when it is focused on an object located at a short distance by moving the third lens unit G3.

The tenth embodiment is a zoom optical system which has a field angle 2ω of 65° or wider in a wide angle region and a vari-focal ratio on the order of 3.8.

Figure 13:
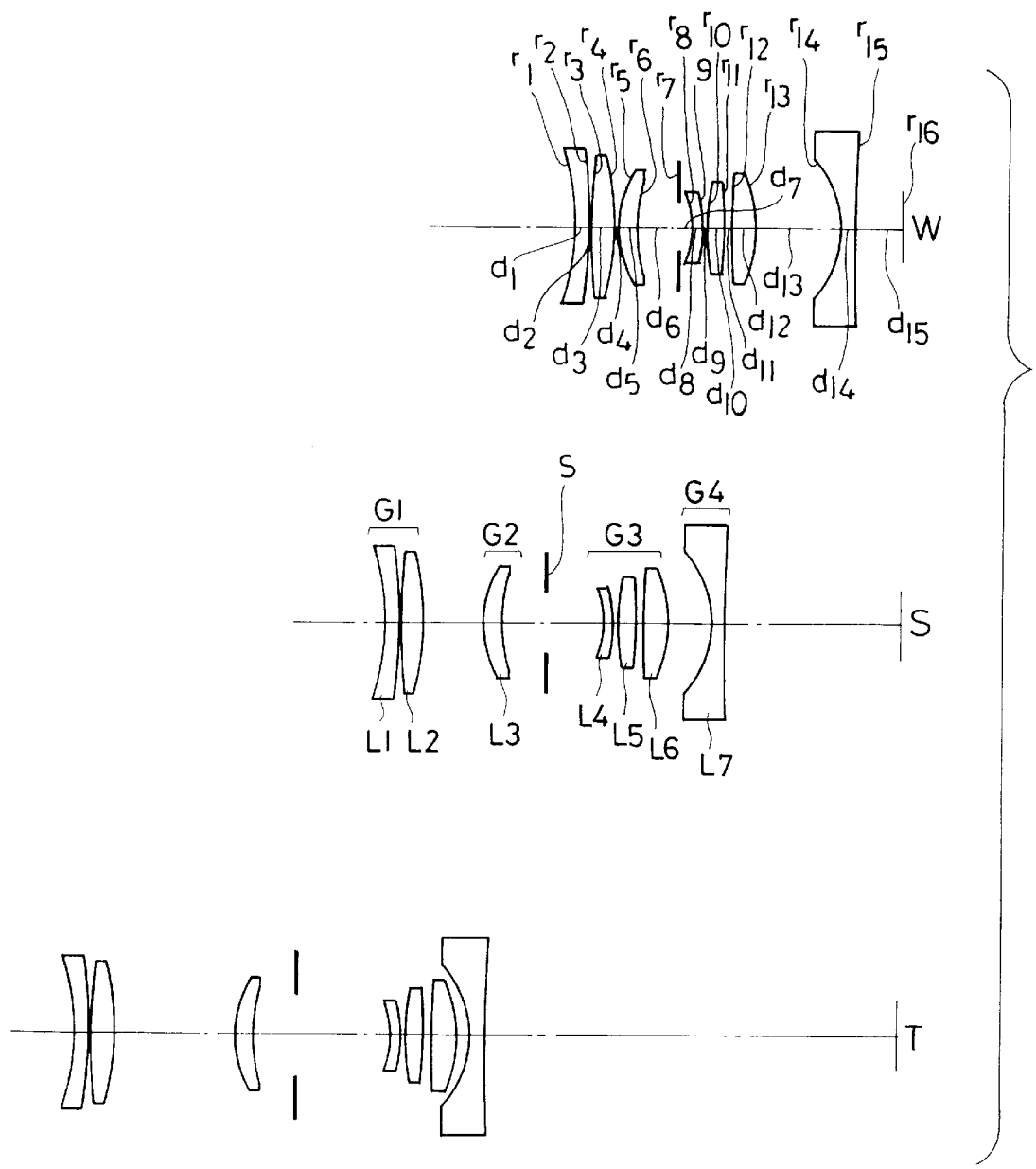

The tenth embodiment has a composition illustrated in FIG. 13, or is composed of a first lens unit G1 which is composed of a negative lens element L1 and a positive lens element L2, a second lens unit G2 which is composed of a positive lens element L3, a third lens unit G3 which is composed of a negative lens element L4, a positive lens element L5 and a positive lens element L6, and a fourth lens unit G4 which is composed of a negative lens element L7. That is, the zoom optical system preferred as the tenth embodiment as a whole is composed of seven lens elements.

The tenth embodiment is also configured to change its magnification from a wide position to a tele position by moving the lens units toward the object side so as to widen an airspace reserved between the second lens unit and the third lens unit. The tenth embodiment is focused by moving the third lens unit toward the object side.

The tenth embodiment uses an aspherical surface on each of the positive lens element disposed on the image side in the third lens unit G3 and the negative lens element disposed in the fourth lens unit G4.

Figure 14:
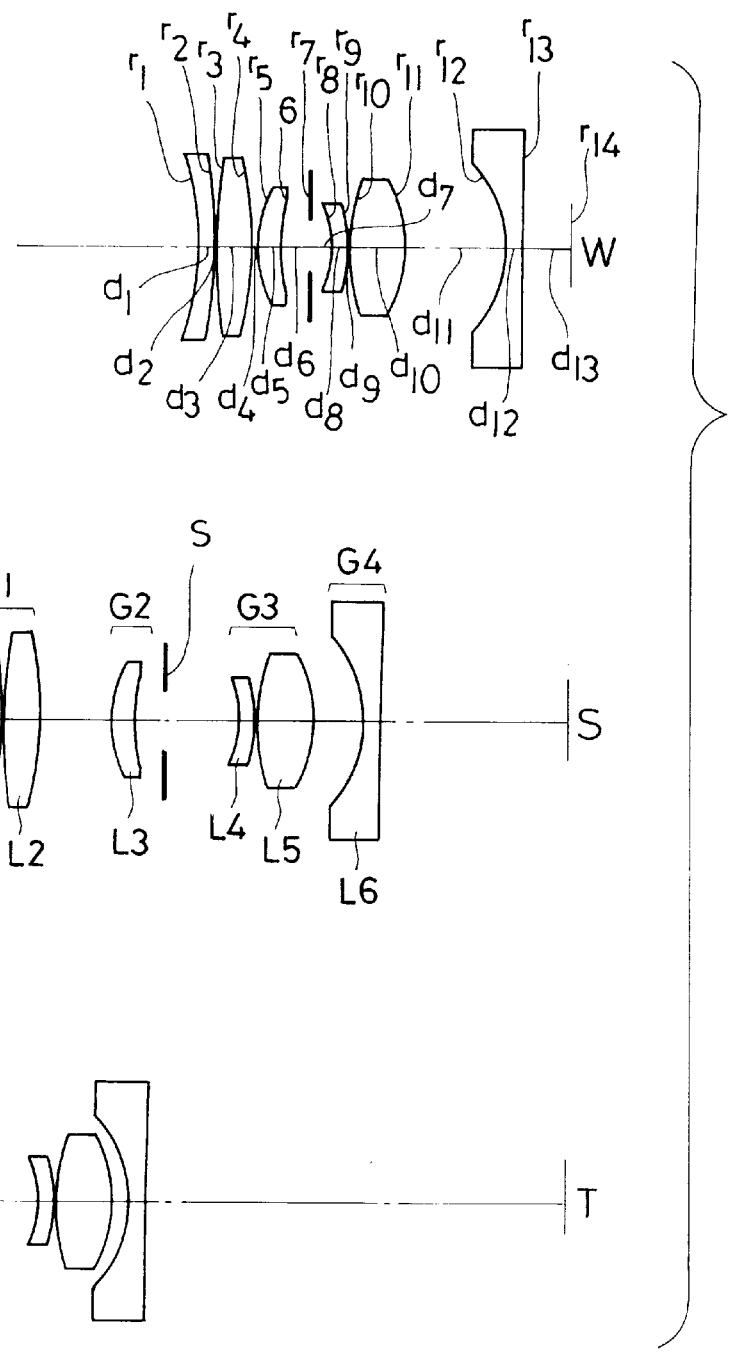

The eleventh embodiment is a zoom optical system which has a composition illustrated in FIG. 14, a field angle 2ω of 70° or wider in a wide angle region and a vari-focal ratio on the order of 3.8.

The eleventh embodiment is a zoom optical system which is composed of four lens units of six lens elements as shown in FIG. 14 or similarly to the ninth embodiment.

Figure 15:
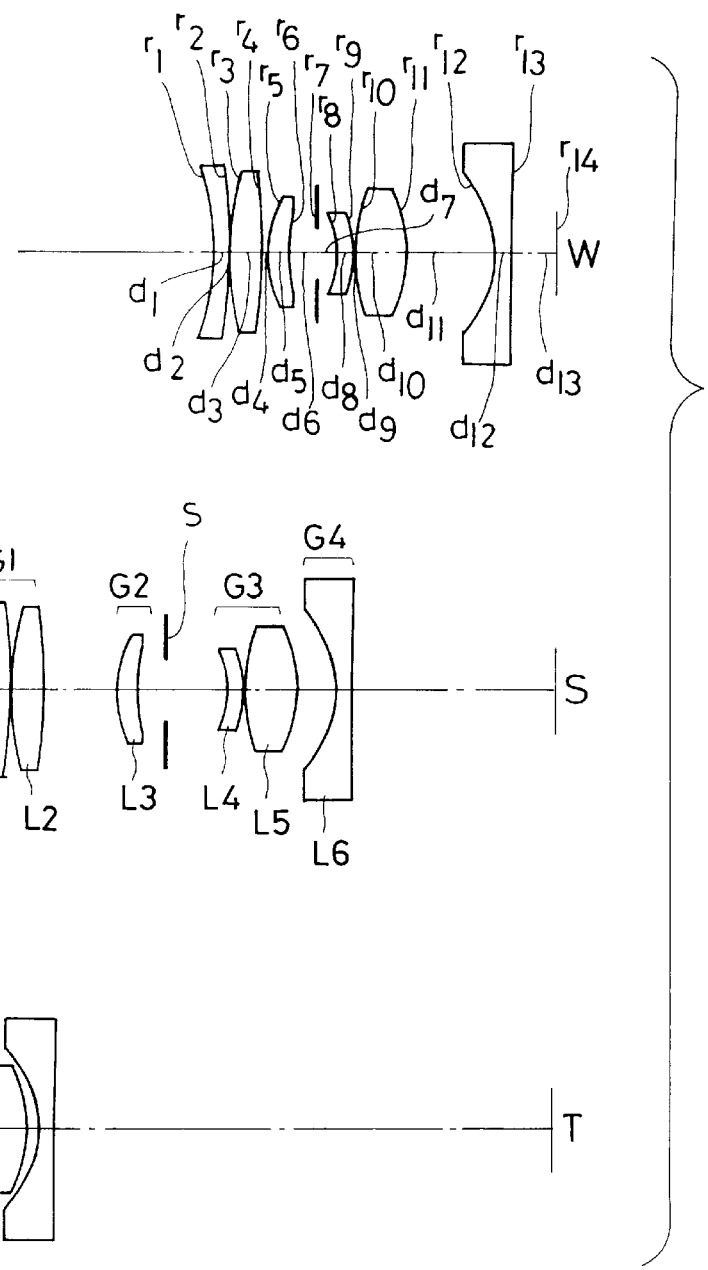

The twelfth embodiment is a zoom optical system which has a composition illustrated in FIG. 15, a field angle 2ω of 70° or wider in a wide angle region and a vari-focal ratio on the order of 4.2.

The twelfth embodiment is also a zoom optical system which has a composition similar to that of the ninth embodiment.

Figure 16:
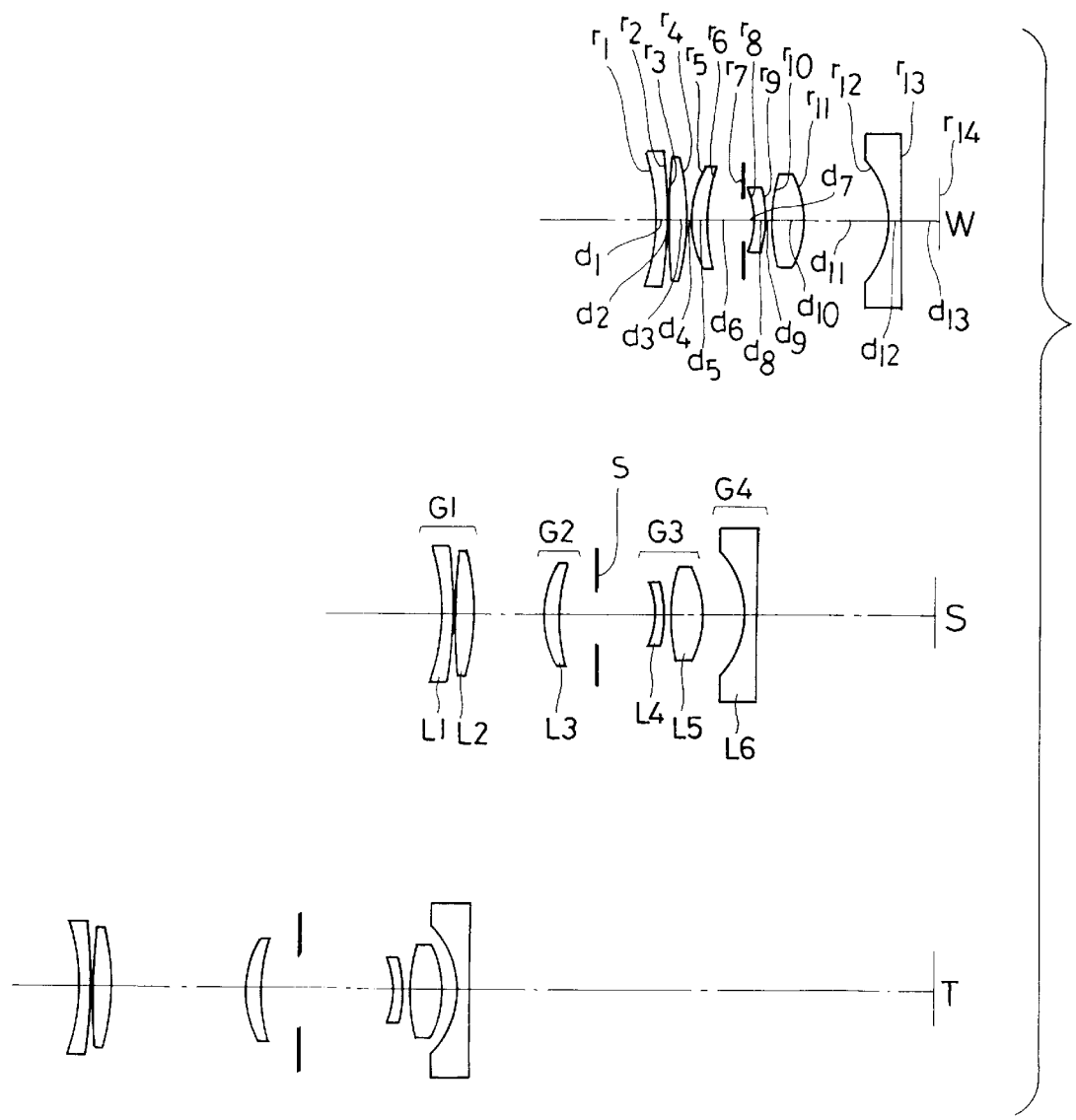

The thirteenth embodiment is a zoom optical system which has a composition illustrated in FIG. 16, a field angle 2ω of 65° or wider in a wide angle region and a vari-focal ratio on the order of 4.7.

The thirteenth embodiment is also an optical system which has a composition similar to that of the ninth embodiment.

Figure 17:
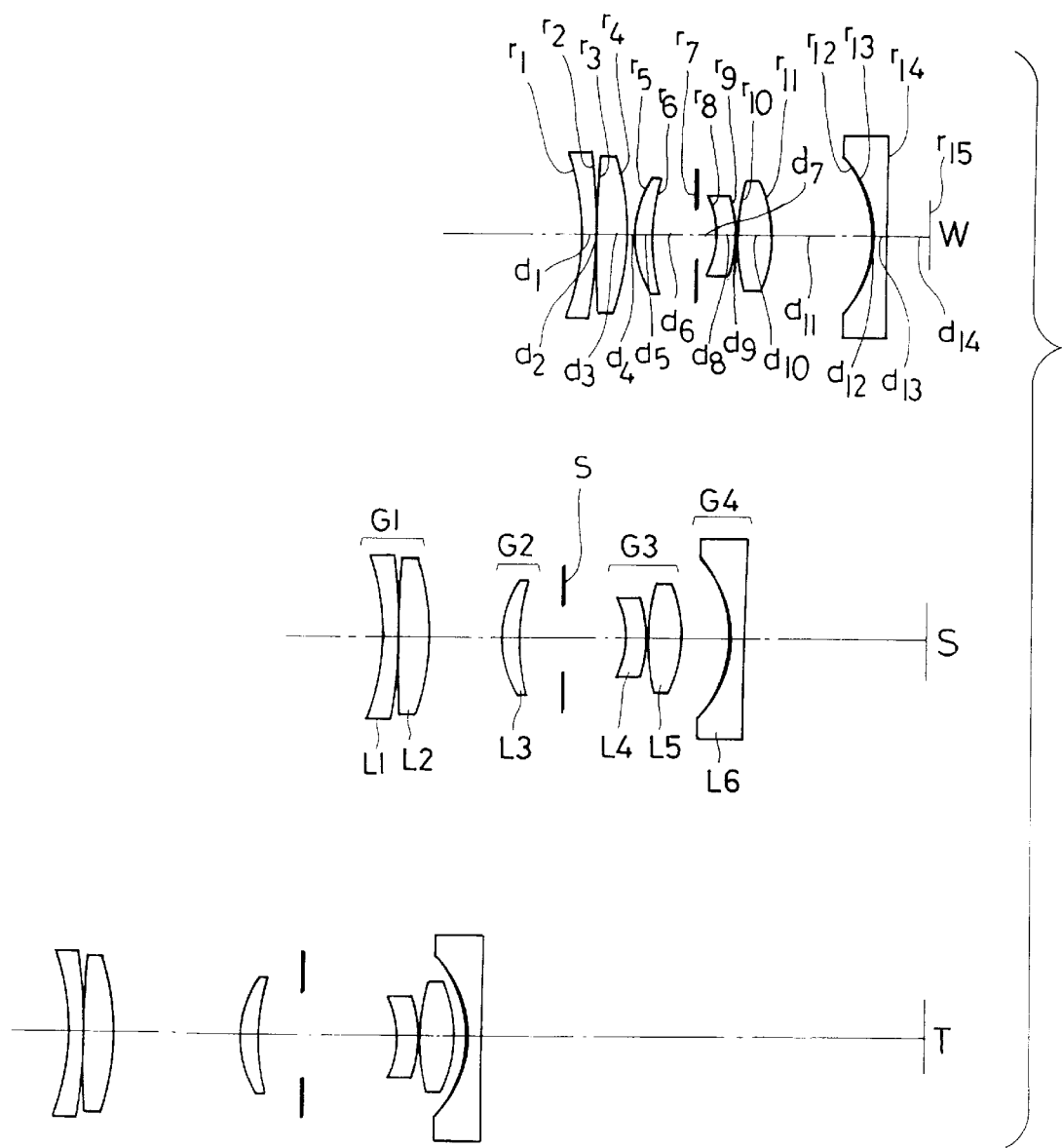

The fourteenth embodiment is a zoom optical system which has a composition illustrated in FIG. 17 and a field angle 2ω of 65° in a wide angle region, or wider and a vari-focal ratio on the order of 3.7.

The optical system preferred as the fourteenth embodiment also has a composition which is similar to that of the ninth embodiment.

A negative lens element used as a fourth lens unit of the fourteenth embodiment is configured as a hybrid lens element which has an aspherical resin layer on an object side surface thereof.

Figure 18:
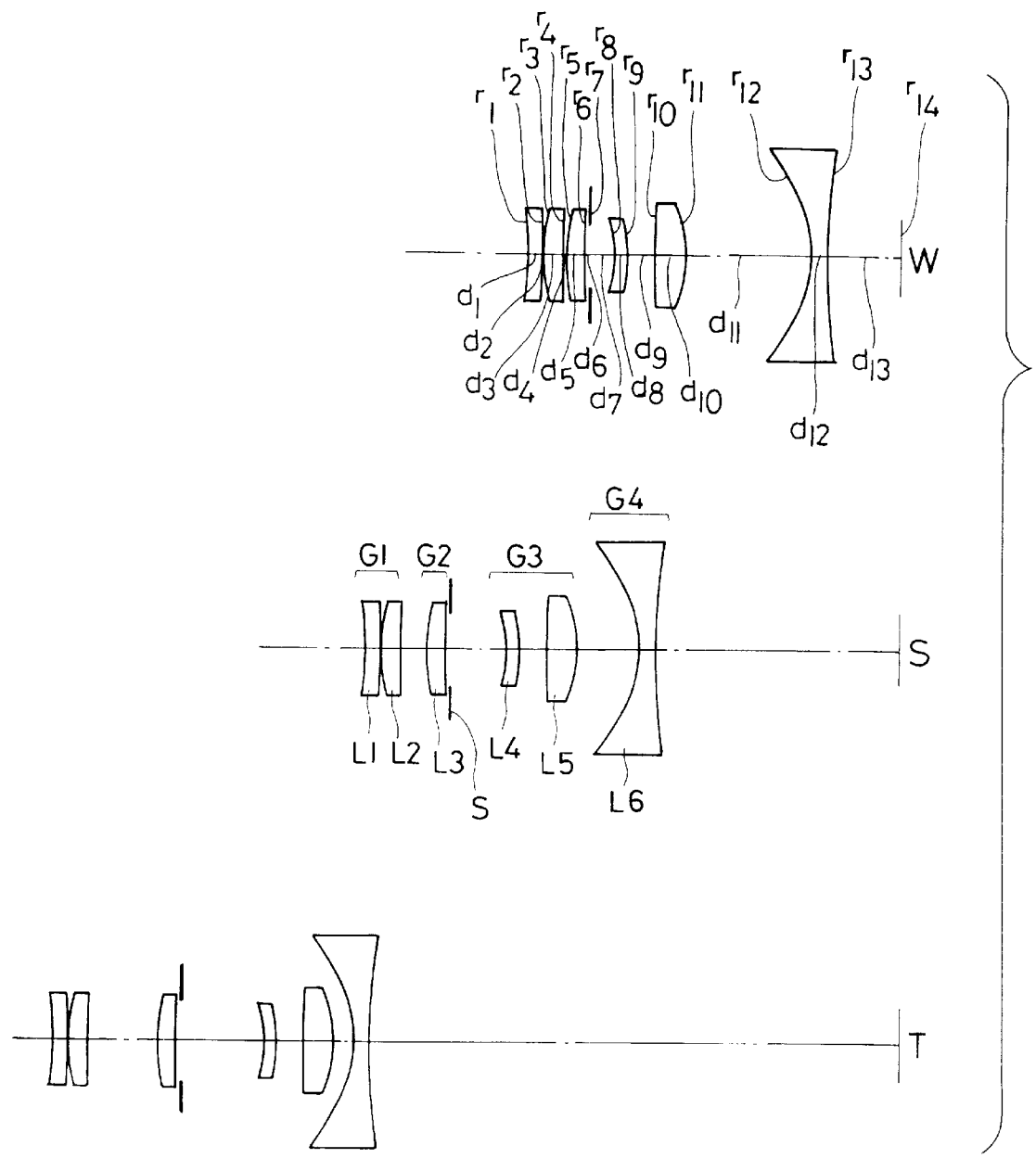

The fifteenth embodiment has a composition illustrated in FIG. 18, or is composed, in order from the object side, of a first lens unit G1 which is composed of a negative lens element L1 and a positive lens element L2, and has a positive power, a second lens unit G2 which is composed of a positive lens element L3 and a stop, and has a positive power, a third lens unit G3 which is composed of a negative lens element L4 and a positive lens element L5, and has a positive power, and a fourth lens unit G4 which is composed of a negative lens element L5 and has a negative power: the fifteenth embodiment as a whole being composed of six lens elements. The optical system preferred as the fifteenth embodiment is configured to change its magnification from a wide position to a tele position by moving all the lens units toward the object side so as to widen an airspace reserved between the second lens unit and the third lens unit.

The fifteenth embodiment uses an aspherical surface on each of the positive lens element L5 disposed in the third lens unit G3 and the negative lens element L6 disposed in the fourth lens unit G4. The aspherical lens element L5 disposed in the third lens unit G3 and the aspherical lens element L6 disposed in the fourth lens unit are made of a plastic material for lowering a manufacturing cost of the zoom optical system. Further, variations due to temperature and humidity changes are cancelled with each other since the positive lens element and the negative lens element are made of the plastic material.

Figure 19:
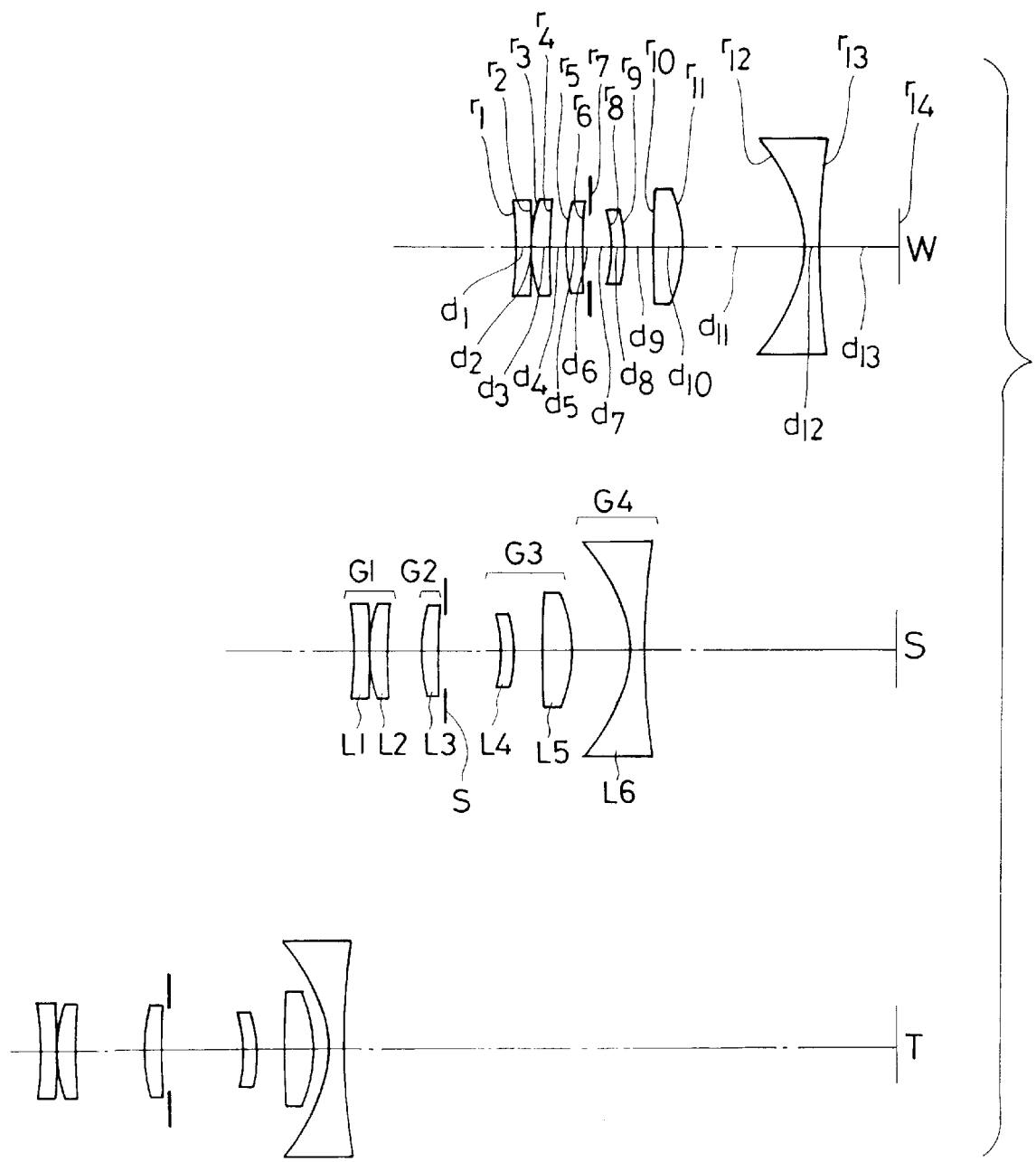

The sixteenth embodiment has a composition illustrated in FIG. 19, or remains unchanged from the fifteenth embodiment in composition and movements of lens units for changing a magnification. The sixteenth embodiment is focused by moving a second lens unit and a third lens unit toward the object side.

Figure 20:
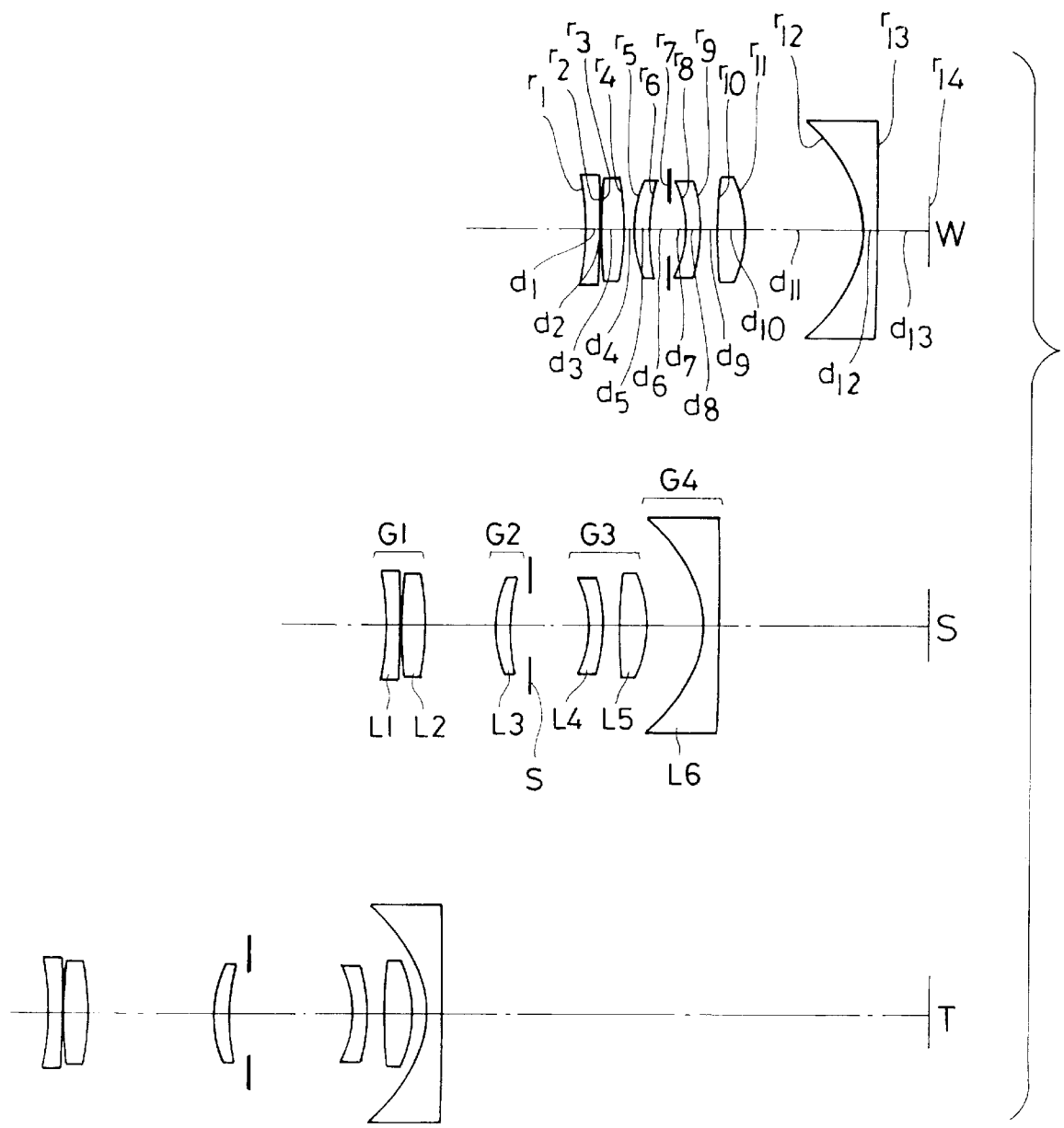

The seventeenth embodiment has a composition illustrated in FIG. 20, or remains unchanged from the fifteenth embodiment in composition and movements of lens unit for changing a magnification. In the seventeenth embodiment, however, a positive lens element L5 disposed in a third lens unit G3 and a negative lens element L6 disposed in a fourth lens unit G4 are aspherical lens elements which are made of a glass material. Accordingly, the seventeenth embodiment is free from influences due to temperature and humidity changes. Further, the negative lens element L6 disposed in the fourth lens unit G4 can be configured as a hybrid lens element which has an aspherical resin layer.

Figure 21:
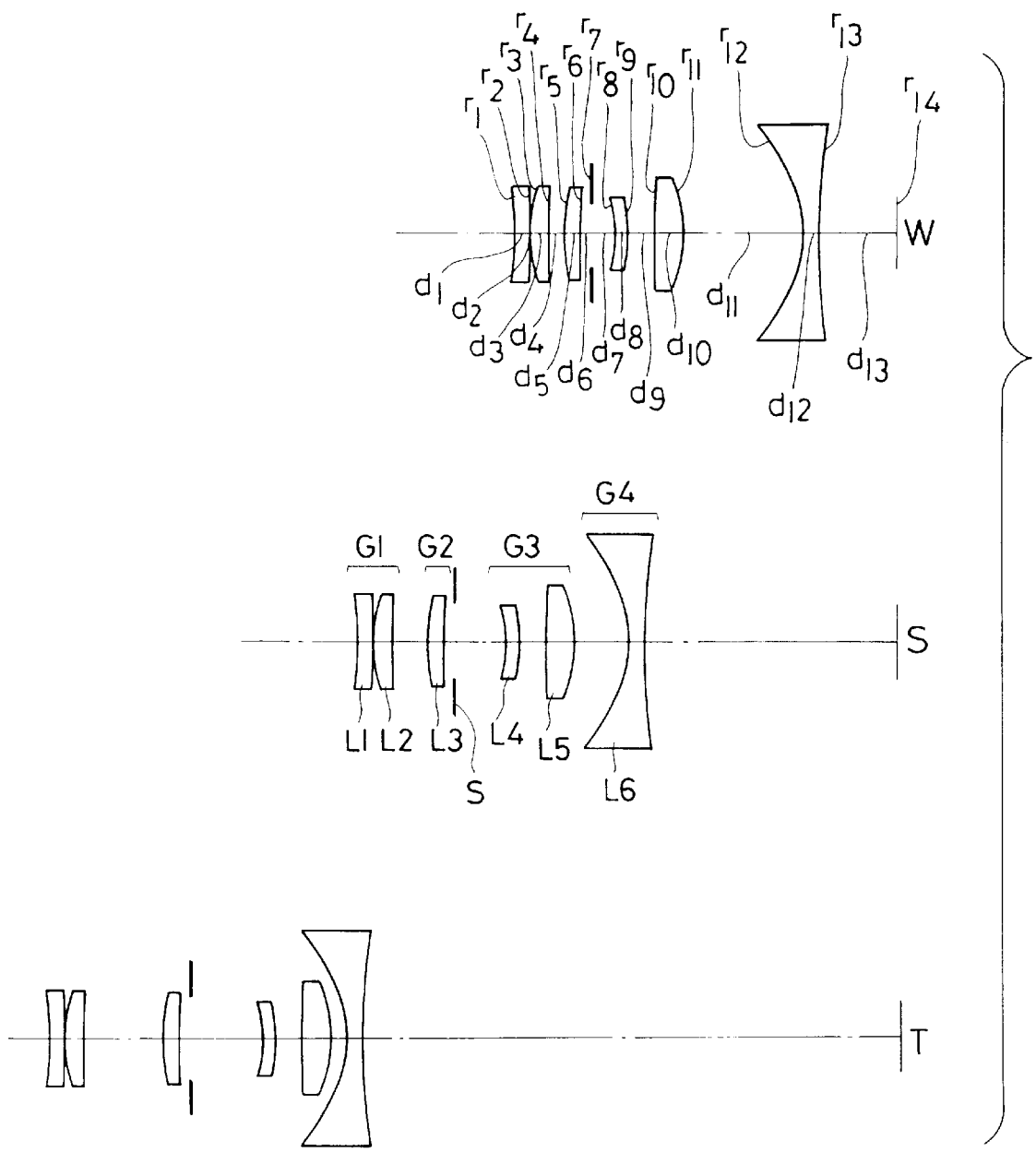

The eighteenth embodiment has a composition illustrated in FIG. 21, or remains unchanged from the fifteenth embodiment in composition and movements of lens units for a magnification change.

The eighteenth embodiment is focused on an object located at a short distance by moving a second lens unit and a third lens unit toward the object side.

Figure 22:
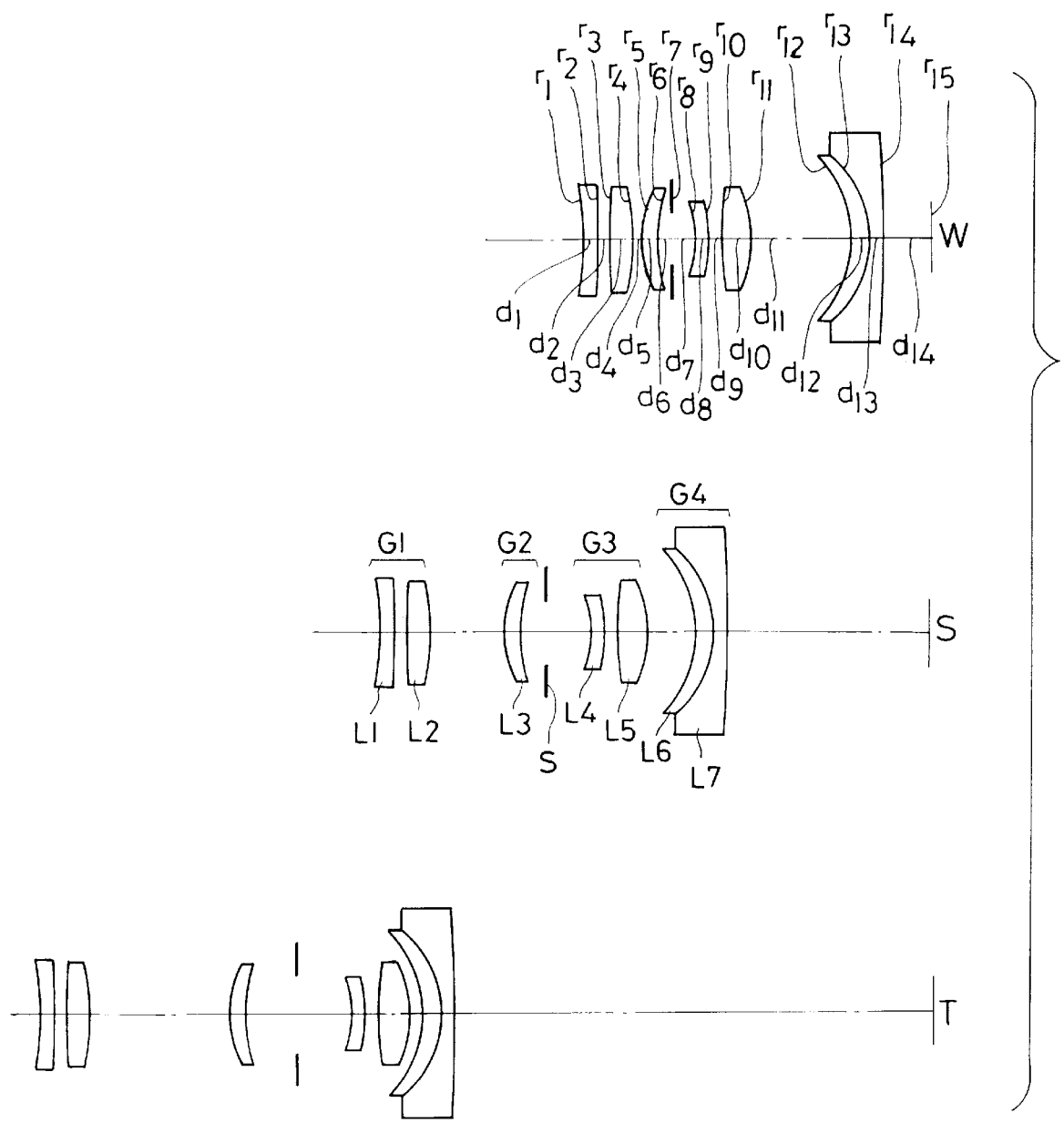

The nineteenth embodiment is composed, in order from the object side as shown in FIG. 22, of a first positive lens unit G1 which is composed of a negative lens element L1 and a positive lens element L2, a second positive lens unit G2 which is composed of a positive lens element L3, a third positive lens unit G3 which is composed of a negative lens element L4 and a positive lens element L5, and a fourth negative lens unit G4 which is composed of a cemented lens component consisting of a positive meniscus lens element L6 and a negative lens element L7, and configured to change its magnification from a wide position to a tele position by moving the lens units so as to widen an airspace reserved between the second lens unit and the third lens unit. That is, the nineteenth embodiment as a whole is composed of seven lens elements.

Further, an aperture stop is disposed between the second lens unit and the third lens unit, and moved so as to widen an airspace reserved between the second lens unit and the aperture stop for changing a magnification from the wide position to the tele position. Furthermore, an aspherical surface is used in each of the third lens unit and the fourth lens unit.

The aspherical surfaces used in the embodiments described above have shapes which are expressed by the formula shown below:

$$x=(y^2/r)/[1+\{1-(1+k)(y/r)^2\}^{1/2}]+Ey^4+Fy^6+Gy^8+Hy^{10}+Iy^{12}$$

wherein a direction of an optical axis is taken as x, a direction perpendicular to the optical axis is taken as y, the reference symbol k represents a conical constant, and the reference symbols E, F, G, H, I, . . . designate aspherical surface coefficients of the fourth, sixth, eighth, tenth, twelfth orders respectively.

We claim:

1. A zoom optical system comprising in order from the object side: a first lens unit which has a positive power or is powerless; a second lens unit which has a positive power; a third lens unit which has a positive power; and a fourth lens unit which has a negative power, wherein said zoom optical system is configured to change its magnification varying airspaces reserved between the lens units, and wherein said fourth lens unit is composed of a single lens element and satisfies the following condition (8):

$$0 \leq y/f_1 \leq 0.14$$

(8)

wherein the reference symbol y represents ½ of a diagonal length of an image surface and the reference symbol $f_1$ designates a focal length of the first lens unit.

2. A zoom optical system according to claim 1, wherein an aperture stop is disposed on the image side of a first lens element of said second lens unit and on the object side of said third lens unit.

3. A zoom optical system comprising in order from the object side: a first lens unit which has a positive power or is powerless; a second lens unit which has a positive power; a third lens unit which has a positive power; and a fourth lens unit which has a negative power, wherein said zoom optical system is configured to change its magnification by varying airspaces reserved between the lens units and satisfy the following conditions (1) and (8):

$$0.03 < \Sigma D_4/y < 0.25 \quad (1)$$

$$0 \leq y/f_1 \leq 0.14 \quad (8)$$

wherein the reference symbol $\Sigma D_4$ represents a structural length of the fourth lens unit and the reference symbol y designates ½ of a diagonal length of an image surface and the reference symbol $f_1$ denotes a focal length of the first lens unit.

4. A zoom optical system comprising in order from the object side: a first lens unit which has a positive power or is powerless; a second lens unit which has a positive power; a third lens unit which has a positive power; and a fourth lens unit which has a negative power, wherein said zoom optical system is configured to change its magnification by varying airspaces reserved between the lens units, be composed of lens elements in a number not exceeding twice a number of movable lens units and satisfy the following condition (8):

$$0 \leq y/f_1 \leq 0.14 \quad (8)$$

wherein the reference symbol y represents ½ of a diagonal length of an image surface and the reference symbol $f_1$ designates a focal length of the first lens unit.

5. A zoom optical system according to claim 4, wherein the number of the lens elements does not exceed 7.

6. A zoom optical system according to claim 5, wherein the first lens unit is composed of two lens elements, the second lens unit is composed of two lens elements, the third lens unit is composed of two lens elements and the fourth lens unit is composed of a single lens element.

7. A zoom optical system according to claim 5, wherein the first lens unit is composed of two lens elements, the second lens unit is composed of a single lens element, the third lens unit is composed of three lens elements and the fourth lens unit is composed of a single lens unit.

8. A zoom optical system according to claim 5, wherein the first lens unit is composed of two lens elements, the second lens unit is composed of a single lens element, the third lens unit is composed of two lens elements and the fourth lens unit is composed of two lens elements.

9. A zoom optical system according to claim 4, wherein the number of the lens elements does not exceed 6.

10. A zoom optical system according to claim 9, wherein the first lens unit is composed of two or a smaller number of lens elements, the second lens unit is composed of a single lens element and the third lens unit is composed of two or a smaller number of lens elements.

11. A zoom optical system comprising in order from the object side: a first lens unit which has a positive power or is powerless; a second lens unit which has a positive power; a third lens unit which has a positive power; and a fourth lens unit which has a negative power, wherein said zoom optical system is configured to change its magnification by varying airspaces reserved between the lens units, wherein an aperture stop is disposed on the image side of a first lens element of said second lens unit and on the object side of said third lens unit, and wherein said zoom optical system satisfies the following condition (10):

$$0.10 \leq E(W)/f_W \leq 0.30 \quad (10)$$

wherein the reference symbol E (W) represents a distance on an optical axis as measured from a vertex of a first surface to an entrance pupil of the optical system at a wide position and the reference symbol $f_W$ designates a focal length of the optical system as a whole at the wide position.

12. A zoom optical system comprising in order from the object side: a first lens unit which has a positive power or is powerless; a second lens unit which has a positive power; a third lens unit which has a positive power; and a fourth lens unit which has a negative power, wherein said zoom optical system is configured to change its magnification by varying airspaces reserved between the lens units, wherein an aperture stop is disposed between the second lens unit and the third lens unit, wherein the second lens unit and the aperture stop are moved as an integral unit for the magnification change, and wherein said zoom optical system satisfies the following condition (8):

$$0 \leq y/f_1 \leq 0.14 \quad (8)$$

wherein the reference symbol y represents ½ of a diagonal length of an image surface and the reference symbol $f_1$ designates a focal length of the first lens unit.

13. A zoom optical system comprising in order from the object side: a first lens unit which has a positive power or is powerless; a second lens unit which has a positive power; a third lens unit which has a positive power; and a fourth lens unit which has a negative power, wherein said zoom optical system is configured to change its magnification by varying airspaces reserved between the lens units, wherein an aperture stop is disposed-between the second lens unit and the third lens unit and is moved independently for the magnification change, and wherein said zoom optical system satisfies the following condition (8):

$$0 \leq y/f_1 \leq 0.14 \quad (8)$$

wherein the reference symbol y represents ½ of a diagonal length of an image surface and the reference symbol $f_1$ designates a focal length of the first lens unit.

14. A zoom optical system according to claim 1, 3, 4, 2, 11, 12 or 13 satisfying the following condition (2):

$$-1.20 < (r_F + r_R)/(r_F - r_R) < 0 \quad (2)$$

wherein the reference symbols $r_F$ and $r_R$ represent radii of curvature on an object side surface and an image side surface respectively of the fourth lens unit.

15. A zoom optical system according to claim 14 satisfying the following condition (12):

$$0 < D_0(i)/D_{min}(i) < 2 \quad (12)$$

wherein the reference numeral $D_0(i)$ (i=1, 2, 3 or 4) represents an airspace reserved between the lens units in the collapsed condition; $D_0(1)$ being an airspace reserved between the first lens unit and the second lens unit, $D_0(2)$ being an airspace reserved between the second lens unit and the third lens unit, $D_0(3)$ being an airspace reserved between the third lens unit and the fourth lens unit and $D_0(4)$ being an airspace reserved between the fourth lens unit and the image surface; and the reference symbol $D_{min}(i)$ designates a minimum value of each airspace which is variable in the entire zooming region; $D_{min}(1)$ being a minimum value of the airspace reserved between the first lens unit and the second lens unit, $D_{min}(2)$ being a minimum value of the airspace reserved between the second lens unit and the third lens unit, $D_{min}(3)$ being a minimum value of the airspace reserved between the third lens unit and the fourth lens unit and $D_{min}(4)$ being a minimum value of the airspace reserved between the fourth lens unit and the image surface.

16. A zoom optical system according to claim 1, 3, 4 2, 11, 12 or 13 satisfying the following condition (4-1):

$$1.5 < \beta_{4T}/\beta_{4W} < 6.0 \qquad (4\text{-}1)$$

wherein the reference symbols $\beta_{4W}$ and $\beta_{4T}$ represent lateral magnifications of the fourth lens unit at the wide position and the tele position respectively.

17. A zoom optical system according to claim 1, 3, 4, 2, 11, 12 or 13 satisfying, in place of the condition (8), the following condition (8-1):

$$0 \leq y/f_1 < 0.07 \qquad (8\text{-}1).$$

18. A zoom optical system according to claim 1, 3, 4, 2, 11, 12 or 13 satisfying the following condition (6):

$$0.5 < |f_4/f_W| < 0.9 \qquad (6)$$

wherein the reference symbol $f_4$ represents a focal length of the fourth lens unit and the reference symbol $f_W$ designates a focal length of the zoom optical system as a whole at the wide position.

19. A zoom optical system according to claim 1, 3, 4, 2, 11, 12 or 13 satisfying the following condition (5):

$$0.1 < f_{BW}/f_W < 0.5 \qquad (5)$$

wherein the reference symbol $f_{BW}$ represents a back focal length at the wide position and the reference symbol $f_W$ designates a focal length of the zoom optical system as a whole at the wide position.

20. A zoom optical system according to claim 1, 3, 4, 2, 11, 12 or 13 wherein an aspherical surface is disposed at least in the fourth lens unit.

21. A zoom optical system according to claim 1, 3, 4, 2, 11, 12 or 13 wherein an aspherical surface is disposed at least in the third lens unit.

22. A zoom optical system according to claim 1, 3, 4, 2, 11, 12 or 13 to be focused with said third lens unit.

23. A zoom optical system according to claim 1, 3, 4, 2, 11, 12 or 13 to be focused with said second lens unit and said third lens unit.

24. A zoom optical system according to claim 1, 3, 4, 2, 11, 12 or 13 satisfying the following condition (3):

$$\nu_R > 50 \qquad (3)$$

wherein the reference symbol $\nu_R$ represents an Abbe's number of a negative lens element disposed in the fourth lens unit.

25. A zoom optical system according to claim 1, 3, 4, 2, 11, 12 or 13 satisfying the following condition (6):

$$0.5 < |f_4/f_W| < 0.9 \qquad (6)$$

wherein the reference symbol $f_4$ represents a focal length of the fourth lens unit and the reference symbol $f_W$ designates a focal length of the zoom optical system as a whole at the wide position.

26. A zoom optical system according to claim 1, 3, 4, 2, 11, 12 or 13 satisfying the following condition (7):

$$|\beta_{3T}| < 0.9 \qquad (7)$$

wherein the reference symbol $\beta_{3T}$ represents a magnification of the third lens unit at the tele position.

27. A zoom optical system according to claim 1, 3, 4, 2, 11, 12 or 13 satisfying the following condition (11):

$$|f_T/f_1| \leq 0.6 \qquad (11)$$

wherein the reference symbol $f_1$ represents a focal length of the first lens unit and the reference symbol $f_T$ designates a focal length of the zoom optical system as a whole at the tele position.

28. A zoom optical system according to claim 27 satisfying, in place of said condition (11), the following condition (11-1):

$$|f_T/f_1| \leq 0.4 \qquad (11\text{-}1).$$

29. A zoom optical system according to claim 1, 3, 4, 2, 12 or 13 satisfying the following condition (9):

$$0.5 < |f_4|/y < 1.0 \qquad (9)$$

wherein the reference symbol $y$ represents ½ of a diagonal length of an image surface and the reference symbol $f_4$ designates a focal length of the fourth lens unit.

30. A zoom optical system according to claim 11 satisfying, in place of said condition (10), the following condition (10-1):

$$0.10 \leq E(W)/f_W \leq 0.24 \qquad (10\text{-}1).$$

* * * * *